(12) United States Patent
Matsuoka et al.

(10) Patent No.: US 12,199,928 B2
(45) Date of Patent: *Jan. 14, 2025

(54) SYSTEMS AND METHODS FOR REPRESENTATIVE SUPPORT IN A TASK DETERMINATION SYSTEM

(71) Applicant: Yohana LLC, Palo Alto, CA (US)

(72) Inventors: Yoky Matsuoka, Los Altos Hills, CA (US); Defne Civelekoglu, Berkeley, CA (US); Gwendolyn W. van der Linden, Redwood City, CA (US); Nitin Viswanathan, San Francisco, CA (US); David L Warner, Woodside, CA (US); Lingyun Liu, Sunnyvale, CA (US); Benjamin Deming, Campbell, CA (US); Sean Paterson, Mountain View, CA (US)

(73) Assignee: Yohana LLC, Palo Alto, CA (US)

(*) Notice: Subject to any disclaimer, the term of this patent is extended or adjusted under 35 U.S.C. 154(b) by 171 days.

This patent is subject to a terminal disclaimer.

(21) Appl. No.: 17/819,495

(22) Filed: Aug. 12, 2022

(65) Prior Publication Data

US 2023/0047988 A1 Feb. 16, 2023

Related U.S. Application Data

(60) Provisional application No. 63/232,480, filed on Aug. 12, 2021.

(51) Int. Cl.
*G06F 15/16* (2006.01)
*G06F 40/279* (2020.01)
*H04L 51/02* (2022.01)

(52) U.S. Cl.
CPC ............ *H04L 51/02* (2013.01); *G06F 40/279* (2020.01)

(58) Field of Classification Search
CPC ............................. H04L 51/02; G06F 40/279
(Continued)

(56) References Cited

U.S. PATENT DOCUMENTS 11,055,305 B1    7/2021  Petricek et al.
2015/0066971 A1*  3/2015  Agarwal ............... G06Q 10/06
                                             707/758

(Continued)

OTHER PUBLICATIONS

International Search Report and Written Opinion issued on Nov. 17, 2022 in International Application PCT/US2022/074921.

(Continued)

*Primary Examiner* — Imad Hussain
(74) *Attorney, Agent, or Firm* — Polsinelli LLP

(57) ABSTRACT

Systems and methods for implementing a representative support system in a task determination system are provided. The task determination system automatically receives in real-time a set of messages between a member and a representative as these messages are exchanged. The set of messages correspond to a set of proposals associated with a task. The task determination system automatically identifying a selection of a proposal from the set of proposals based on an analysis of the set of messages. Based on the selection, the task determination system generates a set of proposal tasks and processes communications associated with these proposal tasks to monitor performance of these proposal tasks for completion of the task.

21 Claims, 21 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2018/0375947 A1 | 12/2018 | Hodges et al. | |
| 2018/0376002 A1 | 12/2018 | Abraham | |
| 2020/0251106 A1* | 8/2020 | Benkreira | ............... G10L 15/22 |
| 2020/0351227 A1 | 11/2020 | Smullen et al. | |
| 2021/0201327 A1* | 7/2021 | Konig | ................. H04M 3/5191 |
| 2021/0390951 A1* | 12/2021 | Gadde | ..................... G06F 40/30 |
| 2022/0366352 A1* | 11/2022 | Matsuoka | .......... G06Q 10/0639 |
| 2022/0405687 A1* | 12/2022 | Matsuoka | ............... G06F 40/20 |

OTHER PUBLICATIONS

International Search Report and Written Opinion issued on Feb. 22, 2024 in International Application PCT/US2022/074921.

* cited by examiner

SYSTEMS AND METHODS FOR REPRESENTATIVE SUPPORT IN A TASK DETERMINATION SYSTEM

CROSS-REFERENCE TO RELATED APPLICATIONS

The present patent application claims the priority benefit of U.S. provisional patent application No. 63/232,480 filed Aug. 12, 2021, the disclosures of which are incorporated by reference herein.

FIELD

The present disclosure relates generally to determination and delegation of tasks and the acceptance of proposals for satisfying requirements associated with those tasks. In one example, the systems and methods described herein may be used to allow a member to accept proposals to perform tasks that may be performed for the benefit of the member. Further, the systems and methods described herein may be used to provide automated coordination for the acceptance of proposals to perform tasks for the benefit of the member.

SUMMARY

Disclosed embodiments may provide a framework to process communications associated with proposals that are generated for various tasks so that actions may be performed for the benefit of a member. According to some embodiments, a computer-implemented method is provided. The computer-implemented method comprises receiving in real-time a set of messages between a member and a representative as the set of messages are being exchanged. The set of messages correspond to a set of proposals associated with a task. Further, the set of proposals are generated based on the task and a member profile associated with the member. The computer-implemented method further comprises automatically identifying in real-time a selection of one or more proposals from the set of proposals. The selection is automatically identified based on a real-time analysis of the set of messages. The computer-implemented method further comprises automatically generating one or more proposal tasks performable to complete the task. The one or more proposal tasks are automatically generated based on the selection. The computer-implemented method further comprises processing in real-time communications associated with the one or more proposal tasks as the communications are exchanged. The communications are processed to monitor performance of the one or more proposal tasks. The computer-implemented method further comprises updating the member profile in real-time based on the task, the selection, the set of messages, and the communications.

In some embodiments, the selection is detected based on one or more anchor terms automatically identified in the set of messages.

In some embodiments, the computer-implemented method further comprises monitoring in real-time communications between the representative and an assistant representative as the communications between the representative and an assistant representative are exchanged. The computer-implemented method further comprises automatically modifying the set of proposals in real-time based on the communications between the representative and an assistant representative.

In some embodiments, the computer-implemented method further comprises automatically delegating the one or more proposal tasks according to one or more parameters associated with the one or more proposal tasks and to characteristics of the representative and one or more other representatives.

In some embodiments, the selection is automatically identified in real-time using a Natural Language Processing (NLP) algorithm. The NLP algorithm processes the set of messages in real-time as the set of messages are received.

In some embodiments, the computer-implemented method further comprises performing a sentiment analysis to automatically determine a sentiment corresponding to the set of proposals. The sentiment is used to identify the selection of one or more proposals from the set of proposals.

In some embodiments, the representative is an automated bot. The automated bot automatically communicates with the member according to the member profile.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

Figure 1:
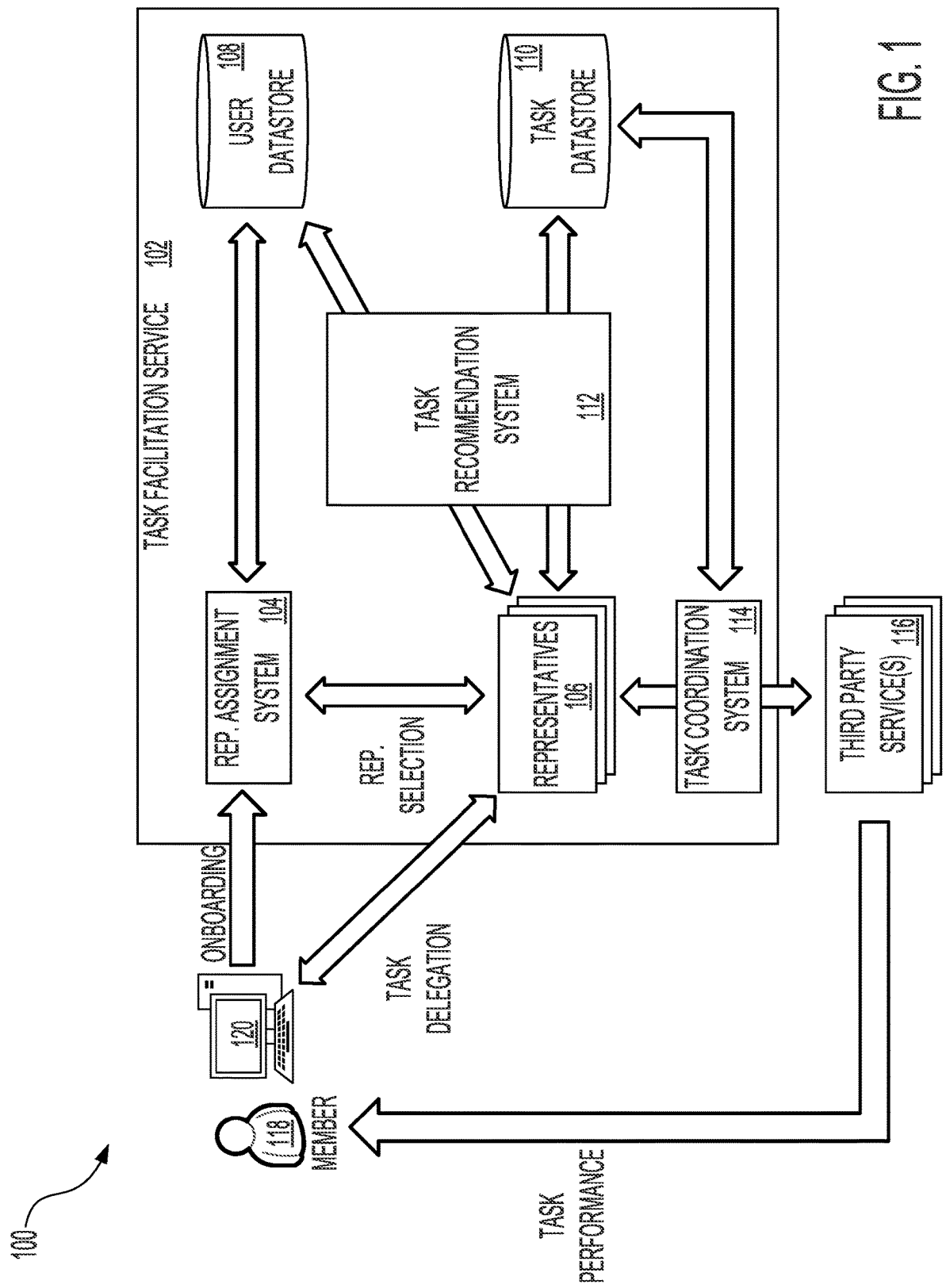
FIG. 1 shows an illustrative example of an environment in which a task facilitation service assigns a representative to a member through which various tasks performable for the benefit of the member can be recommended for performance by the representative and/or one or more third-party services in accordance with various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

Additionally, in the appended figures, similar components and/or features may refer back to an earlier described component. For example, a component and/or feature may be described as " . . . the representative 406 (which is the same as the representative 106 described herein at least in connection with FIG. 1) . . . " Such references are bi-directional in that, a later reference back such as " . . . the representative 706 (which is the same as the representative 106 described herein at least in connection with FIG. 1) . . . " is indicative that components and/or features described with respect to representative 106 and with respect to representative 406 are both incorporated into the components and/or features of representative 706 and vice versa.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework to process communications associated with proposals that are generated for various tasks so that actions may be performed for the benefit of a member. Through this framework, when a member is assigned a representative, over time the representative may learn about the member's preferences and behavior. Additionally, communications between the member and the representative may be received and analyzed to learn more about the member's preferences and behavior and to improve various algorithms associated with the task generation process. Those preferences and behaviors can then be used to recommend proposals for performing tasks which, upon being accepted, can be used to guide actions that can be performed on the member's behalf, thereby reducing the member's cognitive load for accomplishing tasks. The communications and/or interactions associated with these further actions may also be received and processed to further improve recommendations and/or communications. Further, as the representative develops a relationship with the member over time, the representative can also curate proposals specifically to the member's preferences, propose curated experiences for the member, and propose actions to assist the member in achieving personal goals and ambitions which may be accepted by the member. Communications associated with these further actions may also be received and processed to further improve recommendations and/or communications.

FIG. 1 shows an illustrative example of an environment 100 in which a task facilitation service 102 assigns a representative 106 to a member 118 through which various tasks performable for the benefit of the member 118 can be recommended for performance by the representative 106 and/or one or more third-party services 116 in accordance with various embodiments. The task facilitation service 102 may be implemented to reduce the cognitive load on members and their families in performing various tasks in and around their homes by identifying and delegating tasks to representatives 106 that may coordinate performance of these tasks for the benefit of these members. In an embodiment, a member 118, via a computing device 120 (e.g., a laptop computer, smartphone, etc.), may submit a request to the task facilitation service 102 to initiate an onboarding process for assignment of a representative 106 to the member 118 and to initiate identification of tasks that are performable for the benefit of the member 118. For instance, the member 118 may access the task facilitation service 102 via an application provided by the task facilitation service 102 and installed onto a computing device 120. Additionally, or alternatively, the task facilitation service 102 may maintain a web server (not shown) that hosts one or more websites configured to present or otherwise make available an interface through which the member 118 may access the task facilitation service 102 and initiate the onboarding process.

During the onboarding process, the task facilitation service 102 may collect identifying information of the member 118, which may be used by a representative assignment system 104 to identify and assign a representative 106 to the member 118. For instance, the task facilitation service 102 may provide, to the member 118, a survey or questionnaire through which the member 118 may provide identifying information usable by the representative assignment system 104 to select a representative 106 for the member 118. For instance, the task facilitation service 102 may prompt the member 118 to provide detailed information with regard to the composition of the member's family (e.g., number of inhabitants in the member's home, the number of children in the member's home, the number and types of pets in the member's home, etc.), the physical location of the member's home, any special needs or requirements of the member 118 (e.g., physical or emotional disabilities, etc.), and the like. In some instances, the member 118 may be prompted to provide demographic information (e.g., age, ethnicity, race, languages written/spoken, etc.). The member 118 may also be prompted to indicate any personal interests or hobbies that may be used to identify possible experiences that may be of interest to the member 118 (described in greater detail herein).

In an embodiment, the member's identifying information, as well as any information related to the member's level of comfort or interest in delegating different categories of tasks to others, is provided to a representative assignment system 104 of the task facilitation service 102 to identify a representative 106 that may be assigned to the member 118. The representative assignment system 104 may be implemented using a computer system or as an application or other executable code implemented on a computer system of the task facilitation service 102. The representative assignment system 104, in an embodiment, uses the member's identifying information, any information related to the member's level of comfort or interest in delegating tasks to others, and any other information obtained during the onboarding process as input to a classification or clustering algorithm configured to identify representatives that may be well-suited to interact and communicate with the member 118 in a productive manner.

Once the representative assignment system 104 has identified a set of representatives 106 that may be assigned to the member 118 to serve as an assistant or concierge for the member 118, the representative assignment system 104 may evaluate data corresponding to each representative of the set of representatives 106 to identify a particular representative that can be assigned to the member 118. For instance, the representative assignment system 104 may rank each representative of the set of representatives 106 according to degrees or vectors of similarity between the member's and representative's demographic information. For instance, if a member and a particular representative share a similar background (e.g., attended university in the same city, are from the same hometown, share particular interests, etc.), the representative assignment system 104 may rank the particular representative higher compared to other representatives that may have less similar backgrounds. Similarly, if a member and a particular representative are within geographic proximity to one another, the representative assignment system 104 may rank the particular representative higher compared to other representatives that may be further away from the member 118. Each factor, in some instances, may be weighted based on the impact of the factor on the creation of a positive, long-term relationship between members and representatives.

In an embodiment, the representative assignment system 104 uses the ranking of the set of representatives 106 to select a representative that may be assigned to the member 118. For instance, the representative assignment system 104 may select the highest ranked representative and determine the representative's availability to engage the member 118 in identifying and recommending tasks, coordinating resolution of tasks, and otherwise communicating with the member 118 to assure that their needs are addressed. If the selected representative is unavailable (e.g., the representative is already engaged with one or more other members, etc.), the representative assignment system 104 may select another representative according to the aforementioned ranking and determine the availability of this representative to engage the member 118. This process may be repeated until a representative is identified from the set of representatives 106 that is available to engage the member 118.

In an embodiment, the representative assignment system 104 can select a representative from the set of representatives 106 based on information corresponding to the availability of each representative. For instance, the representative assignment system 104 may automatically select the first available representative from the set of representatives 106. In some instances, the representative assignment system 104 may automatically select the first available representative that satisfies one or more criteria corresponding to the member's identifying information. For example, the representative assignment system 104 may automatically select an available representative that is within geographic proximity of the member 118, shares a similar background as that of the member 118, and the like.

In an embodiment, the data associated with the member 118 is used by the task facilitation service 102 to create a member profile corresponding to the member 118. As noted above, the task facilitation service 102 may provide, to the member 118, a survey or questionnaire through which the member 118 may provide identifying information associated with the member 118. The responses provided by the member 118 to this survey or questionnaire may be used by the task facilitation service 102 to generate an initial member profile corresponding to the member 118. In an embodiment, once the representative assignment system 104 has assigned a representative to the member 118, the task facilitation service 102 can prompt the member 118 to generate a new member profile corresponding to the member 118. For instance, the task facilitation service 102 may provide the member 118 with a survey or questionnaire that includes a set of questions that may be used to supplement the information previously provided during the aforementioned onboarding process. For example, through the survey or questionnaire, the task facilitation service 102 may prompt the member 118 to provide additional information about family members, important dates (e.g., birthdays, etc.), dietary restrictions, and the like. Based on the responses provided by the member 118, the task facilitation service 102 may update the member profile corresponding to the member 118.

In an embodiment, once the representative assignment system 104 has assigned a particular representative to the member 118, the representative assignment system 104 notifies the member 118 and the particular representative of the pairing. Further, the representative assignment system 104 may establish a chat session or other communications session between the member 118 and the assigned representative to facilitate communications between the member 118 and representative. For instance, via an application provided by the task facilitation service 102 and installed on the computing device 120 or through a web portal provided by the task facilitation service 102, the member 118 may exchange messages with the assigned representative over the chat session or other communication session. Similarly, the representative may be provided with an interface through which the representative may exchange messages with the member 118.

In some instances, the member 118 may initiate or otherwise resume a chat session with an assigned representative. For example, via the application provided by the task facilitation service 102 or through a web portal provided by the task facilitation service 102, the member may transmit a message to the representative over the chat session or other communication session to communicate with the representative. The member 118 can submit a message to the representative to indicate that the member 118 would like assistance with a particular task. As an illustrative example, the member 118 can submit a message to the representative to indicate that the member 118 would like the representative's assistance with regard to an upcoming move to Bayamón in the coming months. The representative, via an interface provided by the task facilitation service 102, may be presented with the submitted message. Accordingly, the representative may evaluate the message and generate a corresponding task that is to be performed to assist the member 118. For instance, the representative, via the interface provided by the task facilitation service 102, may access a task template, through which the representative may provide information related to the task or project. The information may include information related to the member 118 (e.g., member name, member address, etc.) as well as various parameters of the task itself (e.g., allocated budget, timeframe for completion of the task, and the like). The parameters of the task may further include any member preferences (e.g., preferred brands, preferred third-party services 116, etc.). In some instances, the information may be provided through a member profile associated with the member 118. For instance, the representative may access the member profile associated with the member 118 to obtain the information related to the member 118. In an embodiment, the task facilitation service 102 can automatically populate the task template using the member profile.

In an embodiment, the representative can provide the information obtained from the member 118 for the task specified in the one or more messages exchanged between the member 118 and representative to a task recommendation system 112 of the task facilitation service 102 to dynamically, and in real-time, identify any additional task parameters that may be required for generating one or more proposals for completion of the task. The task recommendation system 112 may be implemented using a computer system or as an application or other executable code implemented on a computer system of the task facilitation service 102. The task recommendation system 112, in an embodiment, provides the representative with an interface through which the representative may generate a task that may be presented to the member over the communications session corresponding to the task (e.g., via the application or web portal utilized by the member 118, etc.) and that may be completed by the representative and/or one or more third-party services 116 for the benefit of the member 118. For instance, the representative may provide a name for the task, any known parameters of the task as provided by the member (e.g., budgets, timeframes, task operations to be performed, etc.), and the like. As an illustrative example, if the member 118 transmits the message "Hey Russell, can you help with our move to Bayamón in 2 months," the representative may evaluate the message and generate a task entitled "Move to Bayamón." For this task, the representative may indicate that the timeframe for completion of the task is two months, as indicated by the member 118. Further, the representative may add additional information known to the representative about the member, as determined through the representative's own knowledge or through review of the member profile. For example, the representative may indicate any preferred moving companies, any budgetary constraints, and the like.

In an embodiment, the representative can provide the generated task to the task recommendation system 112 to determine whether additional member input is needed for creation of a proposal that may be presented to the member for completion of the task. The task recommendation system 112, for instance, may process the generated task and information corresponding to the member 118 from the user data storage 108 using a machine learning algorithm or artificial intelligence to automatically identify additional parameters for the task, as well as any additional information that may be required from the member 118 for the generation of proposals. For instance, the task recommendation system 112 may use the generated task, information corresponding to the member 118 (e.g., the member profile), and historical data corresponding to tasks performed for other similarly situated members as input to the machine learning algorithm or artificial intelligence to identify any additional parameters that may be automatically completed for the task and any additional information that may be required of the member 118 for defining the task. For example, if the task is related to an upcoming move to another city, the task recommendation system 112 may utilize the machine learning algorithm or artificial intelligence to identify similarly situated members (e.g., members within the same geographic area of member 118, members having similar task delegation sensibilities, members having performed similar tasks, etc.). Based on the task generated for the member 118, characteristics of the member 118 from the member profile stored in the user data storage 108 and data corresponding to these similarly situated members, the task recommendation system 112 may provide additional parameters for the task. As an illustrative example, for the aforementioned task, "Move to Bayamón," the task recommendation system 112 may provide a recommended budget for the task, one or more moving companies that the member 118 may approve of (as used by other similarly situated members with positive feedback), and the like. The representative may review these additional parameters and select one or more of these parameters for inclusion in the task.

In an embodiment the task recommendation system 112 can use information in the task data storage 110 regarding the third-party services 116 to generate proposal recommendations for a task (e.g., information generated by the task coordination system 114 and stored in the task data storage 110). For example, previous performance on one or more previous tasks that are the same as, or similar to, a task may be used to determine the suitability of recommending a particular third-party or other entity associated with the task facilitation service 102 to perform a task. Such suitability may be referred to herein as a "suitability metric" and may be used herein to refer to the suitability of any recommendation from the task facilitation service that may be presented to a member. Similarly, other information about the third-party services 116 may be used to determine the suitability of recommending a particular third-party or other entity associated with the task facilitation service 102 to perform a task. For example, comparing the location of the third-party or other entity associated with the task facilitation service 102 to a location where the task is to be performed (e.g., the member's home) may be used to determine the suitability of recommending that third-party or other entity associated with the task facilitation service 102 to perform the task. Similarly, where budgetary considerations are a determining factor in performing a task, the task recommendation system 112 may use the previous and/or current rate of a particular third-party or other entity associated with the task facilitation service 102 stored in the task data storage 110 to determine the suitability of recommending that third-party to perform the task.

In some embodiments, parameters associated with a particular third-party or other entity associated with the task facilitation service 102 can be compared against similar parameters of other third parties and other entities associated with the task facilitation service 102 to determine the suitability of recommending that third-party or other entity associated with the task facilitation service 102 to perform the task. For example, the cost associated with a particular third-party or other entity associated with the task facilitation service 102 as compared to the cost associated with other third parties and other entities associated with the task facilitation service 102 may be used by the task recommendation system 112 to determine the suitability of recommending that third-party or other entity associated with the task facilitation service 102 to perform the task. In another example, the cost associated with a particular third-party or other entity associated with the task facilitation service 102 as compared to the average cost of all other third parties or other entities associated with the task facilitation service 102 may be used by the task recommendation system 112 to determine the suitability of recommending that third-party or other entity associated with the task facilitation service 102 to perform the task. In an embodiment, the task recommendation system 112 can coordinate with the task coordination system 114 to determine the suitability of a particular third-party or other entity associated with the task facilitation service 102 to perform a task and/or to provide proposal recommendations for that task.

If the task recommendation system 112 determines that additional member input is required for the task, the task recommendation system 112 may provide the representative with recommendations for questions that may be presented to the member 118 regarding the task. Returning to the "Move to Bayamón" task example, if the task recommendation system 112 determines that it is important to understand one or more parameters of the member's home (e.g., square footage, number of rooms, etc.) for the task, the task recommendation system 112 may provide a recommendation to the representative to prompt the member 118 to provide these one or more parameters. The representative may review the recommendations provided by the task recommendation system 112 and, via the a task-specific interface corresponding to the project or task, prompt the member 118 to provide the additional task parameters. This process may reduce the number of prompts provided to the member 118 in order to define a particular task, thereby reducing the cognitive load on the member 118. In some instances, rather than providing the representative with recommendations for questions that may be presented to the member 118 regarding the task, the task recommendation system 112 can automatically present these questions to the member 118 via the a task-specific interface corresponding to the project or task. For instance, if the task recommendation system 112 determines that a question related to the square footage of the member's home is required for the task, the task recommendation system 112 may automatically prompt the member 118, via the a task-specific interface corresponding to the project or task, to provide the square footage for the member's home.

In an embodiment, once the representative has obtained the necessary task-related information from the member 118 and/or through the task recommendation system 112 (e.g., task parameters garnered via evaluation of tasks performed for similarly situated members, task parameters garnered from the member profile associated with the member 118, etc.), the representative can utilize a task coordination system 114 of the task facilitation service 102 to generate one or more proposals for resolution of the task. The task coordination system 114 may be implemented using a computer system or as an application or other executable code implemented on a computer system of the task facilitation service 102. In some examples, the representative may utilize a resource library maintained by the task coordination system 114 to identify one or more third-party services 116 and/or resources (e.g., retailers, restaurants, websites, brands, types of goods, particular goods, etc.) that may be used for performance of the task for the benefit of the member 118 according to the one or more task parameters identified by the representative and the task recommendation system 112, as described above. A proposal may specify a timeframe for completion of the task, identification of any third-party services 116 or other entities associated with the task facilitation service 102 (if any) that are to be engaged for completion of the task, a budget estimate for completion of the task, resources or types of resources to be used for completion of the task, and the like. The representative may present the proposal to the member 118 via the task-specific interface corresponding to the project or task to solicit a response from the member 118 to either proceed with the proposal or to provide an alternative proposal for completion of the task.

In an embodiment, the task recommendation system 112 can provide the representative with a recommendation as to whether the representative should provide the member 118 with a proposal and provide the member with an option to defer to the representative with regard to completion of the defined task. For instance, in addition to providing member and task-related information to the task recommendation system 112 to identify additional parameters for the task, the representative may indicate its recommendation to the task recommendation system 112 to either present the member 118 with one or more proposals for completion of the task and to either present or omit an option to defer to the representative for completion of the task. The task recommendation system 112 may utilize the machine learning algorithm or artificial intelligence to generate the aforementioned recommendation. The task recommendation system 112 may utilize the information provided by the representative, as well as data for similarly situated members from the user data storage 108 and task data corresponding to similar tasks from a task data storage 110 (e.g., tasks having similar parameters to the submitted task, tasks performed on behalf of similarly situated members, etc.), to determine whether to recommend presentation of one or more proposals for completion of the task and whether to present the member 118 with an option to defer to the representative for completion of the task.

If the representative determines that the member is to be presented with an option to defer to the representative for completion of the task, the representative may present this option to the member over the chat session. The option may be presented in the form of a button or other graphical user interface (GUI) element that the member may select to indicate its approval of the option. For example, the member may be presented with a "Run With It" button to provide the member with an option to defer all decisions related to performance of the task to the representative. If the member 118 selects the option, the representative may present a proposal that has been selected by the representative for completion of the task on behalf of the member 118 and may proceed to coordinate with one or more third-party services 116 for performance and completion of the task according to the proposal. Thus, rather than allowing the member 118 to select a particular proposal for completion of the task, the representative may instead select a particular proposal on behalf of the member 118. The proposal may still be presented to the member 118 in order for the member 118 to verify how the task is to be completed. Any actions taken by the representative on behalf of the member 118 for completion of the task may be recorded in an entry corresponding to the task in the task data storage 110. Alternatively, if the member 118 rejects the option and instead indicates that the representative is to provide one or more proposals for completion of the task, the representative may generate one or more proposals, as described above.

In an embodiment, a representative may recommend one or more curated experiences that may be appealing to the member 118 to take their mind off of urgent matters and to spend more time on themselves and their families. As noted above, during an onboarding process, a member 118 may be prompted to indicate any of its interests or hobbies that the member 118 finds enjoyable. Further, as the representative continues its interactions with the member 118 over the chat session, the representative may prompt the member 118 to provide additional information regarding its interests in a natural way. For instance, a representative may ask the member 118 "what will you be doing this weekend?" Based on the member response, the representative may update the member profile corresponding to the member 118 to indicate the member's preferences. Thus, over time, the representative and the task facilitation service 102 may develop a deeper understanding of the member's interests and hobbies.

In an embodiment, the task facilitation service 102 generates, in each geographic market in which the task facilitation service 102 operates, a set of experiences that may be available to members. For each available experience, the task facilitation service 102 can generate a template that includes both the information required from a member 118 to plan the experience on behalf of the member 118 and a skeleton of what the proposal for the experience recommendation will look like when presented to the member 118. This may make it easier for a representative to complete definition of task(s) associated with the experience. In some instances, the template may incorporate data from various sources that provide high-quality recommendations, such as travel guides, food and restaurant guides, reputable publications, and the like.

In an embodiment, the task recommendation system 112, periodically (e.g., monthly, bi-monthly, etc.) or in response to a triggering event (e.g., a set number of tasks are performed, member request, etc.), selects a set of experiences that may be recommended to the member 118. If the member 118 selects a particular experience recommendation corresponding to an experience that the member 118 would like to have curated on its behalf, the task recommendation system 112 or representative may generate one or more new tasks related to the curation of the selected experience recommendation.

Similar to the process described above for the completion of a task for the benefit of a member 118, the representative can generate one or more proposals for curation of a selected experience. For instance, the representative may generate a proposal that provides, amongst other things, a list of days/times for the experience, a list of possible venues for the experience (e.g., parks, movie theaters, hiking trails, etc.), a list of possible meal options and corresponding prices, options for delivery or pick-up of meals, and the like. The various options in a proposal may be presented to the member 118 via a task-specific interface corresponding to the selected experience.

Based on the member responses to the various options presented in the proposal, representative may indicate that it is starting the curation process for the experience. Further, the representative may provide information related to the experience that may be relevant to the member 118. For example, if the member 118 has selected an option to pick-up food from a selected restaurant for a weekend picnic, the representative may provide detailed driving directions from the member's home to the restaurant to pick up the food (this would not be presented if the member 118 had selected a delivery option), detailed driving directions from the restaurant to the selected venue, parking information, a listing of the food that is to be ordered, and the total price of the food order. The member 118 may review this proposal and may determine whether to accept the proposal. If the member 118 accepts the proposal, the representative may proceed to perform various tasks to curate the selected experience.

Once a member 118 has selected a particular proposal for a particular task, or has selected a button or other GUI element associated with the particular task to indicate that it wishes to defer to the representative for performance of the task, if the task is to be completed using third-party services 116, the representative may coordinate with one or more third-party services 116 for completion of the task for the benefit of the member 118. For instance, the representative may utilize a task coordination system 114 of the task facilitation service 102 to identify and contact one or more third-party services 116 for performance of a task. As noted above, the task coordination system 114 may include a resource library that includes detailed information related to third-party services 116 and other entities that may be available for the performance of tasks on behalf of members of the task facilitation service 102. For example, an entry for a third-party service in the resource library may include contact information for the third-party service, any available price sheets for services or goods offered by the third-party service, listings of goods and/or services offered by the third-party service, hours of operation, ratings or scores according to different categories of members, and the like. The representative may query the resource library to identify the one or more third-party services that are to perform the task and determine an estimated cost for performance of the task. In some instances, the representative may contact the one or more third-party services 116 to obtain quotes for completion of the task and to coordinate performance of the task for the benefit of the member 118.

In some instances, the resource library may further include detailed information corresponding to other services and other entities that may be associated or affiliated with the task facilitation service 102 and that are contracted to perform various tasks on behalf of members of the task facilitation service 102. These other services and other entities may provide their services or goods at rates agreed upon with the task facilitation service 102. Thus, if the representative selects any of these other services or other entities from the resource library, the representative may be able to determine the particular parameters (e.g., price, availability, time required, etc.) for completion of the task.

In an embodiment, for a given task, the representative can query the resource library to identify one or more third-party services and other services/entities affiliated with the task facilitation service 102 from which to solicit quotes for completion of the task. For instance, for a newly created task, the representative may transmit a job offer to these one or more third-party services and other services/entities. The job offer may indicate various characteristics of the task that is to be completed (e.g., scope of the task, general geographic location of the member 118 or of where the task is to be completed, desired budget, etc.). Through an application or web portal provided by the task facilitation service 102, a third-party service or other service/entity may review the job offer and determine whether to submit a quote for completion of the task or to decline the job offer. If a third-party service or other service/entity opts to reject the job offer, the representative may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like.

The representative may use any provided quotes from the third-party services and/or other services/entities to generate different proposals for completion of the task. These different proposals may be presented to the member 118 through the task-specific interface corresponding to the particular task that is to be completed. If the member 118 selects a particular proposal from the set of proposals presented through the task-specific interface, the representative may transmit a notification to the third-party service or other service/entity that submitted the quote associated with the selected proposal to indicate that it has been selected for completion of the task. Accordingly, the representative may utilize a task coordination system 114 to coordinate with the third-party service or other service/entity for completion of the task, as described in greater detail herein.

In some instances, if the task is to be completed by the representative 106, the representative 106 may utilize the task coordination system 114 of the task facilitation service 102 to identify any resources that may be utilized by the representative 106 for performance of the task. The resource library may include detailed information related to different resources available for performance of a task. As an illustrative example, if the representative 106 is tasked with purchasing a set of filters for the member's home, the representative 106 may query the resource library to identify a retailer that may sell filters of a quality and/or price that is acceptable to the member 118 and that corresponds to the proposal accepted by the member 118. Further, the representative 106 may obtain, from the user data storage 108, available payment information of the member 118 that may be used to provide payment for any resources required by the representative 106 to complete the task. Using the aforementioned example, the representative 106 may obtain payment information of the member 118 from the user data storage 108 to complete a purchase with the retailer for the set of filters that are to be used in the member's home.

In an embodiment, the task coordination system 114 uses a machine learning algorithm or artificial intelligence to select one or more third-party services 116 and/or resources on behalf of the representative for performance of a task. For instance, the task coordination system 114 may utilize the selected proposal or parameters related to the task (e.g., if the member 118 has deferred to the representative for determination of how the task is to be performed), as well as historical task data from the task data storage 110 corresponding to similar tasks as input to the machine learning algorithm or artificial intelligence. The machine learning algorithm or artificial intelligence may produce, as output, a listing of one or more third-party services 116 and/or other entities affiliated with the task facilitation service 102 that may perform the task with a high probability of satisfaction to the member 118. If the task is to be performed by the representative 106, the machine learning algorithm or artificial intelligence may produce, as output, a listing of resources (e.g., retailers, restaurants, brands, etc.) that may be used by the representative 106 for performance of the task with a high probability of satisfaction to the member 118.

In some instances, if the task cannot be completed by the third-party service or other service/entity according to the estimates provided in the selected proposal, the member 118 may be provided with an option to cancel the particular task or otherwise make changes to the task. For instance, if the new estimated cost for performance of the task exceeds the maximum amount specified in the selected proposal, the member 118 may ask the representative to find an alternative third-party service or other service/entity for performance of the task within the budget specified in the proposal. Similarly, if the timeframe for completion of the task is not within the timeframe indicated in the proposal, the member 118 can ask the representative to find an alternative third-party service or other service/entity for performance of the task within the original timeframe. The member's interventions may be recorded by the task recommendation system 112 and the task coordination system 114 to retrain their corresponding machine learning algorithms or artificial intelligence to better identify third-party services 116 or other services/entities that may perform tasks within the defined proposal parameters.

In an embodiment, once the representative has contracted with one or more third-party services 116 or other services/entities for performance of a task, the task coordination system 114 may monitor performance of the task by these third-party services 116 or other services/entities. For instance, the task coordination system 114 may record any information provided by the third-party services 116 or other services/entities with regard to the timeframe for performance of the task, the cost associated with performance of the task, any status updates with regard to performance of the task, and the like. The task coordination system 114 may associate this information with the data record in the task data storage 110 corresponding to the task being performed. Status updates provided by third-party services 116 or other services/entities may be provided automatically to the member 118 via the application or web portal provided by the task facilitation service 102 and to the representative.

In an embodiment, if the task is to be performed by the representative 106, the task coordination system 114 can monitor performance of the task by the representative 106. For instance, the task coordination system 114 may monitor, in real-time, any communications between the representative 106 and the member 118 regarding the representative's performance of the task. These communications may include messages from the representative 106 indicating any status updates with regard to performance of the task, any purchases or expenses incurred by the representative 106 in performing the task, the timeframe for completion of the task, and the like. The task coordination system 114 may associate these messages from the representative 106 with the data record in the task data storage 110 corresponding to the task being performed.

As noted above, once a task has been completed, the member 118 may be prompted to provide feedback with regard to completion of the task. For instance, the member 118 may be prompted to provide feedback with regard to the performance and professionalism of the selected third-party services 116 in performance of the task. Further, the member 118 may be prompted to provide feedback with regard to the quality of the proposal provided by the representative and as to whether the performance of the task has addressed the underlying issue associated with the task. Using the responses provided by the member 118, the task facilitation service 102 may train or otherwise update the machine learning algorithms or artificial intelligence utilized by the task recommendation system 112 and the task coordination system 114 to provide better identification of tasks, better generation of proposals, better identification of third-party services 116 for completion of tasks for the benefit of the member 118 and other similarly-situated members, better identification of resources that may be provided to the representative 106 for performance of a task for the benefit of the member 118, and the like.

In an embodiment, the task recommendation system 112 may automatically update the member profile and the resource library in real-time based on member interaction with the proposal. For example, if the member 118 indicates, through a chat session or other communications session associated with the project or task for which the proposal was presented, that the proposal is unacceptable (e.g., does not include any appealing options, does not include appealing recommendations for the presented options, etc.), the task recommendation system 112 may update the member profile to indicate that the provided proposal for the particular task or project was not well received by the member 118. Thus, for similar projects or tasks, a representative may review the member profile and readily determine that the provided proposal options and/or proposal recommendations should not be used as the basis for new proposal options and/or proposal recommendations for the similar projects or tasks. Alternatively, if the member 118 selects a particular proposal recommendation for a proposal option associated with a project or task, and the member 118 provides positive feedback with regard to this proposal recommendation, the task recommendation system 112 may update the member profile to indicate that the provided proposal for the particular task or project was well received by the member 118 and that the proposal recommendation selected by the member 118 may be used for similar projects or tasks in the future. These updates may also be propagated to the resource library such that, for similar projects and tasks, other representatives may be able to readily identify proposal recommendations that may be well suited for proposal options associated with these similar projects and tasks.

It should be noted that for the processes described herein, various operations performed by the representative 106 may be additionally, or alternatively, performed using one or more machine learning algorithms or artificial intelligence. For example, as the representative 106 performs or otherwise coordinates performance of tasks on behalf of a member 118 over time, the task facilitation service 102 may continuously and automatically update the member's profile according to member feedback related to the performance of these tasks by the representative 106 and/or third-party services 116. In an embodiment, the task recommendation system 112, after a member's profile has been updated over a period of time (e.g., six months, a year, etc.) or over a set of tasks (e.g., twenty tasks, thirty tasks, etc.), may utilize a machine learning algorithm or artificial intelligence to automatically and dynamically generate new tasks based on the various attributes of the member's profile (e.g., historical data corresponding to member-representative communications, member feedback corresponding to representative performance and presented tasks/proposals, etc.) with or without representative interaction. The task recommendation system 112 may automatically communicate with the member 118 to obtain any additional information required for new tasks and automatically generate proposals that may be presented to the member 118 for performance of these tasks. The representative 106 may monitor communications between the task recommendation system 112 and the member 118 to ensure that the conversation maintains a positive polarity (e.g., the member 118 is satisfied with its interaction with the task recommendation system 112 or other bot, etc.). If the representative 106 determines that the conversation has a negative polarity (e.g., the member 118 is expressing frustration, the task recommendation system 112 or bot is unable to process the member's responses or asks, etc.), the representative 106 may intervene in the conversation. This may allow the representative 106 to address any member concerns and perform any tasks on behalf of the member 118.

Thus, unlike automated customer service systems and environments, wherein these systems and environment may have little to no knowledge of the users interacting with agents or other automated systems, the task recommendation system 112 can continuously update the member profile to provide up-to-date historical information about the member 118 based on the member's automatic interaction with the system or interaction with the representative 106 and on the tasks performed on behalf of the member 118 over time. This historical information, which may be automatically and dynamically updated as the member 118 or the system interacts with the representative 106 and as tasks are devised, proposed, and performed for the member 118 over time, may be used by the task recommendation system 112 to anticipate, identify, and present appropriate or intelligent responses to member 118 queries, needs, and/or goals.

Figure 2:
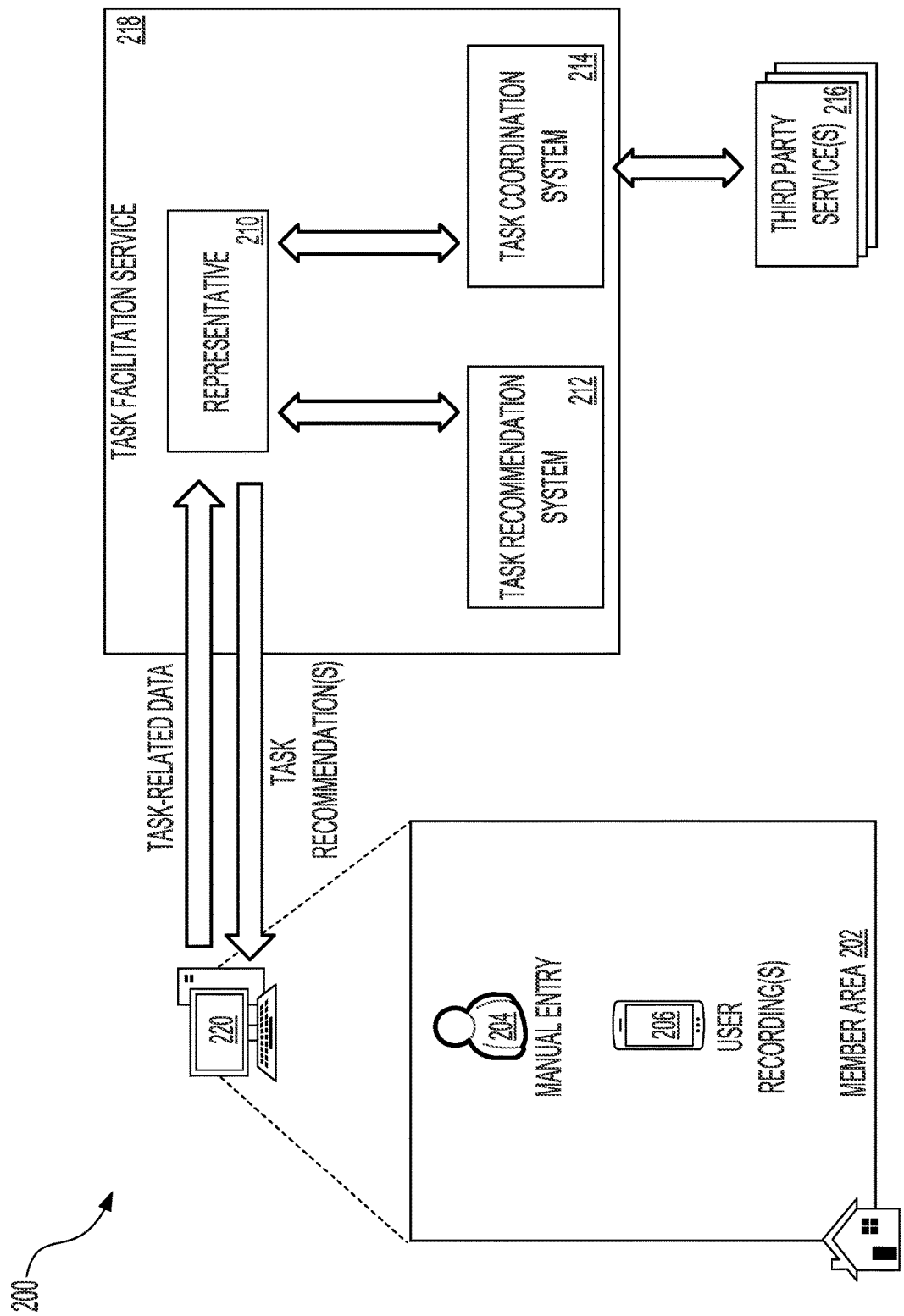
FIG. 2 shows an illustrative example of an environment in which task-related data is collected and aggregated from a member area to identify one or more tasks that can be recommended to the member for performance by a representative and/or third-party services in accordance with at least one embodiment.

FIG. 2 shows an illustrative example of an environment 200 in which task-related data is collected and aggregated from a member area 202 to identify one or more tasks that can be recommended to the member for delegation and performance by the representative 210 and/or third-party services 216 in accordance with at least one embodiment. In the environment 200, a member, via a computing device 220 (e.g., laptop computer, smartphone, etc.), may transmit task-related data to the representative 210 assigned to the member to identify one or more tasks that may be performed for the benefit of the member. For example, in an embodiment, the member can manually enter one or more tasks that the member would like to delegate to the representative 210 for performance. The task facilitation service 218 may provide, to the member and via an application or web portal provided by the task facilitation service 218, a task template for manual entry 204 of a task that may be delegated to the representative 210 or that may otherwise be added to the member's list of tasks.

In an embodiment, the task template provided to the member may be tailored specifically according to the characteristics of the member identified by the task facilitation service 218 and defined in a member profile associated with the member. The member profile or model may define a set of attributes of the member that may be used by a representative 210 to determine how best to approach the member in conversation, in recommending tasks and proposals to the member, and in performance of the tasks for the benefit of the member. Based on these member attributes, the task facilitation service 218 may omit particular fields from the task template.

If the member submits, via the computing device 220 or through an interface provided by the task facilitation service 218, a completed task template corresponding to a task that is to be performed for the benefit to the member, the representative 210 assigned to the member may obtain the form and initiate evaluation of the task to determine how best to perform the task for the benefit of the member. For instance, the representative 210 may evaluate the completed task template and generate a new task for the member corresponding to the task-related details provided by the member in the completed task template. Further, based on the representative's knowledge of the member (e.g., from interaction with the member, from the member profile, etc.), the representative 210 may determine whether to prompt the member for additional information that may be used to determine how best to perform the task for the benefit of the member. For instance, if the member has indicated that they wish to have their gutters cleaned but has not indicated when the gutters should be cleaned via the completed task template, the representative 210 may communicate with the member via an active communications session associated with the newly created task to inquire as to the timeframe for cleaning of the member's gutters. As another example, if the member has submitted a task without a particular budget for performance of the task, and the representative 210 knows (e.g., based on the member profile, personal knowledge of the member, etc.) that the member is budget-conscious, the representative 210 may communicate with the member to determine what the budget should be for performance of the task. Any information obtained in response to these communications may be used to supplement the member profile such that, for future tasks, this newly obtained information may be automatically retrieved from the member profile without requiring additional prompts to the member.

In an embodiment, a member, via a computing device 220, can submit one or more user recordings 206 that may be used to identify tasks that can be performed for the benefit of the member. For instance, a member may upload, to the task facilitation service 218, one or more digital images of the member area 202 that may be indicative of issues within the member area 202 for which tasks may be created. As an illustrative example, the member may capture an image of a broken baseboard that is in need of repair. As another illustrative example, the member may capture an image of a clogged gutter. The representative 210 may obtain these digital images and manually identify one or more tasks that may be performed to address the issues represented in the uploaded digital images. For instance, if the representative 210 receives a digital image that illustrates a broken baseboard, the representative 210 may generate a new task corresponding to the repair of the broken baseboard. Similarly, if the representative 210 receives a digital image that illustrates a clogged gutter, the representative 210 may generate a task corresponding to the cleaning of the member's gutters.

The one or more user recordings 206 may further include audio and/or video recordings within the member area 202 corresponding to possible issues for which tasks may be generated. These audio and/or video recordings may be reviewed by the representative 210 to identify any tasks that may be performed for the benefit of the member. Using the example of the broken baseboard described above, the member may record a video highlighting the broken baseboard while indicating "I would like to have this baseboard fixed soon as we're getting ready to sell the house." This video, thus, may highlight an issue related to a broken baseboard and a level of urgency in having the baseboard repaired within a short timeframe due to the member selling their home.

In an embodiment, a representative 210 can generate one or more proposals for completion of any given task presented to the member via the application or web portal provided by the task facilitation service 218. A proposal may include one or more options (also referred to herein as "recommendations") presented to a member that may be created and/or collected by a representative 210 while researching a given task. In some instances, a representative 210 may be provided with one or more templates that may be used to generate these one or more proposals. For example, the task facilitation service 218 may maintain proposal templates for different task types, whereby a proposal template for a particular task type may include various data fields associated with the task type. As an illustrative example, for a task associated with planning a birthday party, a representative 210 may utilize a proposal template corresponding to event planning. The proposal template corresponding to event planning may include data fields corresponding to venue options, catering options, entertainment options, and the like.

In an embodiment, the data fields within a proposal template can be toggled on or off to provide a representative 210 with the ability to determine what information is presented to the member in a proposal. For example, for a task associated with renting a balloon jump house for a party, a corresponding proposal template may include data fields corresponding to the location/address of a rental business, the business hours and availability of the rental business, an estimated cost, ratings/reviews for the rental business, and the like. The representative 210, based on its knowledge of the member's preferences, may toggle on or off any of these data fields. For example, if the representative 210 has established a relationship with the member whereby the representative 210, with high confidence, knows that the member trusts the representative 210 in selecting reputable businesses for its tasks, the representative 210 may toggle off a data field corresponding to the ratings/reviews for corresponding businesses from the proposal template. Similarly, if the representative 210 knows that the member is not interested in the location/address of the rental business for the purpose of the proposal, the representative 210 may toggle off the data field corresponding to the location/address for corresponding businesses from the proposal template. While certain data fields may be toggled off within the proposal template, the representative 210 may complete these data fields to provide additional information that may be used by the task facilitation service 218 to supplement a resource library of proposals as described in greater detail herein.

In an embodiment, the task facilitation service 218 utilizes a machine learning algorithm or artificial intelligence to generate recommendations for the representative 210 regarding data fields that may be presented to the member in a proposal. For example, the task facilitation service 218 may use, as input to the machine learning algorithm or artificial intelligence, a member profile or model associated with the member, historical task data for the member (e.g., previously completed tasks, tasks for which proposals have been provided, etc.), and information corresponding to the task for which a proposal is being generated (e.g., a task type or category, etc.). The output of the machine learning algorithm or artificial intelligence may define which data fields of a proposal template should be toggled on or off. For example, if the task facilitation service 218 determines, based on an evaluation of the member profile or model, historical task data for the member, and the information corresponding to the task for which the proposal is being generated, that the member is likely not interested in viewing information related to the ratings/reviews for the business nor the location/address of the business, the task facilitation service 218 may automatically toggle off these data fields from the proposal template. The task facilitation service 218, in some instances, may retain the option to toggle on these data fields in order to provide the representative 210 with the ability to present these data fields to the member in a proposal. For example, if the task facilitation service 218 has automatically toggled off a data field corresponding to the estimated cost for a balloon jump house rental from a particular business, but the member has expressed an interest in the possible cost involved, the representative 210 may toggle on the data field corresponding to the estimated cost.

In some instances, when a proposal is presented to a member, the task facilitation service 218 may monitor member interaction with the representative 210 and with the proposal to obtain data that may be used to further train the machine learning algorithm or artificial intelligence. For example, if a representative 210 presents a proposal without any ratings/reviews for a particular business based on the recommendation generated by the machine learning algorithm or artificial intelligence, and the member indicates (e.g., through messages to the representative 210, through selection of an option in the proposal to view ratings/reviews for the particular business, etc.) that they are interested in ratings/reviews for the particular business, the task facilitation service may utilize these feedback to further train the machine learning algorithm or artificial intelligence to increase the likelihood of recommending presentation of ratings/reviews for businesses selected for similar tasks or task types.

In an embodiment, the task facilitation service 218 maintains, via the task coordination system 214 (which is the same as the task coordination system 114 described herein at least in connection with FIG. 1), a resource library that may be used to automatically populate one or more data fields of a particular proposal template. The resource library may include entries corresponding to businesses and/or products previously used by representatives for proposals related to particular tasks or task types or that are otherwise associated with particular tasks or task types. For instance, when a representative 210 generates a proposal for a task related to repairing a roof near Lynnwood, Washington, the task coordination system 214 may obtain information associated with the roofer selected by the representative 210 for the task. The task coordination system 214 may generate an entry corresponding to the roofer in the resource library and associate this entry with "roof repair" and "Lynnwood, Washington" Thus, if another representative receives a task corresponding to repairing a roof for a member located near Lynnwood, Washington (e.g., Everett, Washington), the other representative may query the resource library for roofers near Lynnwood, Washington. The resource library may return, in response to the query, an entry corresponding to the roofer previously selected by the representative 210. If the other representative selects this roofer, the task coordination system 214 may automatically populate the data fields of the proposal template with the information available for the roofer from the resource library.

The representative 210, via a proposal template, may generate additional proposal options for businesses and/or products that may be used for completion of a task. For instance, for a particular proposal, the representative 210 may generate a recommended option, which may correspond to the business or product that the representative 210 is recommending for completion of a task. Additionally, in order to provide the member with additional options or choices, the representative 210 can generate additional options corresponding to other businesses or products that may complete the task. In some instances, if the representative 210 knows that the member has delegated the decision-making with regard to completion of a task to the representative 210, the representative 210 may forego generation of additional proposal options outside of the recommended option. However, the representative 210 may still present, to the member, the selected proposal option for completion of the task in order to keep the member informed about the status of the task.

In an embodiment, once the representative 210 has completed defining a proposal via use of a proposal template, the task facilitation service 218 may present the proposal to the member through the application or web portal provided by the task facilitation service 218. In some instances, the representative 210 may transmit a notification to the member to indicate that a proposal has been prepared for a particular task and that the proposal is ready for review via the application or web portal provided by the task facilitation service 218. The proposal presented to the member may indicate the task for which the proposal was prepared, as well as an indication of the one or more options that are being provided to the member. For instance, the proposal may include links to the recommended proposal option and to the other options (if any) prepared by the representative 210 for the particular task. These links may allow the member to navigate amongst the one or more options prepared by the representative 210 via the application or web portal.

For each proposal option, the member may be presented with information corresponding to the business (e.g., third-party service or other service/entity associated with the task facilitation service 218) or product selected by the representative 210 and corresponding to the data fields selected for presentation by the representative 210 via the proposal template. For example, for a task associated with a roof inspection at the member's home, the representative 210 may present for a particular roofer (e.g., proposal option) one or more reviews or testimonials for the roofer, the rate and availability for the roofer subject to the member's task completion timeframe (if any), the roofer's website, the roofer's contact information, any estimated costs, and an indication of next steps for the representative 210 should the member select this particular roofer for the task. In some instances, the member may select what details or data fields associated with a particular proposal are presented via the application or web portal. For example, if the member is presented with the estimated total for each proposal option and the member is not interested in reviewing the estimated total for each proposal option, the member may toggle off this particular data field from the proposal via the application or web portal. Alternatively, if the member is interested in reviewing additional detail with regard to each proposal option (e.g., additional reviews, additional business or product information, etc.), the member may request this additional detail to be presented via the proposal.

In an embodiment, based on member interaction with a provided proposal, the task facilitation service 218 can further train a machine learning algorithm or artificial intelligence used to determine or recommend what information should be presented to the member and to similarly-situated members for similar tasks or task types. As noted above, the task facilitation service 218 may use a machine learning algorithm or artificial intelligence to generate recommendations for the representative 210 regarding data fields that may be presented to the member in a proposal. The task facilitation service 218 may monitor or track member interaction with the proposal to determine the member's preferences regarding the information presented in the proposal for the particular task. Further, the task facilitation service 218 may monitor or track any messages exchanged between the member and the representative 210 related to the proposal to further identify the member's preferences. For example, if the member sends a message to the representative 210 indicating that the member would like to see more information with regard to the services offered by each of the businesses specified in the proposal, the task facilitation service 218 may determine that the member may want to see additional information with regard to the services offered by businesses associated with the particular task or task type. In some instances, the task facilitation service 218 may solicit feedback from the member with regard to proposals provided by the representative 210 to identify the member's preferences. This feedback and information garnered through member interaction with the representative 210 regarding the proposal and with the proposal itself may be used to retrain the machine learning algorithm or artificial intelligence to provide more accurate or improved recommendations for information that should be presented to the member and to similarly situated members in proposals for similar tasks or task types.

In some instances, each proposal presented to the member may specify any costs associated with each proposal option. These costs may be presented in different formats based on the requirements of the associated task or project. For instance, if a task or project corresponds to the purchase of an airline ticket, each proposal option for the corresponding proposal may present a fixed price for the airline ticket. As another illustrative example, a representative 210 can provide, for each proposal option, a budget for completion of the task according to the selected option (e.g., "will spend up to $150 on Halloween decorations for the party"). As yet another illustrative example, for tasks or projects where payment schedules may be involved, proposal options for a proposal related to a task or project may specify the payment schedule for each of these proposal options (e.g., "$100 for the initial consultation, with $300 for follow-up servicing," "$1,500 up-front to reserve the venue, with $1,500 due after the event," etc.).

If a member accepts a particular proposal option for a task or project, the representative 210 may communicate with the member to ensure that the member is consenting to payment of the presented costs and any associated taxes and fees for the particular proposal option. In some instances, if a proposal option is selected with a static payment amount (e.g., fixed price, "up to $X," phased payment schedules with static amounts, etc.), the member may be notified by the representative 210 if the actual payment amount required for fulfillment of the proposal option exceeds a threshold percentage or amount over the originally presented static payment amount. For example, if the representative 210 determines that the member may be required to spend more than 120% of the cost specified in the selected proposal option, the representative 210 may transmit a notification to the member to re-confirm the payment amount before proceeding with the proposal option.

In an embodiment, if a member accepts a proposal option from the presented proposal, the task facilitation service 218 moves the task associated with the presented proposal to an executing state and the representative 210 can proceed to execute on the proposal according to the selected proposal option. For instance, the representative 210 may contact one or more third-party services 216 to coordinate performance of the task according to the parameters defined in the proposal accepted by the member.

In an embodiment, the representative 210 utilizes the task coordination system 214 to assist in the coordination of performance of the task according to the parameters defined in the proposal accepted by the member. For instance, if the coordination with a third-party service 216 may be performed automatically (e.g., third-party service 216 provides automated system for ordering, scheduling, payments, etc.), the task coordination system 214 may interact directly with the third-party service 216 to coordinate performance of the task according to the selected proposal option. The task coordination system 214 may provide any information (e.g., confirmation, order status, reservation status, etc.) to the representative 210. The representative 210, in turn, may provide this information to the member via the application or web portal utilized by the member to access the task facilitation service 218 or through other communication methods (e.g., e-mail message, text message, etc.) to indicate that the third-party service 216 has initiated performance of the task according to the selected proposal option. In an embodiment, if the representative 210 is performing the task for the benefit of a member, the representative 210 can provide status updates with regard to its performance of the task to the member via the application or web portal provided by the task facilitation service 218.

Once a task has been completed, the member may provide feedback with regard to the performance of the representative 210 and/or third-party services 216 or other services/entities that performed the task according to the proposal option selected by the member. For instance, the member may exchange one or more messages with the representative 210 over the communications session corresponding to the particular project or task to indicate its feedback with regard to the completion of the task. In an embodiment, the task facilitation service uses a machine learning algorithm or artificial intelligence to process feedback provided by the member to improve the recommendations provided by the task facilitation service 218 for proposal options, third-party services 216 or other services/entities, and/or processes that may be performed for completion of similar tasks.

Figure 3:
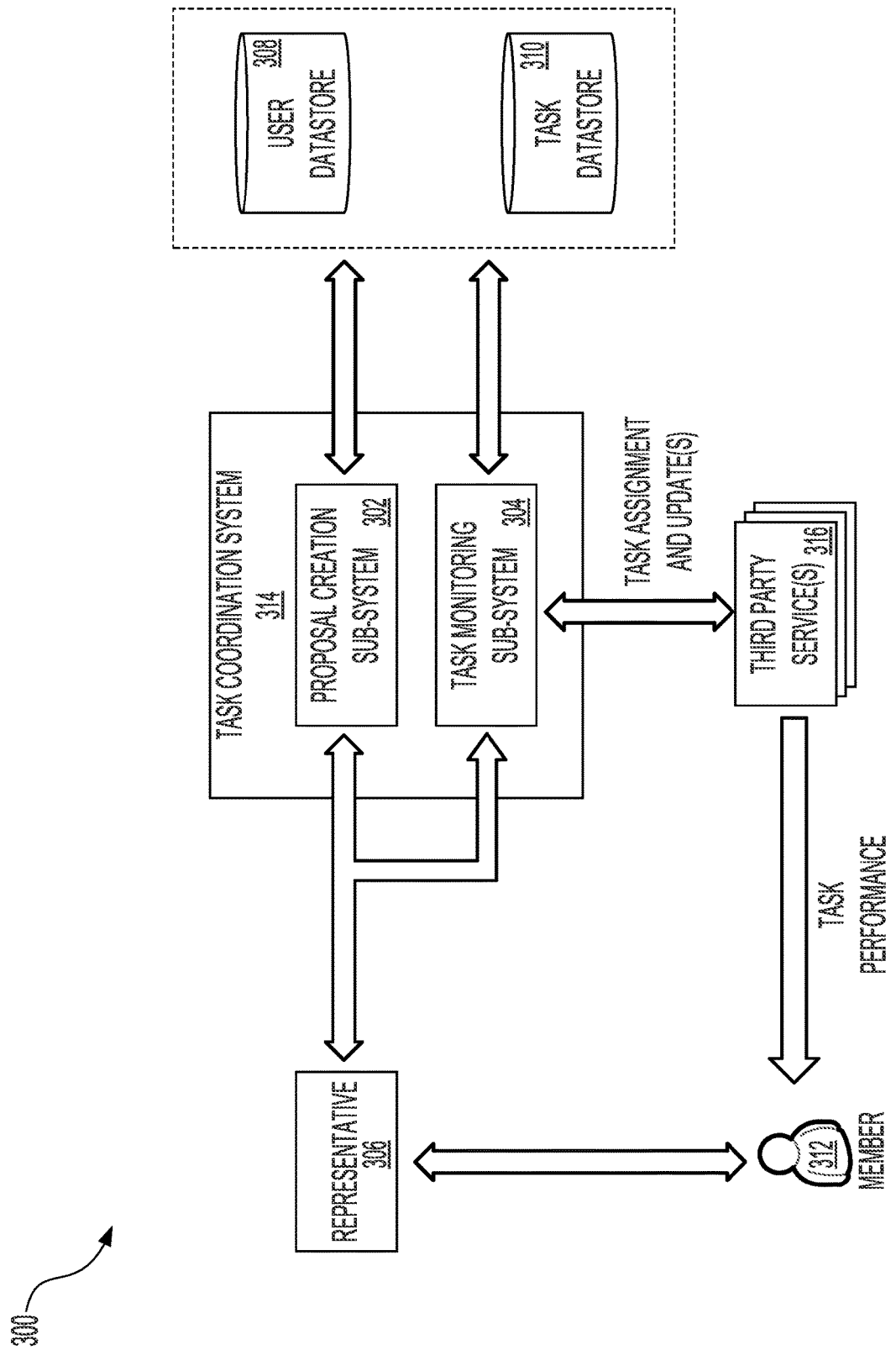
FIG. 3 shows an illustrative example of an environment in which a task coordination system assigns and monitors performance of a task for the benefit of a member by a representative and/or one or more third-party services in accordance with at least one embodiment.

FIG. 3 shows an illustrative example of an environment 300 in which a task coordination system 314 assigns and monitors performance of a task for the benefit of a member 312 by a representative 306 and/or one or more third-party services 316 in accordance with at least one embodiment. In the environment 300, a representative 306 may access a proposal creation sub-system 302 of the task coordination system 314 to generate a proposal for completion of a task for the benefit of the member 312. The proposal creation sub-system 302 may be implemented using a computer system or as an application or other executable code implemented on a computer system of the task coordination system 314. Once the representative 306 has obtained the necessary task-related information from the member 312 and/or through the task recommendation system (e.g., task parameters garnered via evaluation of tasks performed for similarly situated members, etc.), the representative 306 can utilize the proposal creation sub-system 302 to generate one or more proposals for resolution of the task.

As noted above, a proposal may include one or more options presented to a member 312 that may be created and/or collected by a representative 306 while researching a given task. In some instances, a representative 306 may access, via the proposal creation sub-system 302, one or more templates that may be used to generate these one or more proposals. For example, the proposal creation sub-system 302 may maintain, within the task data storage 310 or internally, proposal templates for different task types, whereby a proposal template for a particular task type may include various data fields associated with the task type. The task data storage 310 may be associated with a resource library. This resource library may maintain the various proposal templates for the creation of new proposals for completion of different tasks.

In an embodiment, the data fields within a proposal template can be toggled on or off to provide a representative 306 with the ability to determine what information is presented to the member 312 in a proposal. The representative 306, based on its knowledge of the member's preferences, may toggle on or off any of these data fields within the template. For example, if the representative 306 has established a relationship with the member 312 whereby the representative 306, with high confidence, knows that the member trusts the representative 306 in selecting reputable businesses for its tasks, the representative 306 may toggle off a data field corresponding to the ratings/reviews for corresponding businesses from the proposal template. Similarly, if the representative 306 knows that the member 312 is not interested in the location/address of a business for the purpose of the proposal, the representative 306 may toggle off the data field corresponding to the location/address for corresponding businesses from the proposal template. While certain data fields may be toggled off within the proposal template, the representative 306 may complete these data fields to provide additional information that may be used by the proposal creation sub-system 302 to supplement a resource library of proposals maintained by the task coordination system 314.

In an embodiment, the proposal creation sub-system 302 utilizes a machine learning algorithm or artificial intelligence to generate recommendations for the representative 306 regarding data fields that may be presented to the member 312 in a proposal. The proposal creation sub-system 302 may use, as input to the machine learning algorithm or artificial intelligence, a member profile or model associated with the member 312 from the user data storage 308, historical task data for the member 312 from the task data storage 310, and information corresponding to the task for which a proposal is being generated (e.g., a task type or category, etc.). The output of the machine learning algorithm or artificial intelligence may specify which data fields of a proposal template should be toggled on or off. The proposal creation sub-system 302, in some instances, may preserve, for the representative 306, the option to toggle on these data fields in order to provide the representative 306 with the ability to present these data fields to the member 312 in a proposal. For example, if the proposal creation sub-system 302 has automatically toggled off a data field corresponding to the estimated cost for completion of a task, but the member 312 has expressed an interest in the possible cost involved, the representative 306 may toggle on the data field corresponding to the estimated cost.

Once the representative 306 has generated a new proposal for the member 312, the representative 306 may present the proposal and any corresponding proposal options to the member 312. Further, the proposal creation sub-system 302 may store the new proposal in the user data storage 308 in association with the member profile. In some instances, when a proposal is presented to a member 312, the proposal creation sub-system 302 may monitor member interaction with the representative 306 and with the proposal to obtain data that may be used to further train the machine learning algorithm or artificial intelligence. For example, if a representative 306 presents a proposal without any ratings/reviews for a particular business based on the recommendation generated by the proposal creation sub-system 302, and the member 312 indicates (e.g., through messages to the representative 306, through selection of an option in the proposal to view ratings/reviews for the particular business, etc.) that they are interested in ratings/reviews for the particular business, the proposal creation sub-system 302 may utilize this feedback to further train the machine learning algorithm or artificial intelligence to increase the likelihood of recommending presentation of ratings/reviews for businesses selected for similar tasks or task types.

As noted above, the task coordination system 314 maintains a resource library that may be used to automatically populate one or more data fields of a particular proposal template. The resource library may include entries corresponding to businesses and/or products previously used by representatives for proposals related to particular tasks or task types or that are otherwise associated with particular tasks or task types. For instance, when a representative 306 generates a proposal for a task related to repairing a roof near Lynnwood, Washington, the proposal creation sub-system 302 may obtain information associated with the roofer selected by the representative 306 for the task. The proposal creation sub-system 302 may generate an entry corresponding to the roofer in the resource library and associate this entry with "roof repair" and "Lynnwood, Washington" Thus, if another representative receives a task corresponding to repairing a roof for a member located near Lynnwood, Washington, the other representative may query the resource library for roofers near Lynnwood, Washington. The resource library may return, in response to the query, an entry corresponding to the roofer previously selected by the representative 306. If the other representative selects this roofer, the proposal creation sub-system 302 may automatically populate the data fields of the proposal template with the information available for the roofer from the resource library.

In an embodiment, the representative 306 can query the resource library to identify one or more third-party services and other services/entities affiliated with the task facilitation service from which to solicit quotes for completion of the task. For instance, for a newly created task, the representative 306 may transmit a job offer to these one or more third-party services 316 and other services/entities. The job offer may indicate various characteristics of the task that is to be completed (e.g., scope of the task, general geographic location of the member 312 or of where the task is to be completed, desired budget, etc.). Through an application or web portal provided by the task facilitation service, a third-party service or other service/entity may review the job offer and determine whether to submit a quote for completion of the task or to decline the job offer. If a third-party service or other service/entity opts to reject the job offer, the representative 306 may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like.

The representative 306 may use any provided quotes from the third-party services 316 and/or other services/entities to generate different proposal options for completion of the task. These different proposal options may be presented as a proposal to the member 312 through the task-specific interface corresponding to the particular task that is to be completed. If the member 312 selects a particular proposal option from the set of proposal options presented through the task-specific interface, the representative 306 may transmit a notification to the third-party service or other service/entity that submitted the quote associated with the selected proposal option to indicate that it has been selected for completion of the task.

As noted above, the representative 306, via a proposal template, may generate additional proposal options for businesses and/or products that may be used for completion of a task. For instance, for a particular proposal, the representative 306 may generate a recommended option, which may correspond to the business or product that the representative 306 is recommending for completion of a task. Additionally, in order to provide the member 312 with additional options or choices, the representative 306 can generate additional options corresponding to other businesses or products that may complete the task. In some instances, if the representative 306 knows that the member 312 has delegated the decision-making with regard to completion of a task to the representative 306, the representative 306 may forego generation of additional proposal options outside of the recommended option. However, the representative 306 may still present, to the member 312, the selected proposal option for completion of the task in order to keep the member 312 informed about the status of the task.

Once the representative 306 has completed defining a proposal via use of a proposal template, the representative 306 may present the proposal to the member 312 through the application or web portal provided by the task facilitation service. In some instances, the representative 306 may transmit a notification to the member 312 to indicate that a proposal has been prepared for a particular task and that the proposal is ready for review via the application or web portal provided by the task facilitation service. The proposal presented to the member 312 may indicate the task for which the proposal was prepared, as well as an indication of the one or more options that are being provided to the member 312. For instance, the proposal may include links to the recommended proposal option and to the other options (if any) prepared by the representative 306 for the particular task. These links may allow the member 312 to navigate amongst the one or more options prepared by the representative 306 via the application or web portal. In some instances, the representative 306 may transmit the proposal to the member 312 via other communication channels, such as via e-mail, text message, and the like.

For each proposal option, the member may be presented with information corresponding to the business or product selected by the representative 306 and corresponding to the data fields selected for presentation by the representative 306 via the proposal creation sub-system 302. In some instances, the member 312 may select what details or data fields associated with a particular proposal are presented via the application or web portal. For example, if the member 312 is presented with the estimated total for each proposal option and the member 312 is not interested in reviewing the estimated total for each proposal option, the member 312 may toggle off this particular data field from the proposal via the application or web portal. Alternatively, if the member 312 is interested in reviewing additional detail with regard to each proposal option (e.g., additional reviews, additional business or product information, etc.), the member 312 may request this additional detail to be presented via the proposal.

As noted above, based on member interaction with a provided proposal, the proposal creation sub-system 302 may further train a machine learning algorithm or artificial intelligence used to determine or recommend what information should be presented to the member 312 and to similarly-situated members for similar tasks or task types. The proposal creation sub-system 302 may monitor or track member interaction with the proposal to determine the member's preferences regarding the information presented in the proposal for the particular task. Further, the proposal creation sub-system 302 may monitor or track any messages exchanged between the member 312 and the representative 306 related to the proposal to further identify the member's preferences. In some instances, the proposal creation sub-system 302 may solicit feedback from the member 312 with regard to proposals provided by the representative 306 to identify the member's preferences. This feedback and information garnered through member interaction with the representative 306 regarding the proposal and with the proposal itself may be used to retrain the machine learning algorithm or artificial intelligence to provide more accurate or improved recommendations for information that should be presented to the member 312 and to similarly situated members in proposals for similar tasks or task types. The proposal creation sub-system 302 may further use the feedback and information garnered through member interaction with the representative 306 to update a member profile or model within the user data storage 308 for use in determining recommendations for information that should be presented to the member 312 in a proposal.

In some instances, each proposal presented to the member 312 may specify any costs associated with each proposal option. These costs may be presented in different formats based on the requirements of the associated task or project. For instance, if the proposal corresponds to performance of the task by a third-party service or other service/entity associated with the task facilitation service, the proposal may include a quote submitted by the third-party service or other service/entity in response to the job offer from the representative 306. The quote may indicate any costs associated with different aspects of the task, as well as any additional fees that may be required for performance of the task (e.g., taxes, material costs, etc.). If a member 312 accepts a particular proposal option for a task or project, the representative 306 may communicate with the member 312 to ensure that the member is consenting to payment of the presented costs and any associated taxes and fees for the particular proposal option. In some instances, if a proposal option is selected with a static payment amount, the member 312 may be notified by the representative 306 if the actual payment amount required for fulfillment of the proposal option exceeds a threshold percentage or amount over the originally presented static payment amount.

In an embodiment, if a member 312 accepts a proposal option from the presented proposal, the task coordination system 314 moves the task associated with the presented proposal to an executing state and the representative 306 can proceed to execute on the proposal according to the selected proposal option. For instance, the representative 306 may contact one or more third-party services 316 and/or other services/entities associated with the task facilitation service to coordinate performance of the task according to the parameters defined in the proposal accepted by the member 312. Alternatively, if the representative 306 is to perform the task for the benefit of the member 312, the representative 306 may begin performance of the task according to the parameters defined in the proposal accepted by the member 312.

In an embodiment, the representative 306 utilizes a task monitoring sub-system 304 of the task coordination system 314 to assist in the coordination of performance of the task according to the parameters defined in the proposal accepted by the member 312. The task monitoring sub-system 304 may be implemented using a computer system or as an application or other executable code implemented on a computer system of the task coordination system 314. If the coordination with a third-party service 316 may be performed automatically (e.g., third-party service 316 provides automated system for ordering, scheduling, payments, etc.), the task monitoring sub-system 304 may interact directly with the third-party service 316 to coordinate performance of the task according to the selected proposal option. The task monitoring sub-system 304 may provide any information from a third-party service 316 to the representative 306. The representative 306, in turn, may provide this information to the member 312 via the application or web portal utilized by the member to access the task facilitation service. Alternatively, the representative 306 may transmit the information to the member 312 via other communication methods (e.g., e-mail message, text message, etc.) to indicate that the third-party service 316 has initiated performance of the task according to the selected proposal option.

In an embodiment, the task monitoring sub-system 304 can monitor performance of tasks by the representative 306 and/or the third-party services 316 for the benefit of the member 312. Further, once a task has been completed, the member 312 may provide feedback with regard to the performance of the representative 306 and/or third-party services 316 or other services/entities associated with the task facilitation service that performed the task according to the proposal option selected by the member 312. For instance, the member 312 may exchange one or more messages with the representative 306 over the task-specific communications session to indicate its feedback with regard to the completion of the task. In an embodiment, the task monitoring sub-system 304 provides the feedback to the proposal creation sub-system 302, which may use a machine learning algorithm or artificial intelligence to process feedback provided by the member 312 to improve the recommendations provided by the proposal creation sub-system 302 for proposal options, third-party services 316 or other services/entities, and/or processes that may be performed for completion of similar tasks. For instance, if the proposal creation sub-system 302 detects that the member is unsatisfied with the result provided by a third-party service 316 or other services/entities for a particular task, the proposal creation sub-system 302 may utilize this feedback to further train the machine learning algorithm or artificial intelligence to reduce the likelihood of the third-party service 316 or other services/entities being recommended for similar tasks and to similarly-situated members. As another example, if the proposal creation sub-system 302 detects that the member is pleased with the result provided by a representative 306 for a particular task, the proposal creation sub-system 302 may utilize this feedback to further train the machine learning algorithm or artificial intelligence to reinforce the operations performed by representatives for similar tasks and/or for similarly-situated members.

Figure 4:
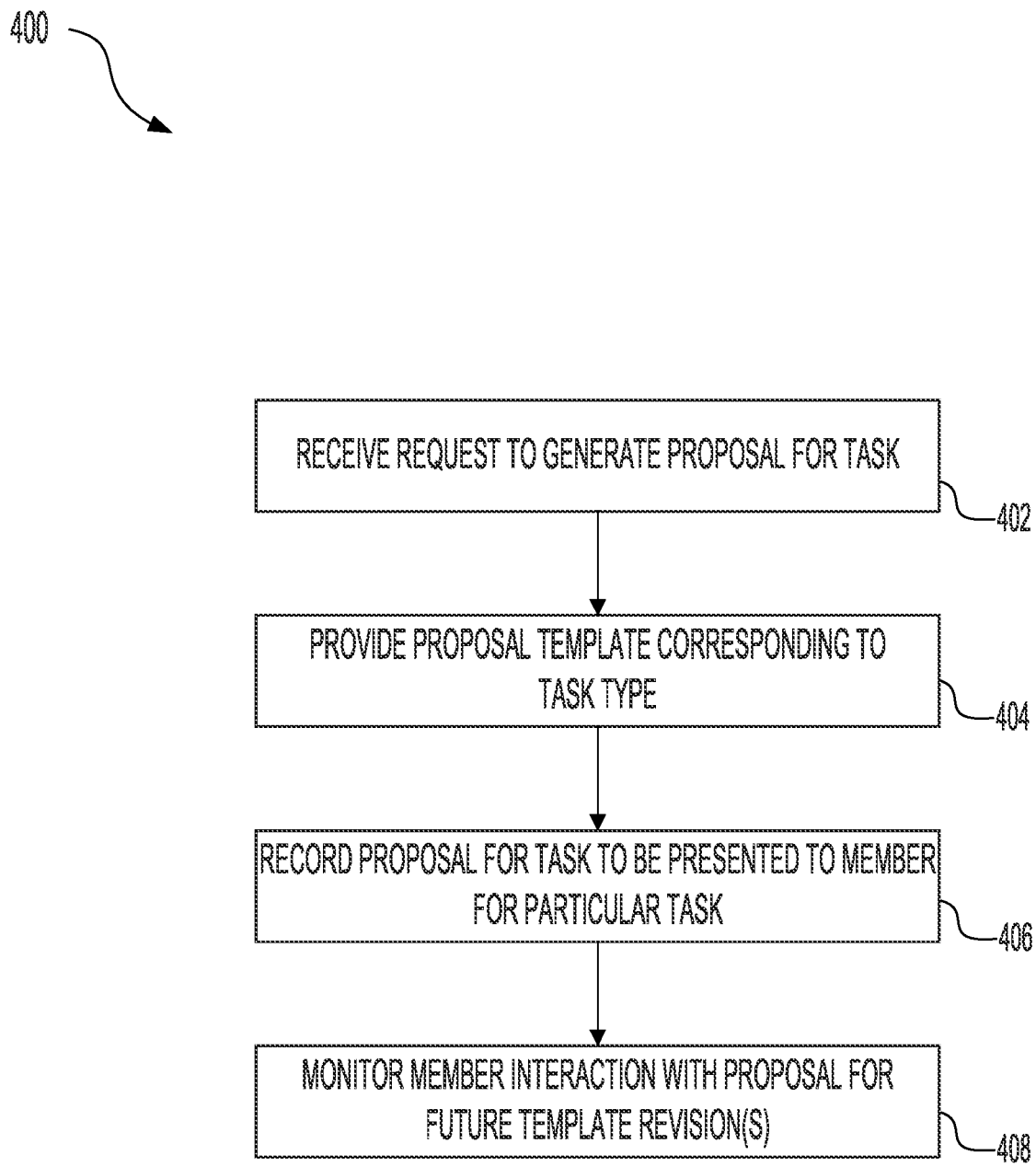
FIG. 4 shows an illustrative example of a process for generating a proposal and monitoring member interaction with the generated proposal in accordance with at least one embodiment.

FIG. 4 shows an illustrative example of a process 400 for generating a proposal and monitoring member interaction with the generated proposal in accordance with at least one embodiment. The process 400 may be performed by one or more systems of the task facilitation service (e.g., the task recommendation system 112 and the task coordination system 114 of the task facilitation service 102, all of which are described herein at least in connection with FIG. 1). At step 402, the systems of the task facilitation service may receive a request to generate a proposal for a particular task. The request may be submitted by a representative, which may have received authorization from a member to perform a task for the benefit of the member. For instance, once the representative has obtained the necessary task-related information from the member and/or through the task recommendation system (e.g., task parameters garnered via evaluation of tasks performed for similarly situated members, etc.), the representative can utilize systems of the task facilitation service to generate one or more proposals for resolution of the task as described herein.

At step 404, the systems of the task facilitation service provide a proposal template corresponding to the task type to the representative. The proposal template may be provided via a user interface provided to the representative by the task facilitation service. As noted above, a proposal may include one or more options presented to a member that may be created and/or collected by a representative while researching a given task. In some instances, a representative may access, via a task recommendation system, one or more templates that may be used to generate these one or more proposals. For example, the task recommendation system may maintain proposal templates for different task types, whereby a proposal template for a particular task type may include various data fields associated with the task type. As described herein, in an embodiment the task recommendation system can interface with the task coordination system and/or with other systems of the task facilitation service to provide the proposal template (e.g., the proposal template corresponding to the task type) to the representative.

At step 406, the systems of the task facilitation service may record a proposal generated by the representative for a particular task so that the proposal can be presented to the member for the particular task. For instance, the task coordination system may add the proposal to a task data storage such that member interaction with the proposal may be recorded for further training of the aforementioned machine learning algorithms or artificial intelligence used to generate and maintain member profiles and to define individualized proposal templates for different task types and for different members. Additionally, the task coordination system may store the proposal in the user data storage in association with a member entry in the user data storage, as described above.

At step 408, the systems of the task facilitation service may monitor member interaction with the proposal to identify possible future proposal template revisions. As noted above, when a proposal is presented to a member, the task coordination system may monitor member interaction with the representative and with the proposal to obtain data that may be used to further train a machine learning algorithm or artificial intelligence utilized to define a proposal template for a particular member. For example, if a representative presents a proposal without any ratings/reviews for a particular business based on the recommendation generated by the task coordination system, and the member indicates (e.g., through messages to the representative, through selection of an option in the proposal to view ratings/reviews for the particular business, etc.) that they are interested in ratings/reviews for the particular business, the task coordination system may utilize this feedback to further train the machine learning algorithm or artificial intelligence to increase the likelihood of recommending presentation of ratings/reviews for businesses selected for similar tasks or task types.

Figure 5:
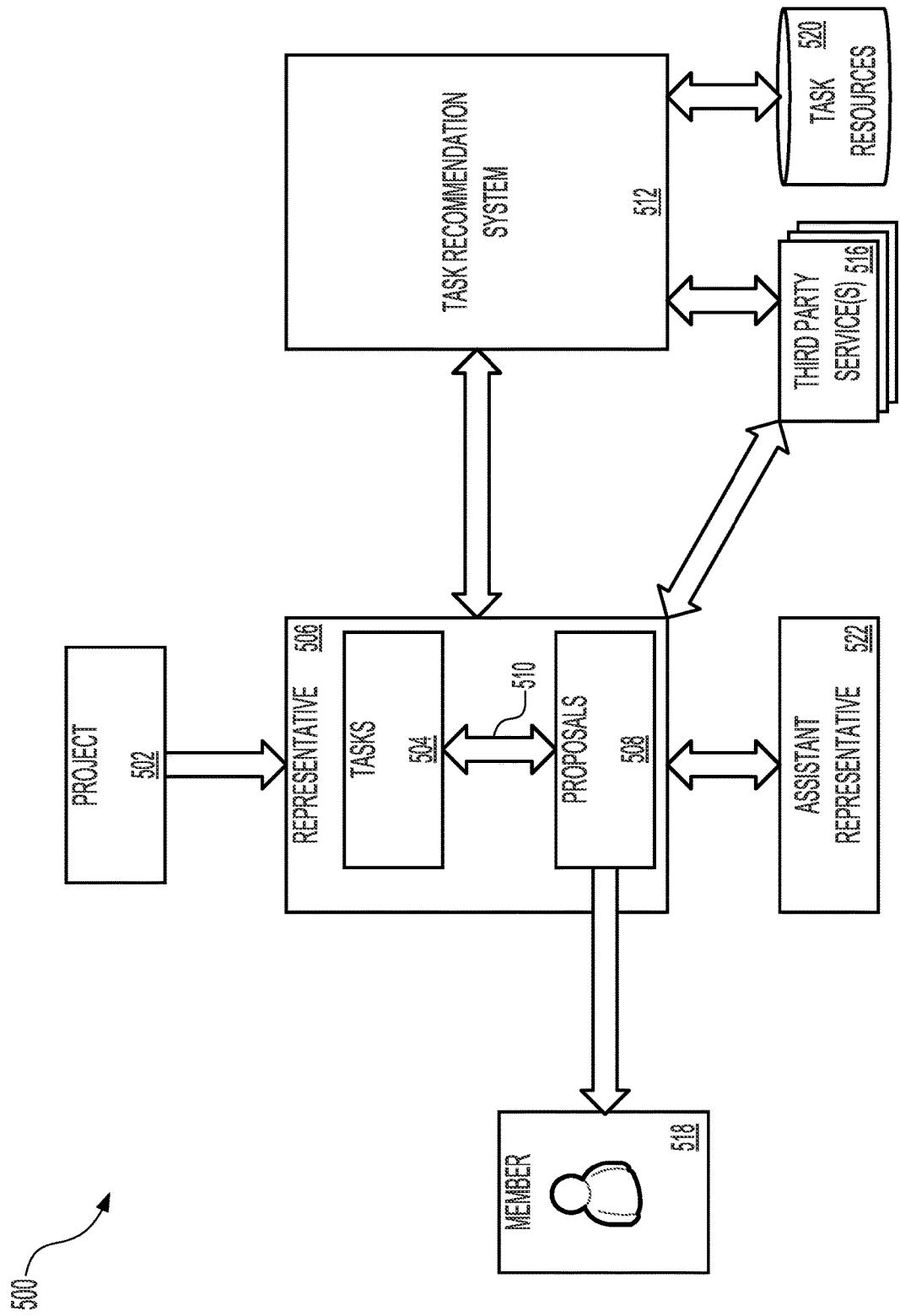
FIG. 5 shows an illustrative example of an environment in which a proposal related to a task is generated in accordance with at least one embodiment.

FIG. 5 shows an illustrative example of an environment 500 in which a proposal related to an individual task or tasks associated with a project is generated in accordance with at least one embodiment. in the environment 500, a project 502 may be received by a representative 506 that is associated with a task facilitation service such as the task facilitation service 102 described at least in connection with FIG. 1. The project 502 may be associated with a member 518. In an embodiment, the project 502 or a project proposal (e.g., a proposal to generate a new project) is directly generated in response to a message from the member 518. For example, the member 518 may transmit a message to the representative 506 stating "I need to start a project for my parents' anniversary weekend" which may cause the representative 506 and/or a system of the task facilitation service to initiate a project to plan the anniversary weekend. The message transmitted by the member 518 may include less information (e.g., "I need to start a project to plan a weekend getaway"). Alternatively, the message transmitted by the member 518 may include more information (e.g., "I need to start a project to plan my parents' anniversary weekend on the weekend of May 20th"). The message transmitted by the member 518 may include very detailed information (e.g., "I need to start a project to plan my parents' anniversary weekend on the weekend of May $20^{th}$ with wine tasting and a surprise activity"). In some instances, the message transmitted by the member 518 may include no information (e.g., "I need to start a project").

In some embodiments, a message can cause the representative and/or the task recommendation system 512 to initiate a project to plan the anniversary weekend with varying degrees of initial information about the project. In some embodiments, the proposed project (also referred to herein as a "project proposal") is then presented back to the member 518 for verification. For instance, the representative 506 or the task recommendation system 512 may create a project-specific interface through which the member 518 may be presented with the proposed project. This project-specific interface may be presented through the application or web portal provided by the task facilitation service. In some embodiments, the proposed project is not presented back to the member if, for example, the representative 506 wishes to reduce the cognitive load of the member 518, the representative 506 has enough information to begin generating tasks and proposals for the project 502, and/or the representative 506 knows that the member 518 does not want to verify the project proposal (e.g., through evaluation of a member profile that includes member preferences and/or observations of previous member behavior).

It should be noted that, in some examples, the member 518 may request or otherwise submit a message to the representative 506 to initiate a singular task. For instance, the member 518 may transmit a message to the representative 506 (such as through an existing chat session or other communications channel provided by the task facilitation service) to request creation and performance of a singular task for the benefit of the member 518. As an illustrative example, if the member 518 transmits the message "I could use help in finding a mechanic to repair my vehicle," the representative 506 may interpret this message as a request to create a singular task related to the scheduling of an appointment with a mechanic to repair the member's vehicle. Thus, as opposed to projects, which may comprise various tasks that need to be completed in order for these projects to be completed, a singular task may be performed independent of any project.

As noted above, the member 518 can also manually provide task-related data via a task template corresponding to a particular task category or type. Through this task template, the member 518 may provide a name for the task or project, a description of the task or project, a timeframe for performance of the task or project, and the like. In some instances, the task template provided to the member 518 may be tailored specifically according to the characteristics of the member 518 identified by the task facilitation service and to the characteristics corresponding to the particular task category or type associated with the selected task template. If the member 518 requests creation and performance of a task or project, the task facilitation service may generate a task- or project-specific interface through which the member 518 may be presented with the proposed task or project, respectively.

In an embodiment, the project proposal can include a recommendation by a system of the task facilitation service about whether to send the project proposal to the member 518 for approval before proceeding with generating tasks and proposals for the project 502 and for each of the tasks associated with the project 502. Such approval, if needed, causes a project proposal to become a project (e.g., the project 502). Such a recommendation may be based on stated or intuited preferences of the member, may be based on a behavioral history of the member (e.g., that the member always wants to review a project proposal or that the member never wants to review a project proposal), may be based on the current cognitive load on the member (e.g., that the member is a tax preparation CPA and it is April $5^{th}$), may be based on the commonality of the project (e.g., that the member plans anniversary weekends for their parents every year), or may be based on a combination of these and other such factors as garnered from the member profile associated with the member 518. In an embodiment, the representative 506 makes the decision about whether to present the project proposal to the member 518 based on, for example, past interactions between the representative 506 and the member 518.

In some embodiments, the recommendation of whether to present the proposed project to the member for approval is based on a degree of predictability associated with the project proposal. For example, if the member asks the representative to start the project, the member can reasonably predict that the representative would move forward with the project and thus additional approval may not be needed. Conversely, if the project proposal is automatically generated by systems of the task facilitation service from the analysis of messages between the member and the representative, the member may have very little reason to predict that a proposal corresponding to a project is forthcoming and, thus, recommendation of an approval step may be more likely.

In some embodiments, the representative accepts the recommendation as to whether to seek approval the project proposal (i.e., the representative decides to follow the recommendation and either proceeds with seeking approval for the proposed project when it is recommended or does not proceed with seeking approval for the proposed project when it is not recommended). In some embodiments, the representative rejects the recommendation as to whether to seek approval for the project proposal (i.e., the representative decides to not follow the recommendation and either proceeds with seeking approval for the proposed project when it is not recommended or does not proceed with seeking approval for the proposed project when it is recommended). Decisions by the representative to either accept or reject the recommendation of the task recommendation system 512 may be used by the task recommendation system 512 to inform future recommendations as to whether to seek approval from members for project proposals. Decisions by the representative 506 to either accept or reject the recommendation may be used to inform future recommendations for the member 518, for the type of project or task, for the entire system, or for a combination of these future recommendations.

In an embodiment, a project proposal is generated from context and/or analysis of other messages between the member 518 and the representative 506. For example, the member 518 may transmit a message to the representative 506 stating "my parents are having their $25^{th}$ anniversary in a few weeks" followed by another message stating "I really should plan something for them" causing the task recommendation system 512 to recommend that a project to plan an anniversary weekend be initiated. The recommendation to initiate the project may then be presented to the representative 506 by the task recommendation system 512 and the representative 506 may then present the proposed project to the member 518 for approval. In some embodiments, the proposed project is not presented back to the member if, for example, the representative 506 wishes to reduce the cognitive load of the member 518, the representative 506 has enough information to begin generating tasks and proposals for the project 502, and/or the representative 506 knows that the member 518 does not want or need to verify the project proposal by the factors such as those described above.

In an embodiment, a project proposal is generated automatically by the task recommendation system 512 from other information associated with the member 518. For example, the task facilitation service may have, within a member profile associated with the member 518, information that indicates the member's parents, their names, ages, and wedding date. Such information may be gathered from the member directly (e.g., through intake questions), may be gathered from previous messages exchanged between the member and the representative as described above, may be gathered from previous projects and/or tasks (e.g., planning the anniversary last year), or may be gathered from other information sources (e.g., public data, ancestry data, or other such information sources). The recommendation to initiate the project may then be presented to the representative 506 the task recommendation system 512 and the representative 506 may then present the proposed project to the member 518 for approval or may not presented back to the member if, for example, the representative 506 wishes to reduce the cognitive load of the member 518, the representative 506 has enough information to begin generating tasks and proposals for the project 502, and/or the representative 506 knows that the member 518 does not want or need to verify the project proposal by the factors such as those described above.

In an embodiment, the project proposal is generated by the representative 506 based on knowledge about the member 518. For example, the representative may know that the member's parents have an upcoming anniversary based on a completely unrelated conversation and/or a conversation about an unrelated project or task (e.g., "I cannot be home to let the window cleaners in that day because it is my anniversary. Did you know that my Mom and Dad have the same anniversary? We did not plan it that way, it just happened."). Such information about the member may not be stored in the member profile associated with the member 518. Alternatively, such information may be indicated within the member profile within a section corresponding to the representative's personal notes. These personal notes may only be visible to the representative 506 such that, if the member 518 accesses the member profile to add, remove, or otherwise modify any member information within, the representative's personal notes may be omitted from presentation to the member 518. As with the above project proposals, the representative 506 may then determine whether to present the proposed project to the member 518 for approval based on, for example, the cognitive load of the member, the representative having enough information to begin generating tasks and proposals for the project, and/or the representative 506 knowing that the member 518 does not want or need to approve the project proposal by the factors such as those described above.

In some embodiments, the task recommendation system 512 implements machine learning or artificial intelligence techniques to generate recommendations about whether to send the project proposal to the member 518 for approval, the project proposal from context and/or analysis of other messages between the member 518 and the representative 506, the project proposal from other information associated with the member, a project template, proposal options, proposal recommendations, and/or aspects of each of these recommendations and/or proposals. Such machine learning or artificial intelligence techniques may be used by the task recommendation system 512 to identify the relevant factors and to generate the proposals and/or recommendations that may be relevant to the member 518. For example, the task recommendation system 512 may implement a clustering algorithm to identify similar recommendations and/or parameters based on one or more relevant parameters (e.g., in an n-dimensional parameter space associated with the member, the proposal, the recommendation, etc.). In some instances, a dataset of characteristics of a plurality of members, recommendations, and/or proposals may be analyzed using a clustering algorithm to identify ways that different types of members that may interact with the task facilitation service in relation to various proposals and tasks to generate recommendations and/or proposals. Example clustering algorithms that may trained using sample member datasets are described herein. Based on the output of the machine learning algorithm, the task recommendation system 512 may generate the project proposals and/or the recommendations for seeking approval described herein. As may be contemplated, the use of such machine learning and/or artificial intelligence techniques and the results thereof may reduce the number of unnecessary interactions between the member 518 and the representative 506 and thus may better tailor the process of generating a project 502 that is tailored to the member's needs.

As may be contemplated, in some embodiments, the project proposal and/or the recommendations as to whether to send the project proposal to the member before proceeding can be generated by a combination of the methods described herein and/or other such methods. For example, the representative 506 may know that an event for the member 518 is coming up, the task recommendation system 512 may send an alert regarding the upcoming anniversary, and the context of previous messages between the member 518 and the representative 506 may indicate that the member likes to plan surprise getaways for their parents. The combination of these elements may then be used to generate a project proposal which may or not then be presented to the member 518 for approval based on the factors such as those described above.

Once a project 502 is initiated by, for example, one or more of the methods described above, the representative 506 may then begin associating one or more tasks 504 with the project 502. In some embodiments, a project has a defined minimal set of information needed to begin associating one or more tasks 504 with the project 502. Examples of a defined minimal set of information needed to begin associating one or more tasks 504 with the project 502 may include, but may not be limited to, a date, a location, and a budget. As may be contemplated, different projects and/or different tasks may have different defined minimal sets of information needed to begin associating the one or more tasks with the project. For example, the scope and the nature of the information (i.e., the defined minimal set of information) that is needed to begin associating one or more tasks with a project to plan an anniversary weekend is different than the scope and nature of the information that is needed for a project to plan a move to a foreign country and both are different than the scope and nature of the information that is needed for a project to get a car serviced and new tires installed.

In an embodiment, the task recommendation system 512 can determine which additional information is needed to begin associating the one or more tasks 504 with the project 502. Such determination may be based on a template for the project and/or for templates for possible tasks associated with the project, as described herein. Such determination may also be based on previous tasks associated with the member (e.g., the member has had projects for previous anniversary weekends, or the member has had projects for previous weekend getaways, or the member has had projects for previous surprises for their parents) and/or information garnered from the member profile associated with the member 518. Such determination may also be based on similar tasks either associated with the member 518 or with other members (e.g., a birthday weekend project for the member 518 or an anniversary weekend for another member).

In an embodiment, the representative 506 determines which additional information is needed to begin associating the one or more tasks 504 with the project 502. Such determination may again be based on a template for the project and/or for templates for possible tasks associated with the project, as described herein. Such determination may also be based on previous tasks associated with the member (e.g., the member has had projects for previous anniversary weekends, or the member has had projects for previous weekend getaways, or the member has had projects for previous surprises for their parents). Such determination may also be based on similar tasks either associated with the member 518 or with other members (e.g., a birthday weekend project for the member 518 or an anniversary weekend for another member). Such determination may also be based on personal knowledge or experiences that the representative has about the member 518. In an embodiment, the task recommendation system 512 can automatically identify the portions of the member profile that may be used to obtain the additional information needed to begin associating the one or more tasks 504 with the project. For example, if the representative selects a template corresponding to an evening out at a restaurant, the task recommendation system 512 may automatically process the member profile to identify any information corresponding to the member's dietary preferences and restrictions that may be used to populate one or more fields within the template selected by the representative 506.

In an embodiment, the determination of which additional information is needed to begin associating the one or more tasks 504 with the project 502 is made by a combination of these and/or other such techniques. For example, the task recommendation system 512 may determine some of the additional information is needed to begin associating the one or more tasks 504 with the project 502, the representative 506 may determine some of the additional information is needed to begin associating the one or more tasks 504 with the project 502, and other techniques (e.g., external databases, environmental factors, demographics, etc.) may determine some of the additional information is needed to begin associating the one or more tasks 504 with the project 502.

Once it is determined which additional information is needed to begin associating the one or more tasks 504 with the project 502 (e.g., the defined minimal set of information), the additional information can be gathered. In an embodiment, the representative 506 gathers the additional information that may be needed to begin associating one or more tasks 504 with the project 502. For example, the representative may gather additional information as to which weekend the anniversary falls on, what the parents like to do, what the budget is, where the parents live, how far they might want to travel, etc.). In some instances, the representative 506 may obtain this additional information through manual evaluation of the member profile associated with the member 518. In an embodiment, the task recommendation system 512 may automatically identify the portions of the member profile that may be used to associate the one or more tasks 504 with the project 502. The representative 506 may review these automatically identified portions of the member profile to ensure that the association is performed accurately. If the representative 506 makes any changes to the information automatically identified by the task recommendation system 512 (based on the representative's personal knowledge of the member 118, etc.), the task recommendation system 512 may use these changes to automatically update the member profile to incorporate these changes. In some instances, if changes are to be made to the member profile as a result of the changes made by the representative 506, the task recommendation system 512 may prompt the member 518 to verify that the proposed change to the member profile is accurate. If the member 518 indicates that the proposed change is inaccurate, or the member 518 provides an alternative change, the task recommendation system 512 may automatically update the association and the member profile to reflect the accurate information, as indicated by the member 518.

In the example where the member sends a message stating "I need to start a project for my parents' anniversary weekend," the representative 506 may need to determine which weekend that is, what the parents like to do, what the budget is, where the parents live, how far they might want to travel, and/or other such information. In an embodiment, the representative 506 sends messages to the member 518 requesting the additional information. However, as may be contemplated, such requests for additional information may unnecessarily increase the cognitive load on the member and it may be useful to minimize directly requesting the additional information.

In an embodiment, the representative 506 uses the task recommendation system 512 to determine some or all of the missing information for the project. For example, as described above, data associated with the member 518 stored in the member profile may be used to determine one or more elements of missing information (e.g., which weekend the anniversary is, what the parents like to do, what the budget is, where the parents live, how far they might want to travel, and/or other such information). Additionally, other information intuited from the analysis of previous conversations between the member and the representative may be used to determine one or more other elements of missing information and/or may be used to verify determined elements of missing information. Such known and missing information may be referred to herein as "project parameters." Such known and missing information may also be referred to herein as "task parameters" when, for example, the project parameters are directly related to particular tasks 504 associated with the project 502. As may be contemplated, other systems of the task facilitation service such as those described herein may be used to identify and obtain the missing information for the project 502.

In the example where the project initially includes less information (e.g., "I need to start a project to plan a weekend getaway") the representative 506 may have more missing information for the project and may, in some embodiments, use additional sources including, but not limited to, soliciting information directly from the member 518, reviewing the member profile associated with the member 518, or looking at external data sources. The techniques described above in the previous example (e.g., data associated with the member stored in the member profile and/or information intuited from the analysis of previous conversations between the member and the representative) may also be used to reduce or eliminate the amount of information that is solicited directly from the member, thereby minimizing the cognitive load on the member.

In the example where the project initially includes more information (e.g., "I need to start a project to plan my parents' anniversary weekend on the weekend of May 20th") or where the project is generated by the task recommendation system 512 and/or by the member from a more complete set of information, any missing information associated with the project may also use additional sources including, but not limited to, soliciting information directly from the member 518 and/or reviewing the member profile associated with the member 518. The techniques described above in the previous example (e.g., data associated with the member stored in the member profile and/or information intuited from the analysis of previous conversations between the member and the representative) may also be used to reduce or eliminate the amount of information that is solicited directly from the member.

In the example where the message transmitted by the member includes little to no information (e.g., "I need to start a project"), the representative may begin with soliciting information directly from the member 518 and then use that solicited information to determine as much of the missing information while minimizing the amount of information subsequently solicited directly from the member 518, thereby at least mitigating the cognitive load on the member 518. In some instances, any information obtained through this solicitation for information from member 518 may be used to supplement the member profile. For instance, if the member 518 indicates that they need to start a project for their parents' anniversary, and provided detailed information regarding their parents, the representative 506 may update the member profile associated with the member 518 to include this detailed information regarding the member's parents (if not present within the member profile).

In an embodiment, the task recommendation system 512 can automatically process member responses to the representative's solicitation of information to populate the member profile. For instance, the task recommendation system 512 can monitor, automatically and in real-time, messages exchanged between the member 518 and the representative 506 to identify any information that may be used to supplement the project 502 and to update the member profile. For instance, the task recommendation system 512 may utilize natural language processing (NLP) or other artificial intelligence to evaluate received messages or other communications from the member 518 to identify any information that may be used to supplement the project 502 and/or the member profile. In some instances, the task recommendation system 512 may utilize historical data corresponding to messages exchanged between members and representatives to train the NLP or other artificial intelligence to identify information that may be used to supplement the project 502 and the member profile.

It should be noted that each of these examples are for projects to plan an anniversary weekend for the member's parents and, accordingly, each has the same defined minimal set of information needed to begin associating the one or more tasks 504 with the project 502. The defined minimal set of information needed to begin associating the one or more tasks 504 with the project 502 is based on the nature and scope of the project. However, as each of the examples begins with a different set of provided information, the processes whereby the information is gathered to satisfy the defined minimal set of information needed to begin associating the one or more tasks 504 with the project 502 may be different in the different examples illustrated. It should also be noted that the defined minimal set of information needed to begin associating the one or more tasks 504 with the project 502 may not be all of the information needed to complete associating the one or more tasks 504 with the project 502. For example, a representative 506 may be able to begin associating one or more tasks with a project to for an anniversary weekend without knowing, for example, that the member's mother has special dietary requirements (e.g., that she is vegan). A task (or task component) associated with a project to plan an anniversary weekend may be to plan a special anniversary dinner for the parents. Later on in the proposal generation process, that task may be replaced by a task to plan a special anniversary dinner for the parents at a vegan restaurant.

With sufficient information to begin defining the tasks that will be performed by the representative 506 and/or one or more the third-party services 516 or other services/entities affiliated with the task facilitation service on behalf of the member 518 to complete the project 502, the representative 506 can begin defining the tasks 504 that are to be performed in order to complete the project 502. In an embodiment, the representative 506 begins defining the tasks and generating one or more proposal options for completion of these tasks. In an embodiment, the proposal options define the tasks 504 that will be performed by the representative and/or one or more the third-party services 516 and/or other services/entities affiliated with the task facilitation service on behalf of the member 518 to complete the project 502. In such an embodiment, there may be a "one-to-one" relationship between the proposal options and the tasks 504 (i.e., one proposal option corresponds to one task) or there may be a "one-to-many" relationship between the proposal options and the tasks 504 (i.e., one proposal option corresponds to a plurality of tasks) or there may be a "many-to-one" relationship between the proposal options and the tasks (i.e., a plurality of proposal option corresponds to a single task).

In an embodiment, the proposal options associated with the project 502 receive one or more proposal recommendations, which are recommendations for tasks 504 that will be performed by the representative 506 and/or one or more third-party services 516 and/or other services/entities affiliated with the task facilitation service on behalf of the member 518 to satisfy the proposal option and to complete the project 502. In an embodiment, proposal recommendations are obtained by the representative 506 from a task recommendation system 512. In an embodiment, proposal recommendations are generated by the representative 506 using information from a task recommendation system 512. In an embodiment, proposal recommendations are generated by the representative 506 using information from one or more third-party services 516 and/or other services/entities affiliated with the task facilitation service.

In an embodiment, proposal recommendations are generated by the representative 506 using information from task resources (e.g., user data storage 108 and task data storage 110, both described herein at least in connection with FIG. 1) provided by the task recommendation system 512. In an embodiment, proposal recommendations are generated by the representative 506 using a combination of these and other such information sources. In an embodiment, proposal recommendations are generated by an assistant representative 522 using a combination of these and other such information sources. In such an embodiment, the assistant representative may be a junior representative, or may be another representative, or may be a bot configured to generate proposal recommendations using machine learning or artificial intelligence algorithms such as those described herein.

In some instances, the representative 506 may use a resource library maintained by the task facilitation service to obtain information corresponding to different third-party services 516, other services/entities affiliated with the task facilitation service, and tasks that may be performed for the particular type or category of project 502. For instance, an entry for a third-party service in the resource library may include contact information for the third-party service, any available price sheets for services or goods offered by the third-party service, listings of goods and/or services offered by the third-party service, hours of operation, ratings or scores according to different categories of members, and the like. The representative 506 may query the resource library to identify the one or more third-party services that are to perform the task and determine an estimated cost for performance of the task. In some instances, the representative may contact the one or more third-party services 516 to obtain quotes for completion of the task and to coordinate performance of the task for the benefit of the member 518.

In some instances, the resource library may further include detailed information corresponding to other services and other entities that may be associated or affiliated with the task facilitation service and that are contracted to perform various tasks on behalf of members of the task facilitation service. These other services and other entities may provide their services or goods at rates agreed upon with the task facilitation service. Thus, if the representative 506 selects any of these other services or other entities from the resource library, the representative 506 may be able to determine the particular parameters (e.g., price, availability, time required, etc.) for completion of the task.

In an embodiment, for a given task associated with the project 502, the representative 506 can query the resource library to identify one or more third-party services 516 and other services/entities affiliated with the task facilitation service from which to solicit quotes for completion of the task. For instance, for a newly created task, the representative 506 may transmit a job offer to these one or more third-party services 516 and other services/entities. The job offer may indicate various characteristics of the task that is to be completed (e.g., scope of the task, general geographic location of the member 518 or of where the task is to be completed, desired budget, etc.). Through an application or web portal provided by the task facilitation service, a third-party service or other service/entity may review the job offer and determine whether to submit a quote for completion of the task or to decline the job offer. If a third-party service or other service/entity opts to reject the job offer, the representative 506 may receive a notification indicating that the third-party service or other service/entity has declined the job offer. Alternatively, if a third-party service or other service/entity opts to bid to perform the task (e.g., accepts the job offer), the third-party service or other service/entity may submit a quote for completion of the task. This quote may indicate the estimated cost for completion of the task, the time required for completion of the task, the estimated date in which the third-party service or other service/entity is available to begin performance of the task, and the like. The representative may use any provided quotes from the third-party services and/or other services/entities to generate different proposals for completion of the task.

In an embodiment, once the proposal recommendations are received and/or generated, the representative 506 creates one or more proposals 508 using the proposal recommendations. A proposal may include a proposal recommendation for each of the proposal options. In an embodiment, proposal recommendations and/or proposals are ranked according to a number of criteria described herein. For example, a proposal recommendation may be ranked based on information obtained from a social media site, by the task facilitation service, or may be ranked by the representative 506, based on cost, demographics, location, or other such criteria, by a combination of these and/or other criteria. Similarly, in an embodiment, a proposal is ranked and/or marked as preferred. The ranking of a proposal may be based on an aggregation of the rankings of the proposal recommendations or it may be ranked using other ranking criteria such as those described herein.

In an embodiment, one or more of the proposals 508 are sent the member 518 with or without the ranking and/or preferred designation. In an embodiment, the one or more of the proposals 508 are communicated to the member 518 and a process for accepting a proposal is initiated.

It should be noted that for the processes described herein, various operations performed by the representative 506 may be additionally, or alternatively, performed using one or more machine learning algorithms or artificial intelligence such as those described herein. For example, as the representative 506 and/or the task recommendation system 512 generate proposals, recommend proposals, coordinate tasks, and/or perform tasks on behalf of a member 518 over time, the task recommendation system 512 may continuously and automatically update the member profile according to feedback related to the generation of proposals, recommendation of proposals, coordination of tasks, and/or performance of tasks (by, for example, the representative 506, the task recommendation system 512, and/or the third-party services 516 or other services/entities affiliated with the task facilitation service).

In an embodiment, the task recommendation system 512, after the member profile associated with the member 518 has been updated over a period of time (e.g., six months, a year, etc.) or over a set of proposals, proposal recommendations, and tasks (e.g., twenty tasks, thirty tasks, etc.), may utilize a machine learning algorithm and/or artificial intelligence techniques to automatically and dynamically generate new proposals, proposal recommendations, and/or tasks based on the various attributes of the member profile (e.g., historical data corresponding to member-representative communications, member feedback corresponding to representative performance and presented tasks/proposals/recommendations, etc.) with or without representative interaction. The task recommendation system 512 may automatically communicate with the member 518 to obtain any additional information required for new projects and tasks and automatically generate proposals that may be presented to the member 518 for performance of these projects and tasks. The representative 506 may also monitor communications between the task recommendation system 512 and the member 518 to ensure that the conversation maintains a positive polarity (e.g., the member 518 is satisfied with its interaction with the task recommendation system 512, other systems of the task facilitation service, the representative 506, the assistant representative 522, other bots associated with the task facilitation services, etc.). If the representative 506 determines that the conversation has a negative polarity (e.g., the member 518 is expressing frustration or dissatisfaction, the task recommendation system 512 is unable to process the member's responses or asks, etc.), the representative 506 may intervene in the conversation. This may allow the representative 506 to address any member concerns and perform any tasks on behalf of the member 518, restoring a positive polarity.

Thus, unlike automated customer service systems and environments, wherein these systems and environment may have little to no knowledge of the users interacting with agents or other automated systems, the task recommendation system 512 can continuously update the member profile to provide up-to-date historical information about the member 518 based on the member's interaction with the system and/or interaction with the representative 506 and based on the proposals generated, the proposals recommended, and the tasks performed on behalf of the member 518 over time. This historical information, which may be automatically and dynamically updated as the member 518 and/or the systems of the task facilitation service interact with the representative 506 and as tasks are devised, proposed, recommended, and performed for the member 518 overtime, may be used by the task recommendation system 512 to anticipate, identify, and present appropriate or intelligent responses to member 518 queries, needs, and/or goals.

Figure 6A:
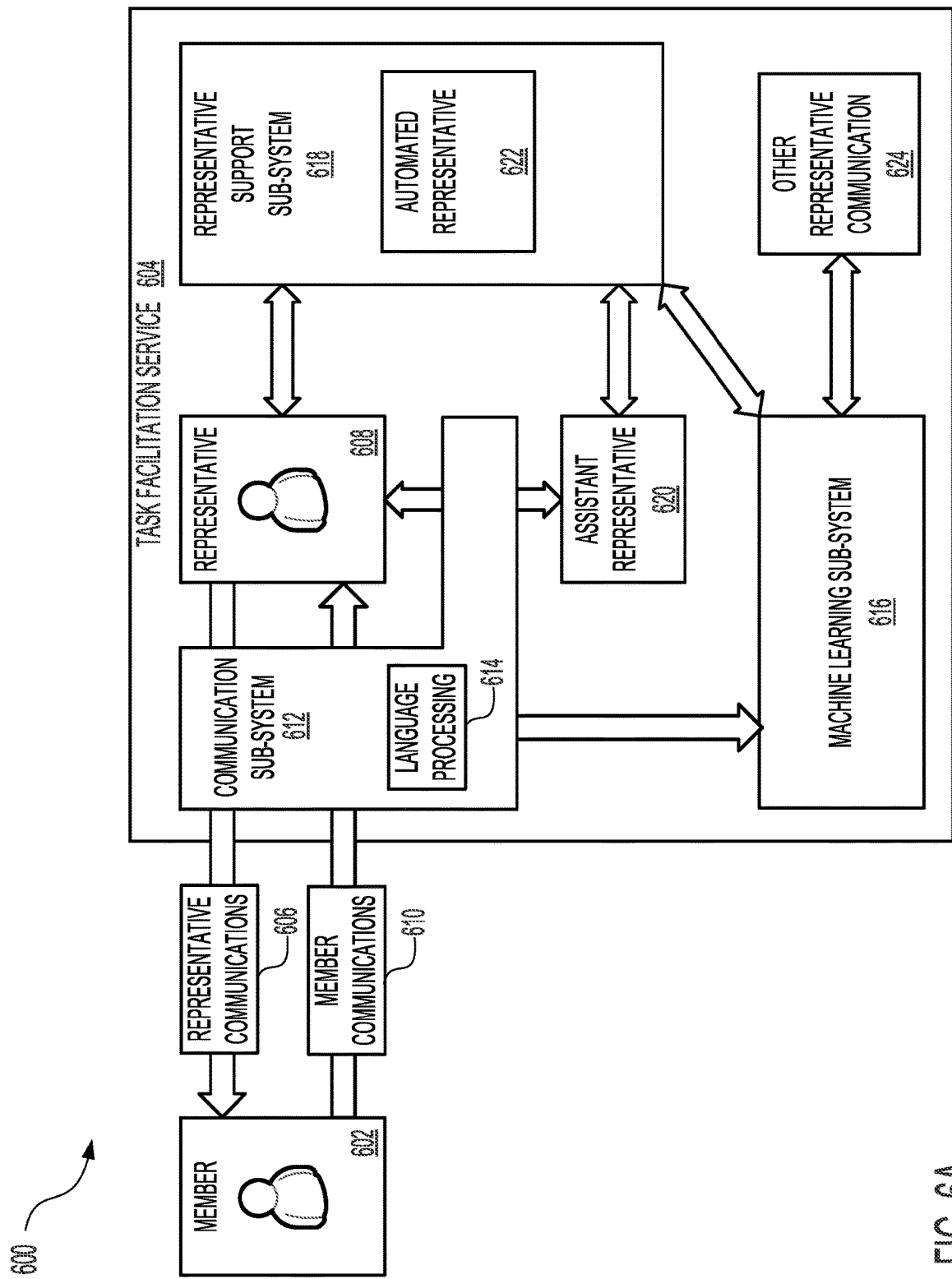
FIGS. 6A-6B show an illustrative example of an environment in which communications with representatives are processed in accordance with at least one embodiment.
Figure 6B:
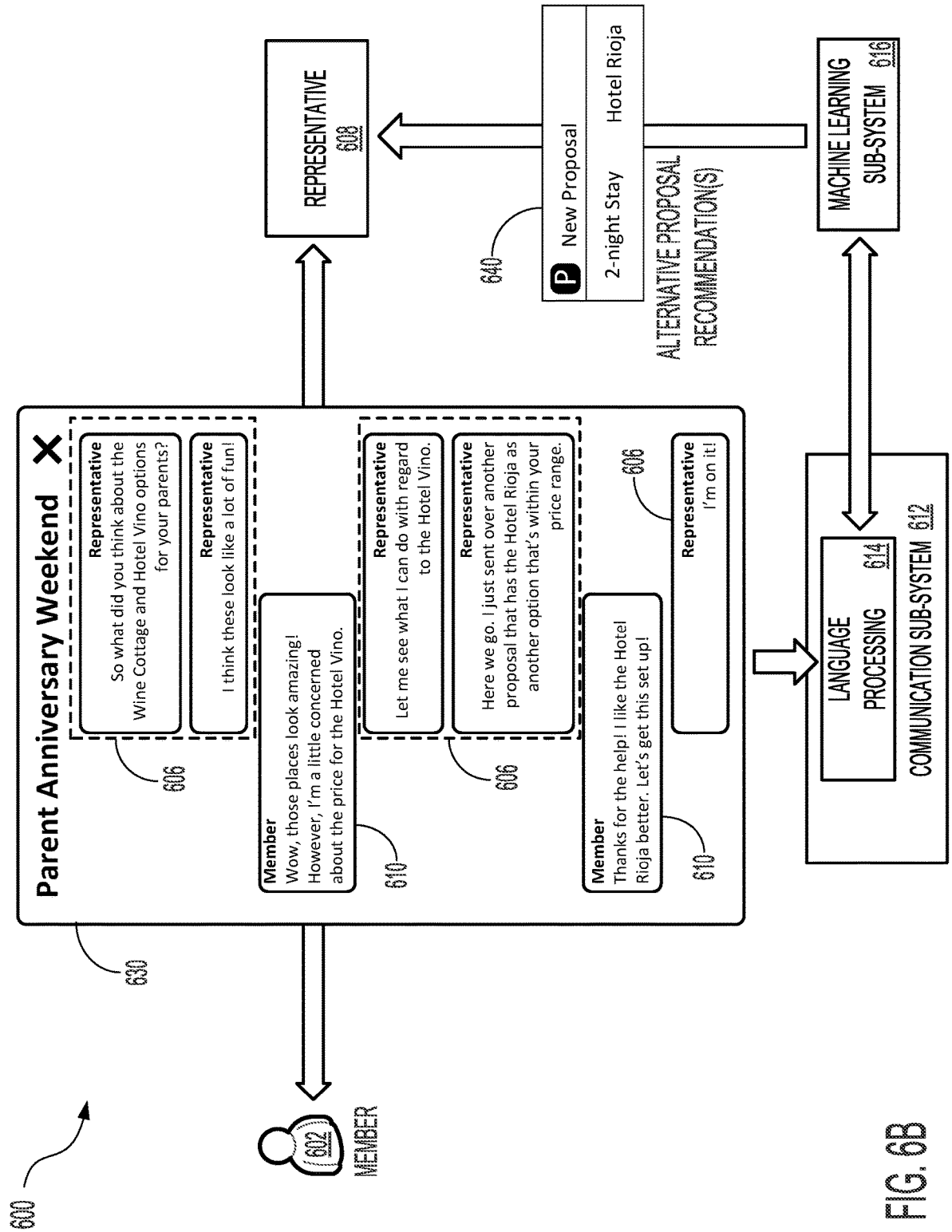

FIGS. 6A-6B show an illustrative example of an environment 600 in which communications with representatives are processed in accordance with at least one embodiment. In the example illustrated in FIGS. 6A-6B, a member 602 receives representative communications 606 from a representative 608. In an embodiment, the representative communications 606 are communications between the representative 608 and the member 602 regarding proposals (e.g., communications related to proposals and/or ranked proposals such as those described herein). In an embodiment, the representative communications 606 are communications between the representative 608 and the member 602 regarding other systems, sub-systems, and/or services of a task facilitation service 604. The representative communications 606 may be provided through a project- or task-specific communications session established between the member 602 and the representative 608 for a particular project or task, respectively.

For example, the representative 608 may communicate with the member 602 regarding one or more proposals corresponding to a project associated with their parents' anniversary weekend described herein to determine whether the member has any questions, comments, or feedback regarding the proposal recommendations and/or the proposals presented to the member 602. As an example of representative communications 606 from the representative 608 to the member 602 through a project- or task-specific communications session, the representative 608 may ask the member 602 their opinion on the proposal recommendation for the "Wine Cottage," their opinion on whether the "Hotel Vino" is preferred, or whether they might prefer the "Hotel Vino" over the "Wine Cottage." The representative 608 may also provide representative communications 606 that explain why a proposal recommendation was recommended, to discuss the proposals themselves (e.g., to comment that "this proposal looks fun!"), or to comment on, request feedback about, discuss, justify, and/or provide other such representative communications 606 on systems and/or sub-systems of the task facilitation service 604. As may be contemplated, the types of representative communications 606 are illustrative examples and other such types of representative communications 606 (e.g., communications from the representative 608 to the member 602 regarding other aspects of the task facilitation service 604 including, but not limited to, those described herein) may be considered as within the scope of the present disclosure.

In the example illustrated in FIGS. 6A-6B, the member 602, through the project- or task-specific communications session, sends member communications 610 to the representative 608. In an embodiment, the member communications 610 are communications between the representative 608 and the member 602 regarding proposals presented to the member 602 through a project- or task-specific interface associated with an application or web portal provided by the task facilitation service 604, as described herein. In an embodiment, the member communications 610 are communications between the member 602 and the representative 608 regarding other systems, sub-systems, and/or services of the task facilitation service 604. In an embodiment, the member communications 610 are communications that are in response to the representative communications 606 such as those described herein regarding the systems, sub-systems, and/or services of the task facilitation service 604 (e.g., queries about proposal recommendations presented to the member 602). In an embodiment, the member communications 610 are communications initiated by the member regarding the systems, sub-systems, and/or services of the task facilitation service 604 (e.g., notifying the representative about tasks and/or projects using systems and methods such as those described herein).

For example, as described above, the representative 608 may communicate with the member 602 regarding the proposal or proposals for the parents' anniversary weekend project to ask the member 602 their opinion on the recommendation for the "Wine Cottage," their opinion on whether the "Hotel Vino" is preferred, or whether they might prefer the "Hotel Vino" over the "Wine Cottage." The member 602 may respond to that query using the member communications 610 to, for example, select the "Wine Cottage." For example, the member 602 may use the member communications 610 through the project- or task-specific communications session to tell the representative 608 "Wow, that place looks great!" when discussing the "Wine Cottage." The member 602 may also provide member communications 610 to discuss proposals, to discuss tasks (through task-specific interfaces and/or a project-specific communications session associated with the tasks), to discuss projects (through project-specific communications sessions), or to comment on, request information about, request services, and/or provide other such member communications 610 on systems and/or sub-systems of the task facilitation service 604. As may be contemplated, the types of member communications 610 are illustrative examples and other such types of member communications 610 (e.g., communications from the member 602 to the representative 608 regarding other aspects of the task facilitation service 604 including, but not limited to, those described herein) may be considered as within the scope of the present disclosure.

In an embodiment, the representative communications 606 and the member communications 610 are monitored in real-time to automatically extract information from those communications. In the example illustrated in FIGS. 6A-6B, the representative communications 606 and the member communications 610 are monitored in real-time as these communications are exchanged using a communication sub-system 612 of the task facilitation service 604. For instance, the communication sub-system 612 may automatically process in real-time chat logs corresponding to the communications exchanged between the member 602 and the representative 608, monitoring project- and/or task-specific communications channels corresponding to different projects and tasks in real-time as communications are exchanged, and/or extracting the communications from storage systems such as those described herein. In an embodiment, the communication sub-system 612 is an element of systems provided by the task facilitation service 604 to process communications such as the systems and/or sub-systems described herein at least in connection with FIG. 18 (i.e., the communication sub-system 612 may be the same as and/or have some or all of the same functionality as the member communication sub-system 1822 described herein at least in connection with FIG. 18).

In the example illustrated in FIGS. 6A-6B, the communication sub-system 612 of the task facilitation service 604 provides language processing 614 on the representative communications 606 and/or the member communications 610 to obtain information regarding those communications to the systems, sub-systems, and/or services associated with the task facilitation service 604. In an embodiment, the communication sub-system 612 provides language processing 614 by executing one or more natural language processing (NLP) algorithms using data obtained from the representative communications 606 and/or the member communications 610.

In an embodiment, queries by the representative 608 to the representative support sub-system 618, to the assistant representative 620, to other services and/or systems associated with the task facilitation service 604 such as those described herein, and/or to third party services and/or other services/entities affiliated with the task facilitation service 604 that are used to perform the tasks are received by the communication sub-system 612 and/or processed by the machine learning sub-system 616 using systems and methods such as those described herein. In an embodiment, responses to those queries are received by the communication sub-system 612 and/or processed by the machine learning sub-system 616 using systems and methods such as those described herein. For example, if the representative 608 sends a query to a third party service and/or other service/entity affiliated with the task facilitation service 604 to obtain a quote for performance of a task as part of a project, the query and/or the response from the third party service and/or other service/entity affiliated with the task facilitation service 604 may be received by the communication sub-system 612 and/or processed by the machine learning sub-system 616 and that processing and/or analysis may be used by the task facilitation service 604 to improve algorithms associated with tasks performed on behalf of the member 602 including, but not limited to, a recommendation algorithm, a proposal task generation algorithm, other machine learning algorithms, and/or language processing algorithms all as described herein.

In an embodiment, queries by the member 602 to the representative 608 and/or to various systems, sub-systems, and services associated with the task facilitation service 604 such as those described herein, and/or to third party services and/or other service/entity affiliated with the task facilitation service 604 that are used to perform the tasks are received by the communication sub-system 612 and/or processed by the machine learning sub-system 616 using systems and methods such as those described herein. In an embodiment, responses to those queries are received by the communication sub-system 612 and/or processed by the machine learning sub-system 616 using systems and methods such as those described herein. For example, if the member 602 sends a query to the representative 608 to begin a project and/or to perform a task associated with a particular project, the query and/or the responses from the representative 608 may be received by the communication sub-system 612 and/or processed by the machine learning sub-system 616 and that processing and/or analysis may be used by the task facilitation service 604 to improve algorithms associated with tasks performed on behalf of the member 602 including, but not limited to, a recommendation algorithm, a proposal task generation algorithm, other machine learning algorithms, and/or language processing algorithms all as described herein.

As used herein, NLP is a mechanism whereby computational systems such as those described herein may be used to process and analyze language (from text and audio sources) that is natural (i.e., unstructured). In such systems, the result of the analysis may enable the NLP systems to generate insights (i.e., information) about the contents of the source documents and, by extension, about other documents that are in the same language. In such systems, the result of the analysis may enable the NLP systems to categorize and/or provide metadata about the source documents and/or about other documents. Being able to both understand and categorize natural language enables a system to generate better and/or more accurate insights from natural language and may provide a basis for a system that can receive natural language, understand it, and respond in a reasonable manner. As the NLP systems process and analyze a larger set of natural language sources, the quality of the understanding and interaction may improve. As an illustrative example, an NLP system may analyze a large number of documents and may generate an insight that indicates "a document that frequently uses the phrase 'in an embodiment' and that concludes with a set of claims is probably a patent application." Examples of NLP systems include, but are not limited to, rule-based NLP (also referred to as "symbolic" NLP and based on sets of applied rules), statistical NLP (generally implemented with unsupervised and/or semi-supervised statistical analyses of unstructured data), and Neural NLP (based on representation learning and deep-learning AI techniques). As may be contemplated, when analyzing text sources for NLP, systems can directly input the text into the analysis system while analyzing audio sources may involve first performing speech recognition on the audio source to extract the words and then those words can be input into the analysis system.

As may be contemplated, methods of performing language processing 614 including, but not limited to, those based on named entity recognition, sentiment analysis, shallow parsing, dependency syntax, semantic role labelling, discourse parsing, and/or semantic parsing as well as techniques based on multilinguality and/or multimodality, may be used to obtain information from the representative communications 606, the member communications 610, and/or other such communications (e.g., the communications between the representative 608 and the assistant representative 620 described below) and to provide analysis of those communications to the systems, sub-systems, and/or services associated with the task facilitation service 604.

In the example illustrated in FIGS. 6A-6B, the communication sub-system 612 sends the results of the language processing 614 analysis to a machine learning sub-system 616 which may use the results of the natural language processing 614 analysis to generate proposal recommendations, ranked proposals, proposal ranking, and/or to provide other services such as those described herein. For example, the machine learning sub-system 616 may use the results of the natural language processing 614 analysis to determine that a comment by the member 602 about elements of a proposal (e.g., "Wow, that place looks great!" when discussing the "Wine Cottage") as a positive indication about the "Wine Cottage" and an indication that the "Wine Cottage" should be chosen again (for this member and/or for other similarly-situated members) on future proposals.

FIG. 6B provides an illustrative example of the aforementioned processes as communications are exchanged in real-time between the member 602 and the representative 608. As illustrated in FIG. 6B, the member 602 is engaged in a project-specific communications session 630 with the representative 608, through which the member 602 and the representative 608 may be communicating with one another with regard to a particular proposal recommendation previously provided to the member 602. For instance, through one or more initial representative communications 606 illustrated in FIG. 6B, the representative 608 may prompt the member 602 to provide feedback with regard to the proposal recommendations for the "Wine Cottage" and "Hotel Vino" options associated with a project corresponding to a parent anniversary weekend for the member's parents (e.g., "So what did you think about the Wine Cottage and Hotel Vino options for your parents?"). Further, through the initial representative communications 606, the representative 608 may provide their own opinion or feedback with regard to the previously communicated proposal recommendations (e.g., "I think these look like a lot of fun!").

The communication sub-system 612 may perform natural language processing 614 analysis of these initial representative communications 606 to generate an output that is indicative of the representative's positive reception to the "Wine Cottage" and "Hotel Vino" proposal recommendations. For example, through the natural language processing 614 analysis, the communication sub-system 612 may produce an output that includes one or more anchor terms and/or phrases that are indicative of the representative's feedback with regard to these proposal recommendations. For instance, the communication sub-system 612, through the natural language processing 614 analysis, may detect the anchor phrases "Wine Cottage" and "Hotel Vino," which may correspond to specific proposal recommendations communicated to the member 602 and referred to in the initial representative communications 606. Further, the communication sub-system 612, through the natural language processing 614 analysis, may detect the anchor term "fun" in association with the anchor phrases "Wine Cottage" and "Hotel Vino." The combination of the anchor term "fun" and the anchor phrases "Wine Cottage" and "Hotel Vino" may be indicative of the representative's positive reception of these proposal recommendations.

The machine learning sub-system 616, in response to receiving the representative's feedback with regard to the previously provided proposal recommendations for the parent anniversary weekend, may automatically, and in real-time, update a proposal recommendation algorithm (as described in greater detail herein) to reinforce the proposal recommendation algorithm such that, for similar projects, the proposal recommendations corresponding to the "Wine Cottage" and "Hotel Vino" are more likely to be presented to the representative 608 and other representatives assigned to these similar projects for selection and presentation to members associated with the task facilitation service 604.

As illustrated in FIG. 6B, the member 602, in response to the representative's prompt for feedback regarding the "Wine Cottage" and the "Hotel Vino" options for the parent anniversary weekend, may transmit a member communication 610 that is responsive to the prompt. For example, as illustrated in FIG. 6B, the member 602 has stated "Wow, those places look amazing! However, I'm a little concerned about the price for the Hotel Vino." The communication sub-system 612 may automatically perform a natural language processing 614 analysis of this member communication 610 to obtain, in real-time, the member's feedback regarding the two aforementioned proposal recommendations referred to by the representative 608. For instance, the communication sub-system 612, through the natural language processing 614 analysis, may detect the anchor terms and phrases "places look amazing," "concerned," "price for," and "Hotel Vino." Accordingly, the output produced through the natural language processing 614 analysis may indicate that the member 602 approves the "Wine Cottage" proposal recommendation but is concerned with regard to the price for the "Hotel Vino," even though the member 602 generally approves of the "Hotel Vino" recommendation for the parent anniversary weekend.

The machine learning sub-system 616, in response to the member's feedback with regard to the proposal recommendations related to the "Wine Cottage" and the "Hotel Vino," may automatically update the proposal recommendation algorithm such that, for similar projects, the proposal recommendations corresponding to the "Wine Cottage" and "Hotel Vino" are more likely to be presented to the representative 608 and other representatives assigned to these similar projects for selection and presentation to members associated with the task facilitation service 604. However, unlike the aforementioned process for updating the proposal recommendation algorithm based on the representative communications 606, the machine learning sub-system 616 may further update the proposal recommendation algorithm such that, for similarly-situated members (e.g., members that are budget conscious, such as member 602), the proposal recommendation algorithm will be less likely to provide a proposal recommendation corresponding to the "Hotel Vino" for similar projects. Further, the machine learning sub-system 616 may also update the proposal recommendation algorithm such that, for similarly-situated members and for similar tasks, the proposal recommendation algorithm will be more likely (e.g., reinforced) to generate and provide a proposal recommendation related to the "Wine Cottage," which the member 602 expressed as being "amazing" and acceptable (e.g., the member 602 did not express concern with regard to the "Wine Cottage" proposal recommendation).

In an embodiment, the machine learning sub-system 616 can also automatically, and in real-time, update a member profile associated with the member 602 based on the member communications 610 expressed through the communications session 630. Returning to the previously described member communication, whereby the member 602 expressed their concern with the price for the "Hotel Vino" proposal recommendation, the machine learning sub-system 616 may automatically update the member profile associated with the member 602 to indicate that the member 602 is budget conscious for similar proposal recommendation types. The update to the member profile may improve the efficiency of the machine learning sub-system 616, through the various algorithms described herein, in creating and presenting proposal recommendations to the member 602 that are more likely to be accepted or otherwise be received positively by the member 602 for different projects and tasks.

In an embodiment, based on the feedback provided by the member 602 through the member communications 610, the machine learning sub-system 616 (through a proposal recommendation algorithm and/or other algorithms described herein) may automatically, and in real-time, generate a new proposal recommendation 640 that may be presented to the member 602 for the particular project or task. For example, as illustrated in FIG. 6B, the machine learning sub-system 616 has generated an alternative proposal recommendation 640 that includes a two-night stay at "Hotel Rioja" as opposed to the previously recommended "Hotel Vino." To generate this alternative proposal recommendation 640, the machine learning sub-system 616 may automatically query the resource library to identify other possible venues for the two-night stay according to the parameters associated with the task or project (e.g., within a particular distance from other venues associated with the task or project, complimentary to other venues associated with the task or project, etc.) and that may satisfy the member's requirements (as indicated in the member profile and/or through the member communications 610 expressed through the communications session 630). For example, the machine learning sub-system 616 may automatically query the resource library to identify a hotel that is less expensive than the previously presented proposal recommendation but that comports with the parameters associated with the task or project (e.g., is within a short distance from the "Wine Cottage," etc.). Based on the query results, the machine learning sub-system 616 may automatically generate one or more alternative proposal recommendations 640 that may be provided to the representative 608 for their review.

In some instances, the machine learning sub-system 616, through a proposal ranking algorithm, may re-rank the set of proposals now including the alternative proposal recommendations 640 to generate a new ranking of the set of proposals. This new ranking may be provided to the representative 608, which may review the new ranking of the set of proposals and determine which revised proposals to present to the member 602. Alternatively, the machine learning sub-system 616 may utilize a proposal selection algorithm, as described herein, to automatically select which revised proposals (if any) may be presented to the member 602 in response to their feedback with regard to previously presented proposal recommendations.

As illustrated in FIG. 6B, the representative 608, in response to receiving an alternative proposal recommendation 640 through which the "Hotel Rioja" is being recommended for the two-night stay associated with the parent anniversary weekend, may transmit one or more representative communications 606 indicating that they have received a new proposal recommendation and that this new proposal recommendation has been sent to the member 602 (such as through a task- or project-specific interface provided by the task facilitation service 604). In response to the new proposal recommendation provided by the representative 608, the member 602, through the communications session 630, may indicate that they approve of the new proposal recommendation. For example, as illustrated in FIG. 6B, the member 602 has stated "Thanks for the help! I like the Hotel Rioja better. Let's get this set up!"

The communication sub-system 612 may automatically perform a natural language processing 614 analysis of this new member communication 610 to obtain, in real-time, the member's feedback regarding the "Hotel Rioja" proposal recommendations referred to by the representative 608. For instance, the communication sub-system 612, through the natural language processing 614 analysis, may detect the anchor terms and phrases "I like," "Hotel Rioja," "better," and "get this set up." Accordingly, the output produced through the natural language processing 614 analysis may indicate that the member 602 approves the "Hotel Rioja" proposal recommendation and that the representative 608 may proceed with the accepted proposal.

As noted above, the machine learning sub-system 616 may update, in real-time, a proposal recommendation algorithm based on feedback provided by members and representatives communicated through task- or project-specific communications sessions. For instance, in response to the member's feedback with regard to the proposal recommendation related to the "Hotel Rioja," the machine learning sub-system 616 may automatically update the proposal recommendation algorithm such that, for similar projects, the proposal recommendation corresponding to the "Hotel Rioja" is more likely to be presented to the representative 608 and other representatives assigned to these similar projects for selection and presentation to members associated with the task facilitation service 604. Further, the machine learning sub-system 616 may also update the proposal recommendation algorithm such that, for similarly-situated members and for similar projects or tasks, the proposal recommendation algorithm will be more likely (e.g., reinforced) to generate and provide a proposal recommendation related to the "Hotel Rioja," which the member 602 expressed as being "better" and that the representative 608 should proceed with this proposal recommendation.

Additionally, the machine learning sub-system 616, based on the communications expressed through the communications session 630, may automatically generate one or more proposal tasks that may be performed to complete the project or task according to the selected proposal recommendations. As described in greater detail herein, the machine learning sub-system 616 may implement a proposal task generation algorithm to automatically, and in real-time, generate one or more proposal tasks corresponding to any selected proposal recommendations. In an embodiment, the proposal task generation algorithm is trained using a dataset of sample tasks, including proposal tasks, and task parameters using systems and methods such as those described herein. Further, the proposal task generation algorithm may be trained using proposal recommendations such as those described herein and using systems and methods such as those described herein. In an embodiment, the machine learning sub-system 616 generates proposal tasks by applying the proposal task generation algorithm to the project/task and/or to communications associated with the project or task in real-time as these communications are exchanged, such as through the communications session 630.

Thus, as communications (such as the member communications 606 and the representative communications 610) are exchanged over a task- or project-specific communications session 630, the communication sub-system 612 and the machine learning sub-system 616 may, in real-time and as these communications are exchanged, obtain feedback related to presented proposals and corresponding proposal recommendations. Further, the communication sub-system 612 and the machine learning sub-system 616 may, in real-time and as these communications are exchanged, generate alternative proposal recommendations that may be presented to members and obtain feedback with regard to these alternative proposal recommendations. Additionally, the communication sub-system 612 and the machine learning sub-system 616 may, in real-time and as these communications are exchanged, detect member approval of proposal recommendations such that, in response to this member approval, the machine learning sub-system 616 may automatically generate, in real-time, proposal tasks that may be performed to complete a project or task according to the approved proposal recommendations.

In an embodiment, not illustrated in FIGS. 6A-6B, the machine learning sub-system 616 performs the natural language processing 614 analysis. In an embodiment, also not illustrated in FIGS. 6A-6B, a different system of the task facilitation service 604 (e.g., a language processing sub-system) performs the language processing 614 analysis. In an embodiment, also not illustrated in FIGS. 6A-6B, a third-party service or other service/entity affiliated with the task facilitation service 604 (e.g., a service such as the service 1926 or a service provided by a computing resources provider such as the computing resources provider 1928, both described herein at least in connection with FIG. 19) performs the natural language processing 614 analysis rather than the communication sub-system 612. For example, a computing resources provider such as the computing resources provider 1928 described herein at least in connection with FIG. 19 may provide NLP services to obtain information from the representative communications 606, the member communications 610, and/or other such communications and to provide, in real-time, analysis of those communications to the systems, sub-systems, and/or services associated with the task facilitation service 604.

In the example illustrated in FIG. 6A, an assistant representative 620 performs functions in association with, or on behalf of, the representative 608. The assistant representative 620 can communicate with the representative 608 to perform these functions. For example, the assistant representative 620 may perform research about proposal recommendations and provide that research to the representative 608. In an embodiment, communications between the assistant representative 620 and the representative 608 (i.e., communications from the representative 608 to the assistant representative 620 and/or communications from the assistant representative 620 to the representative 608) are monitored in real-time by the communication sub-system 612 as these communications are exchanged. In an embodiment, the communication sub-system 612 performs language processing 614 as described herein to obtain information from the monitored communications to provide analysis of the communications to the systems, sub-systems, and/or services associated with the task facilitation service 604. For example, if the assistant representative 620 informs the representative that "the Hotel Vino is closed for renovation for three months" in a message, the communication sub-system 612 may perform language processing 614 to determine that the "Hotel Vino" should not be part of a proposal that takes place during that three-month period. As described above, the language processing 614 may be performed by the machine learning sub-system 616, another service of the task facilitation service 604, or some other such service.

Although not illustrated in FIGS. 6A-6B, in an embodiment, the assistant representative 620 can also communicate with the member 602 through the project- or task-specific communications session corresponding to the particular project or task, respectively, to perform functions in association with, or on behalf of, the representative 608. Similarly, the assistant representative 620 can communicate with the member 602 to respond to queries from and/or to otherwise communicate with the member 602. In such an embodiment, the communications from the assistant representative 620 to the member 602 may be considered to be the same as the representative communications 606 with respect to how those communications are received and/or processed. Similarly, in such an embodiment, the communications from the member 602 to the assistant representative 620 may be considered to be the same as the member communications 610 with respect to how those communications are received and/or processed.

In an embodiment, the machine learning sub-system 616 communicates with and/or interacts with a representative support sub-system 618. As used herein, a representative support sub-system 618 is a system of the task facilitation service that provides services for the representative 608 and/or for the assistant representative 620 when the representative 608 and/or the assistant representative 620 performs tasks as such as those described herein to reduce the cognitive load on the member 602. For example, when the representative 608 communicates a proposal recommendation to the member 602 for a two-night stay at the "Wine Cottage" using systems and methods such as those described herein, the representative 608 may use the representative support sub-system 618 to get the address and phone number of the "Wine Cottage," or may use the representative support sub-system 618 to gather reviews of the "Wine Cottage" from social media, or may use the representative support sub-system 618 to gather other such information.

In an embodiment, the services of the representative support sub-system 618 may be based on other representative communication 624 including, but not limited to, communications exchanged between other representatives associated with the task facilitation service 604 and other members associated with the task facilitation service 604, as these other communications are exchanged in real-time. These other communications may be exchanged between these other representatives and the other members during the communications session between the member 602 and the representative 608 for a particular project or task. As may be contemplated, the other representative communication 624 may also include communications between other representatives associated with the task facilitation service 604 and the member 602, communication between the representative 608 and other members associated with the task facilitation service 604, and/or communication between the assistant representative 620 or other assistant representatives to and from the member 602 or other members associated with the task facilitation service 604. Although not illustrated in FIGS. 6A-6B, in an embodiment, these communications are monitored in real-time by a system such as the communication sub-system 612 and processed by language processing 614 using systems and methods such as those described herein.

As may be contemplated, other types of communications between various entities associated with the task facilitation service 604 may be monitored by a system such as the communication sub-system 612 and processed using language processing 614, using systems and methods such as those described herein. For example, communications between the representative 608 and other representatives associated with the task facilitation service 604 and/or communications between the other representatives may be monitored by a system such as the communication sub-system 612 and processed using language processing 614 to generate insights for the task facilitation service 604 as described herein. In such an example, when the representatives discuss generating, communicating, and accepting proposals, a system such as the communication sub-system 612 may monitor those discussions and process those communications using language processing 614 to provide insights (i.e., recommendations) for the task facilitation service 604. Similarly, communications between the member 602 and other members associated with the task facilitation service 604 and/or communications between the other members may be monitored by a system such as the communication sub-system 612 and processed using language processing 614. For example, the members associated with the task facilitation service 604 may participate in an online forum where they discuss elements of the task facilitation service 604 and, in this example, the discussions may be monitored by a system such as the communication sub-system 612 and processed using language processing 614.

In the example illustrated in FIG. 6A, the representative support sub-system 618 provides an automated representative 622 which is an automatic process (or "bot") that is configured to perform some or all of the functions of the representative 608 and/or the assistant representative 620. For example, as described herein, systems associated with the task facilitation service 604 can utilize responses provided by the member during the onboarding process and/or other communications as input to a machine learning algorithm or artificial intelligence system to generate a member profile. In this example, the automated representative 622 (or "bot") may serve as a stand-in for the representative 608 and represent the representative 608 in some of the interactions between the member 602 and the task facilitation service 604. The automated representative 622 may be configured to autonomously communicate with the member 602 to generate tasks and proposals, perform tasks on behalf of the member 602 in accordance with any approved proposals, and the like. The automated representative 622 may also be configured according to the parameters or characteristics of the member 602 as defined in the member profile. As the automated representative 622 communicates with the member 602 over time, the automated representative 622 may be updated to improve the interaction of the automated representative 622 with the member 602. In an embodiment, the member profile may be based on a computational model of the member 602 that is based on and updated from data based on the interaction of the member 602 with the task facilitation service 604. As may be contemplated, this computational model may be generated and/or updated using data obtained from the communication sub-system 612 using systems and methods such as those described herein. As may also be contemplated, over time and as the computational model improves, the automated representative 622 may perform a greater number of tasks for the representative 608 and/or the assistant representative 620 both with and without oversight and/or monitoring by the representative 608.

As an illustrative example, a relative of the member 602 may have a birthday on April 15. On the first year that the member 602 is associated with the task facilitation service 604, the representative 608 may be informed of the birthday by the member 602 (i.e., via the member communications 610) and systems of the task facilitation service 604 may generate proposals for a birthday party, receive a response from the member 602, and facilitate the tasks associated with the party using systems and methods such as those described herein. In subsequent years, the automated representative 622 may take over more of those tasks and may, for example, automatically generate a proposal for the party prior to the birthday that is based on the member profile and send that proposal to the representative 608 so that the representative 608 may obtain approval for the proposal. In later years, the automated representative 622 may generate the proposal, communicate the proposal to the member 602, receive the approval, and facilitate the tasks with minimal intervention and/or oversight of the representative 608.

Figure 7:
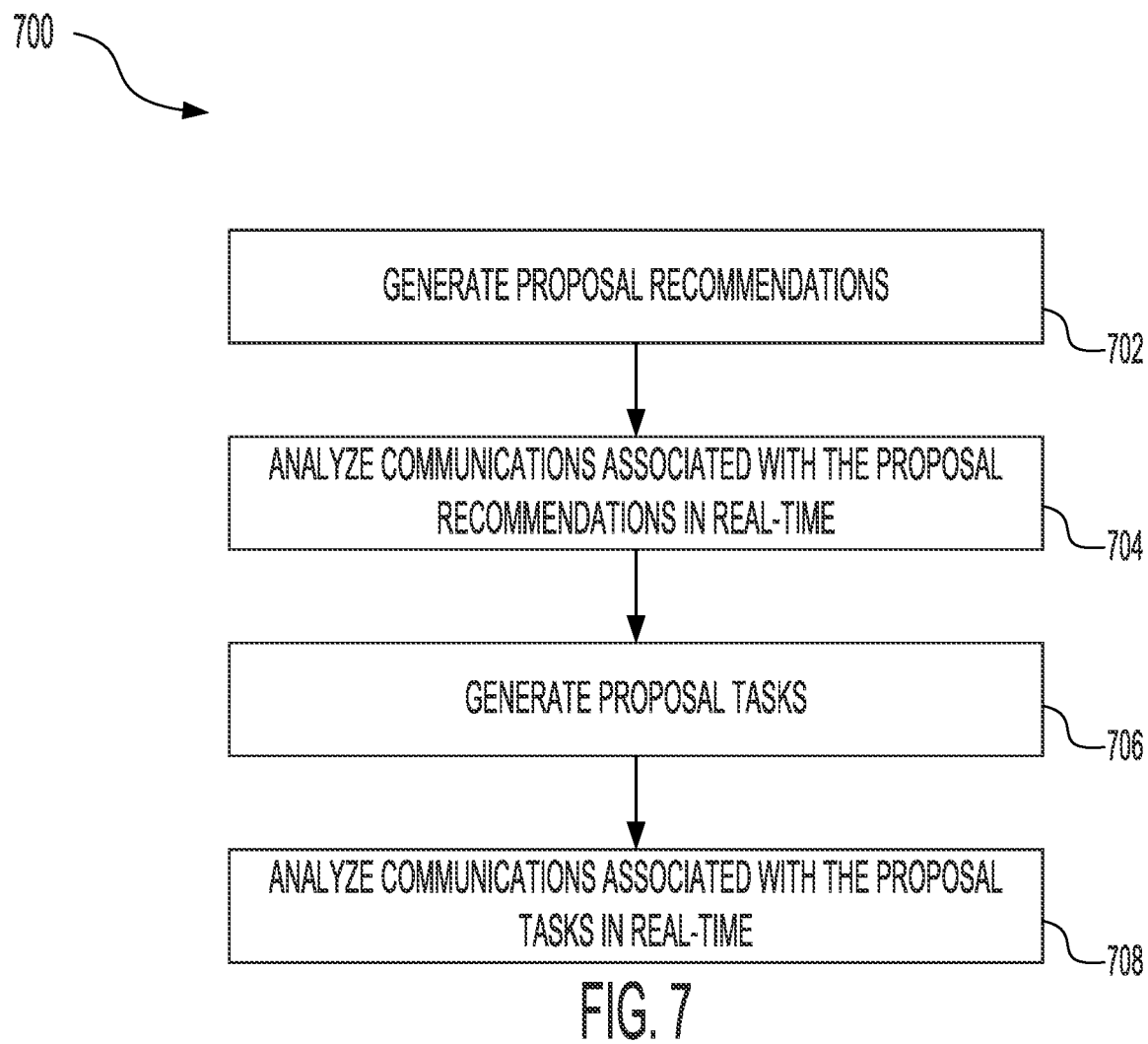
FIG. 7 shows an illustrative example of a process for processing communications associated with proposals in real-time in accordance with at least one embodiment.

FIG. 7 shows an illustrative example of a process 700 for processing communications associated with proposals in real-time in accordance with at least one embodiment. Systems and/or sub-systems of the task facilitation service such as the task facilitation service 102 described herein at least in connection with FIG. 1 may perform the example process 700 illustrated in FIG. 7.

At step 702 of the example process 700, systems and/or sub-systems of the task facilitation service generate proposal recommendations for a particular project or task. In an embodiment, the systems and/or sub-systems of the task facilitation service implements a proposal recommendation algorithm to automatically generate a set of proposal recommendations for the particular project or task. The proposal recommendation algorithm is an algorithm implemented by the task recommendation system 512 described herein at least in connection with FIG. 5. The proposal recommendation algorithm may be trained using a dataset of sample task parameters and corresponding proposal recommendations using systems and methods such as those described herein. In an embodiment, the systems and/or sub-systems of the task facilitation service generate proposal recommendations using the proposal recommendation algorithm by applying the proposal recommendation algorithm to the project or task or to parameters associated with the task or project.

As used herein, the proposal recommendation algorithm is an algorithm that may be used by a system, service, and/or sub-system of the task facilitation service to generate proposal recommendations using a machine learning algorithm, an artificial intelligence system, and/or a computational model as described herein. In an embodiment, the proposal recommendations include one or more indications of the suitability of the proposal recommendations. Such indications of the suitability of the proposal recommendation (also referred to herein as a "suitability metric" for the proposal recommendation) may be automatically generated by a system, service, and/or sub-system of the task facilitation service using a machine learning algorithm, an artificial intelligence system, and/or a computational model such as those described herein.

In an embodiment, one or more algorithms associated with the proposal generation, communication, and/or acceptance processed are updated in real-time when the proposals have been ranked and/or selected. For example, as described herein, the proposal recommendation algorithm may be updated based on a proposal ranking and/or a proposal selection. As may be contemplated, if a proposal is generated by the proposal recommendation algorithm and that proposal is not ranked highly and/or not selected as a ranked proposal to communicate to the member, the machine learning algorithm, artificial intelligence system, and/or computational model of the proposal recommendation algorithm may be updated to reflect that that proposal was not a good recommendation. Similarly, if a proposal is generated by the proposal recommendation algorithm and that proposal is ranked highly and/or selected as a ranked proposal to communicate to the member, the machine learning algorithm, artificial intelligence system, and/or computational model of the proposal recommendation algorithm may be updated to reflect that that proposal was a good recommendation.

In an embodiment, the proposal generation algorithm is updated dynamically, continuously, and in real-time so that, for example, when proposals are generated, the proposal generation algorithm may be updated in real-time. Similarly, when proposals are accepted and/or are ranked, the proposal generation algorithm may be updated in real-time as these proposals are accepted and/or ranked. As may be contemplated, when the proposals and/or the ranked proposals are selected (e.g., using the proposal selection algorithm, by a representative associated with a member, by a member, etc.), when the representative provides a final verification of the ranked proposals before they are communicated to the member, and/or when the ranked proposals are communicated to the member, the proposal generation algorithm may be updated in real-time. In an embodiment, the proposal generation algorithm is continuously and/or dynamically updated in real-time so that the proposal generation algorithm may be updated several times during the processes described herein. In such an embodiment, the proposal generation algorithm may be updated more than once during the steps of the processes illustrated in, for example, FIG. 7 and described herein. For example, when proposals are generated at step 702, a plurality of steps may be undertaken to generate the proposals. In such an example and in an embodiment where the proposal generation algorithm is continuously and/or dynamically updated in real-time, the proposal generation algorithm may be updated several times (i.e., during one or more of the plurality of steps undertaken to generate the proposals).

It should be noted that the proposal recommendation algorithm may be updated in real-time as different proposals are generated and ranked for communication to different members associated with the task facilitation service. For example, the proposal recommendation algorithm may continuously generate different proposals for different tasks/projects associated with the member and other members associated with the task facilitation service simultaneously in real-time. Further, as proposals are communicated to different members, any feedback corresponding to the ranking and selection of these proposals may be used to dynamically update the proposal recommendation algorithm in real-time such that, for other tasks/projects being processed contemporaneously and in real-time, the proposal recommendation algorithm may provide accurate results (e.g., proposals, proposal recommendations, etc.).

In an embodiment, other algorithms used to generate, communicate, and/or accept ranked proposals are also updated dynamically, continuously, and in real-time. For example, when the systems, sub-systems, and services of the task facilitation service generate proposal tasks using a proposal task generation algorithm (as described herein with respect to step 706), the proposal task generation algorithm may be updated in real-time and at the time that the proposal task generation algorithm is used to generate the proposal tasks. Similarly, the proposal task generation algorithm may be updated continuously and/or dynamically so that, for example, the proposal task generation algorithm may be updated several times during the processes for proposal task generation described herein. Accordingly, when task facilitation service generates the proposals tasks using the proposal task generation algorithm and a plurality of steps is undertaken to generate the proposals tasks, the proposal task generation algorithm may be updated several times (i.e., dynamically and continuously) during the plurality of steps undertaken to generate the proposal tasks.

At step 704 of the example process 700, systems and/or sub-systems of the task facilitation service analyze communications associated with the generated proposal recommendations in real-time as these communications are exchanged or otherwise communicated. In an embodiment, the systems and/or sub-systems of the task facilitation service implements a language processing algorithm to automatically, and in real-time, analyze these communications as they are exchanged or otherwise communicated. The language processing algorithm may be dynamically trained using a dataset of sample task communications (as described herein) using systems and methods such as those described herein. In an embodiment, systems and/or sub-systems of the task facilitation service analyze communications associated with the generated proposal recommendations using a natural language processing algorithm as described herein.

In an embodiment, the systems and/or sub-systems of the task facilitation service implement one or more classical algorithms or processes that may be used to process the communications associated with the generated proposal recommendations in real-time as these communications are exchanged or otherwise communicated. For instance, these one or more classical algorithms or processes may process exchanged communications in real-time to identify a set of anchor words or phrases corresponding to any interaction with the generated proposal recommendations. For example, if a member communicates, to a representative, "Let's go with the Hotel Vino proposal," the one or more classical algorithms or processes may identify the anchor phrases "Let's go with" and "Hotel Vino." The anchor phrase "Let's go with" may correspond to a member selection of a proposal recommendation and the anchor phrase "Hotel Vino," in conjunction with the member selection, may correspond to the particular recommendation selected. Thus, based on a communication expressed by the member in response to presentation of one or more proposal recommendations, the one or more classical algorithms or processes may automatically identify a member's selection of a particular proposal recommendation for a project or task.

At step 706 of the example process 700, systems and/or sub-systems of the task facilitation service generate proposal tasks corresponding to any selected proposal recommendations. In an embodiment, the systems and/or sub-systems of the task facilitation service implements a proposal task generation algorithm to automatically, and in real-time, generate one or more proposal tasks corresponding to any selected proposal recommendations. The proposal task generation algorithm may be implemented by the task recommendation system 512 described herein at least in connection with FIG. 5. In an embodiment, the proposal task generation algorithm is trained using a dataset of sample tasks, including proposal tasks, and task parameters using systems and methods such as those described herein. Further, the proposal task generation algorithm may be trained using proposal recommendations such as those described herein and using systems and methods such as those described herein. In an embodiment, the systems and/or sub-systems of the task facilitation service generate proposal tasks by applying the proposal task generation algorithm to the task and/or to communications associated with the project or task in real-time as these communications are exchanged. In an embodiment, the systems and/or sub-systems of the task facilitation service generate proposal tasks by applying the trained recommendation algorithm to parameters associated with the task.

Task parameters used to dynamically train the proposal task generation algorithm may include a sample dataset of task parameters such as an allocated budget, a timeframe for completion of the task, preferred brands, preferred third-party services and/or other services/entities affiliated with the task facilitation service, and the like. The dataset of sample task parameters may be generated from actual tasks (e.g., previously proposed tasks), from a hypothetical, theoretical, and/or idealized set of tasks, or from a combination of actual and hypothetical, theoretical, and/or idealized tasks. The sample dataset of proposal tasks used to dynamically train the proposal task generation algorithm may be generated from actual tasks, projects, and proposal tasks for those projects, from a hypothetical, theoretical, and/or idealized set of proposal tasks, or from a combination of actual and hypothetical, theoretical, and/or idealized proposal tasks.

In some instances, the proposal tasks may be generated using one or more classical algorithms or processes, whereby these classical algorithms or processes may be executed to automatically generate proposal tasks based on the provided proposal response and details corresponding to the proposal itself. For example, based on the provided proposal response and the details corresponding to the proposal, the classical algorithms or processes may automatically query a resource library implemented by the task facilitation service to identify a set of tasks that may be performed for the particular project according to the proposal response. The resource library, for different proposals and proposal recommendations, may maintain a repository of different tasks that may be performed to fulfill projects corresponding to these different proposals and proposal recommendations. These different tasks may be populated by representatives and/or the various systems and sub-systems implemented by the task facilitation service (as described herein) based on past performance of these tasks for different proposals and proposal recommendations. Thus, from the resource library, the classical algorithms or processes may automatically identify any tasks that may be performed according to the proposal response for the particular project.

In an embodiment, the proposal tasks can be generated using a combination of the aforementioned classical algorithms or processes and a representative assigned to the member for which the proposal tasks are being generated. For instance, the classical algorithms or processes described above may provide the representative with any results generated through one or more queries of the resource library for the particular proposal and/or proposal recommendations accepted by the member. The representative may review these query results provided by the classical algorithms or processes to select one or more proposal tasks that may be performed for the selected proposal and/or proposal recommendations. Additionally, or alternatively, the representative may modify any of the proposal tasks provided by the classical algorithms or processes according to the representative's understanding of the member (e.g., from data associated with a member profile, from the representative's own personal knowledge of the member, etc.). For example, if the classical algorithms or processes obtain a proposal task corresponding to a dinner reservation at a particular hotel, and the representative knows that the member has a severe shellfish allergy, the representative may modify the proposal task to indicate that the hotel is to be notified ahead of the dinner at the particular hotel that the member has a severe shellfish allergy and to ensure that no served food is contaminated with shellfish.

At step 708 of the example process 700, systems and/or sub-systems of the task facilitation service systems and/or sub-systems of the task facilitation service analyze, in real-time, communications associated with the generated proposal tasks as these communications are exchanged. As described above, in an embodiment, a language processing algorithm is trained using a dataset of sample communications (as described herein) using systems and methods such as those described herein. In an embodiment, systems and/or sub-systems of the task facilitation service analyze communications associated with the generated proposal tasks using a natural language processing algorithm such as the natural language processing algorithms described herein. Alternatively, the systems and/or sub-systems of the task facilitation service may use one or more classical algorithms or processes to process the communications associated with the generated proposal tasks in real-time as these communications are exchanged or otherwise communicated. For instance, these one or more classical algorithms or processes may process exchanged communications in real-time to identify a set of anchor words or phrases corresponding to any interaction with the generated proposal tasks.

It should be noted that the process 700 may include additional and/or alternative steps based on the methods used to generate proposal recommendations and proposal task and the methods used to analyze, in real-time, communications between the member and the representative and/or the task facilitation service. For example, if the task facilitation service implements a proposal recommendation algorithm and a proposal task generation algorithm for performance of one or more of the aforementioned steps, the systems and/or sub-systems of the task facilitation service may update the proposal recommendation algorithm and/or the proposal task generation algorithm using the analyzed communications from step 704 and/or from step 708. For example, a task to hire a landscaper may have a plurality of proposal recommendations and may also have a plurality of proposal tasks which may, in turn, have a plurality of communications associated with generating the proposal and/or with generating the proposal tasks. In this example, the proposal recommendation algorithm and/or the proposal task generation algorithm may be updated in real-time based on communications associated with the proposal recommendations, the actions performed in association with the task recommendations, how successful the actions were in accomplishing the task, whether any actions were missed, whether any actions were extraneous, and other such factors. As may be contemplated, additional factors about the proposals, projects, task, vendors, etc. may provide additional input into the update of the recommendation algorithm and/or the proposal task generation algorithm.

In addition to updating the proposal recommendation algorithm and the proposal task generation algorithm (if implemented), the systems and/or sub-systems of the task facilitation service may update the language processing algorithm if implemented to automatically process communications between the member and the representative or the task facilitation service in real-time as these communications are exchanged. In an embodiment, systems and/or sub-systems of the task facilitation service update the recommendation algorithm and/or update the proposal task generation algorithm using the analyzed communications from step 704 and/or from step 708. Systems and methods for updating the language processing algorithm are described herein at least in connection with FIG. 5 and FIGS. 6A-6B.

Although not illustrated in FIG. 7, after step 708 of the example process 700, the example process 700 may restart at step 702 where systems and/or sub-systems of the task facilitation service may generate proposal recommendations. As may be contemplated, the steps 702-708 of the example process 700 may be performed in a different order than that described herein, may be performed in parallel, and/or may be re-entrant in that one or more of the steps 702-708 of the example process 700 may be performed first and then may be followed by one or more of the other steps 702-708 of the example process 700.

Figure 8A:
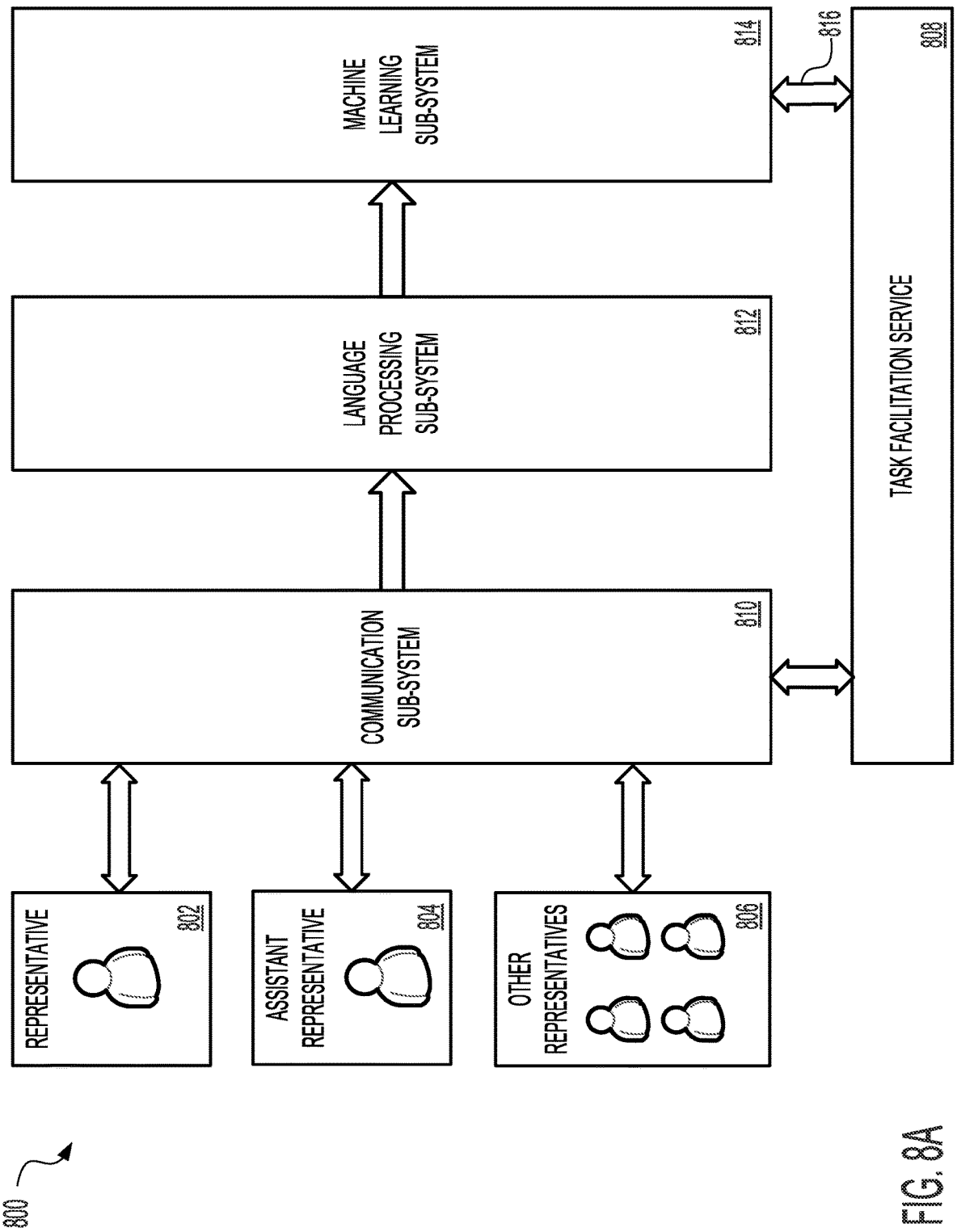
FIGS. 8A-8B shows an illustrative example of an environment in which communications received at a task facilitation service are received and processed in accordance with at least one embodiment.
Figure 8B:
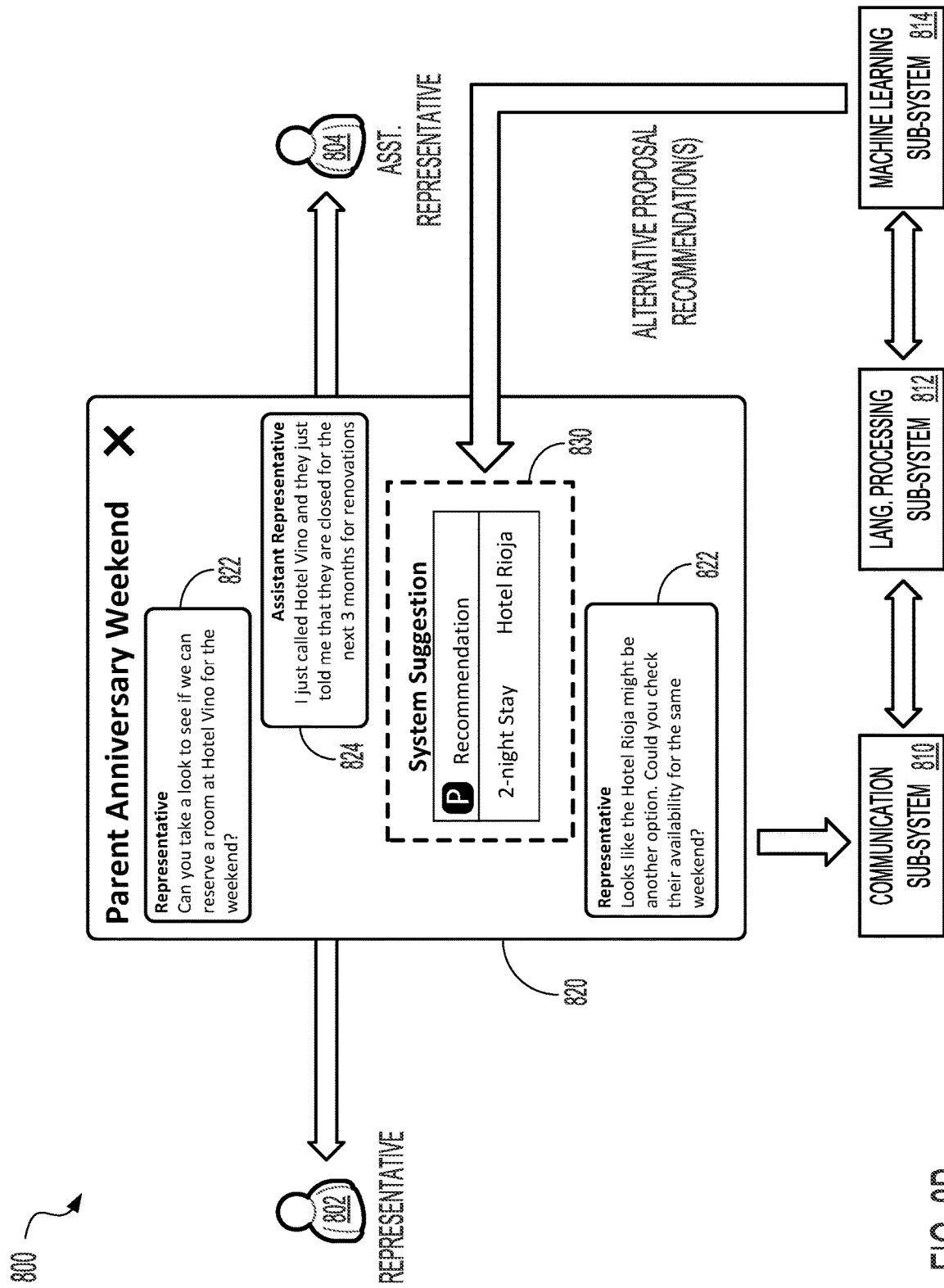

FIGS. 8A-8B show an illustrative example of an environment 800 in which communications received at a task facilitation service are received and processed in real-time in accordance with at least one embodiment. In the example illustrated in FIG. 8A, a representative 802 communicates with a task facilitation service 808 using systems and methods such as those described herein. In the example illustrated in FIG. 8A, the representative 802 communicates with the task facilitation service via a communication sub-system 810. In the example illustrated in FIG. 8A, the communication sub-system uses a language processing sub-system 812 and a machine learning sub-system 814 to analyze, in real-time, communications and/or interactions between the representative 802 and the various systems, sub-systems, and services of the task facilitation service 808 as described herein as these communications and/or interactions are performed.

For example, a representative 802 may send a query to the task recommendation system 212 described herein at least in connection with FIG. 2 to provide recommendations for a task on behalf of a member. The communications to the task recommendation system may be sent from the representative 802 to the communication sub-system 810, which may automatically send the communications to the task facilitation service 808 and which may also send the communications to the language processing sub-system 812 and to the machine learning sub-system 814. In the example illustrated in FIG. 8A, the machine learning sub-system 814 can directly interact 816 with the task facilitation service 808 to, for example, provide insights for task recommendations by the task recommendation system that may be based on the analysis of the communications between the representative 802 and the various systems, sub-systems, and services of the task facilitation service 808. As may be contemplated, responses to those queries (e.g., the task recommendations) from the task facilitation service 808 may also be sent via the communication sub-system 810 to the language processing sub-system 812 and to the machine learning sub-system 814. In an embodiment, not illustrated in FIGS. 8A-8B, the responses to those queries (e.g., the task recommendations) are sent directly from the various systems, sub-systems, and services of the task facilitation service 808 to the language processing sub-system 812 and to the machine learning sub-system 814 rather than being sent via the communication sub-system 810.

In the example illustrated in FIG. 8A, an assistant representative 804 may also communicate and/or interact with the task facilitation service 808. In the example illustrated in FIG. 8A, the assistant representative 804 communicates with the task facilitation service 808 via the communication sub-system 810, which uses the language processing sub-system 812 and the machine learning sub-system 814 to analyze communications and/or interactions between the assistant representative 804 and the various systems, sub-systems, and services of the task facilitation service 808.

In the example illustrated in FIG. 8A, one or more other representatives 806 may also communicate and/or interact with the task facilitation service 808. In the example illustrated in FIG. 8A, the one or more other representatives 806 communicate and/or interact with the task facilitation service via the communication sub-system 810, which uses the language processing sub-system 812 and the machine learning sub-system 814 to analyze communications and/or interactions between the one or more other representatives 806 and the various systems, sub-systems, and services of the task facilitation service 808 as described herein.

In an embodiment, communications and/or interactions between the representative 802, the assistant representative 804, and/or the one or more other representatives 806 are received by the communication sub-system 810, which may use the language processing sub-system 812 and the machine learning sub-system 814 to analyze the communications and/or interactions between the representative 802, the assistant representative 804, and/or the one or more other representatives 806 in real-time as these communications and/or interactions occur. For example, the representative 802 may send a message to the assistant representative 804 regarding a task that may be delegated to the assistant representative 804. Such a communication may be sent by the representative 802 to the communication sub-system 810, which may automatically send the communication to the assistant representative 804 and which may also send the communication to the language processing sub-system 812 and then to the machine learning sub-system 814 for analysis using systems and methods such as those described herein. As may be contemplated, responses by the assistant representative 804 to the representative 802 may also be sent via the communication sub-system for routing to the representative 802 and for analysis by the language processing sub-system 812 and the machine learning sub-system 814.

FIG. 8B provides an illustrative example of the aforementioned processes as communications are exchanged in real-time between the representative 802 and an assistant representative 804 with regard to a particular project or task for which the assistant representative 804 is assisting the representative 802 in determining the feasibility of a particular proposal recommendation. As illustrated in FIG. 8B, the representative 802 is engaged in a project-specific communications session 820 with an assistant representative 804, through which the representative 802 and the assistant representative 804 may be communicating with one another with regard to a particular proposal recommendation that the representative 802 would like assistance with. For instance, through an initial representative communication 822 illustrated in FIG. 8B, the representative 802 may prompt the assistant representative 804 for assistance in reserving a room for a member's parents at the Hotel Vino for a pre-defined weekend (e.g., "Can you take a look to see if we can reserve a room at Hotel Vino for the weekend?"). This request for assistance may be associated with a proposal recommendation similar to the proposal recommendation related to the Hotel Vino described above in connection with FIGS. 6A-6B.

The communication sub-system 810 may provide this initial representative communication 822 in real-time to the language processing sub-system 812, which may perform a natural language processing analysis of the initial representative communication 822 to generate an output that is indicative of the representative's request for assistance. For example, through the natural language processing analysis, the language processing sub-system 812 may produce an output that includes one or more anchor terms and/or phrases that correspond to the representative's request for assistance with regard to the Hotel Vino proposal recommendation. For instance, the language processing sub-system 812, through the natural language processing analysis, may detect the anchor phrases "take a look," "reserve a room," "Hotel Vino" and "the weekend." The anchor phrase "take a look" may represent a request to conduct research or otherwise make a determination with regard to a proposal recommendation. The anchor phrase "reserve a room" may supplement the previous anchor phrase "take a look," representing the action that is to be taken as part of the request. The anchor phrase "Hotel Vino" may uniquely identify the proposal recommendation for which the request has been submitted by the representative 802. Finally, the anchor phrase "the weekend" may denote a temporal qualification to the request, in this case defining the time and the amount of time for the reservation at Hotel Vino. Thus, through the identified anchor phrases, the language processing sub-system 812 may generate an output that is indicative of the representative's request to the assistant representative 804 and that provides one or more parameters for the request that may be used to automatically supplement the request for delivery to the assistant representative 804, as described herein.

The machine learning sub-system 814, in response to receiving the output from the language processing sub-system 812, may automatically, and in real-time, perform one or more operations to assist the assistant representative 804 with regard to the request submitted by the representative 802 through the communications session 820. For instance, based on the request submitted by the representative 802 and the output from the language processing sub-system 812, the machine learning sub-system 814 may automatically present, to the assistant representative 804 through a representative console provided by the task facilitation service 808, the particular proposal recommendation referred to by the representative 802 in their communication 822 to the assistant representative 804. For example, in response to the output from the language processing sub-system 812, the machine learning sub-system 814 may update the representative console associated with the assistant representative 804 to present the Hotel Vino proposal recommendation for the parent anniversary weekend project. The Hotel Vino proposal recommendation presented to the assistant representative 804 may include a detailed description of the proposal recommendation, any budgets defined for the proposal recommendation, any temporal parameters corresponding to the proposal recommendation (e.g., dates, times, etc.), and the like.

In some instances, the machine learning sub-system 814 may further automatically query a resource library maintained by the task facilitation service 808 to obtain any information that may assist the assistant representative 804 in addressing the request submitted by the representative 802. For example, the machine learning sub-system 814 may automatically query the resource library to obtain any availability information with regard to the Hotel Vino for the indicated weekend based on the output from the language processing sub-system 812. If the resource library maintains or otherwise has access to a central reservation system (CRS) or other platform for management of room inventory, rates, and reservations on behalf of various third-party establishments (e.g., Hotel Vino), the machine learning sub-system 814 may readily determine whether a reservation is available for the weekend in question. This information may be provided to the assistant representative 804 along with the proposal recommendation for which the query to the resource library was performed. This may reduce the amount of work required by the assistant representative 804 in addressing the request submitted by the representative 802.

In an embodiment, the machine learning sub-system 814 implements an automated assistance algorithm that is dynamically trained to automatically, and in real-time, perform one or more operations on behalf of an assistant representative 804 or any other representative 806 in response to a request from a representative 802 associated with a particular project or task. The automated assistance algorithm may be dynamically trained using supervised training techniques. For example, to dynamically train the automated assistance algorithm, the task facilitation service 808 may generate a dataset comprising various data points corresponding to different operations performed in response to different representative requests and feedback (if any) corresponding to the performance of these different operations. As an illustrative example of a particular data point that may be included in the training dataset, a data point may include a sample project or task, a corresponding proposal recommendation associated with the project or task, a request corresponding to the proposal recommendation, the one or more actions performed in response to the request, and a response to these one or more actions (e.g., feedback). Based on this training dataset, the automated assistance algorithm may be dynamically trained to identify and automatically perform one or more actions to assist a recipient of the request in fulfilling the request.

In an embodiment, the machine learning sub-system 814 obtains, in real-time, feedback corresponding to the automatic performance of the automated assistance algorithm of any identified actions in response to a detected request. For example, through the communication sub-system 810 and the language processing sub-system 812, the machine learning sub-system 814 may automatically, and in real-time, process any communications corresponding to the performance of these identified actions by the automated assistance algorithm as these communications are exchanged through the communications session 820 or other communications session corresponding to the project or task being performed and coordinated amongst the representative 802, the assistant representative 804, and/or any other representatives 806 that may be involved in completing the project or task. For example, if the automated assistance algorithm provides to the assistant representative 804 reservation information for the Hotel Vino for a time period outside of the identified weekend, the assistant representative 804 and/or the representative 802 may indicate, through the communications session 820, that the provided reservation information is irrelevant to the request. A communication to this effect may be automatically processed by the machine learning sub-system 814 (such as through the communication sub-system 810 and the language processing sub-system 812) to determine that the automated assistance algorithm has failed to provide accurate results (e.g., reservation information for the indicated weekend) in response to the detected request. Accordingly, the machine learning sub-system 814 may update the training dataset to provide a new data point corresponding to this request. The data point may include parameters corresponding to the request, the action (s) performed by the automated assistance algorithm in response to the request, the feedback provided by the representative 802 and/or the assistant representative 804, and the correct action that should have been performed (as indicated in the communication and/or as defined by the machine learning sub-system 814). This new data point may be used to further train the automated assistance algorithm to more accurately determine what one or more actions should be performed in response to a detected request.

Returning to the illustrative example illustrated in FIG. 6B, in response to the request from the representative 802 to the assistant representative 804 to determine whether a reservation at the Hotel Vino can be secured for a specific weekend, the assistant representative 804, through a new communication 824, has indicated that the Hotel Vino is closed for the next three months due to renovations. This communication 824 may, thus, be indicative of an inability to fulfill this proposal recommendation for the specified time period. In an embodiment, the communication sub-system 810 provides the communication 824 in real-time to the language processing sub-system 812, which may perform a natural language processing analysis of the communication 824 to generate an output that is indicative of the unavailability of the Hotel Vino during the requested weekend and for the next three months. For instance, the language processing sub-system 812, through the natural language processing analysis, may detect the anchor terms and phrases "Hotel Vino," "closed," "next three months," and "renovations." The anchor phrase "Hotel Vino," as described above, may uniquely identify the proposal recommendation for which the original request from the representative 802 was submitted and for which the assistant representative 804 is providing a response to. The anchor term "closed" may denote a state of the "Hotel Vino" and can correspond to an unavailability of the "Hotel Vino." The anchor phrase "next three months" may provide a temporal definition for the previously identified unavailability of the "Hotel Vino," in this case the next three months. Further, the anchor term "renovations" may denote a cause for the unavailability of the "Hotel Vino," which can be used to provide a rationale for why the proposal recommendation is no longer available. Thus, through the identified anchor terms and phrases, the language processing sub-system 812 may generate an output that is indicative of the unavailability of the Hotel Vino for the next three months due to renovations and, as a result, the associated proposal recommendation cannot be fulfilled within the indicated time period (e.g., the particular weekend indicated by the representative 802).

The machine learning sub-system 814, in response to this output, may automatically update the resource library to indicate that the Hotel Vino is closed for the next three months due to renovations. This update to the resource library may prevent the generation of proposal recommendations corresponding to the Hotel Vino and corresponding to the time period during which the Hotel Vino is closed for renovations. Additionally, based on the obtained output, the machine learning sub-system 814 (through a proposal recommendation algorithm and/or other algorithms described herein) may automatically, and in real-time, generate a new proposal recommendation 830 that may be suggested to the representative 802 and the assistant representative 804 as a possible alternative to the proposal recommendation corresponding to the Hotel Vino that can no longer be fulfilled. For example, as illustrated in FIG. 8B, the machine learning sub-system 814 has generated an alternative proposal recommendation 830 that includes a two-night stay at "Hotel Rioja" for the specified weekend as opposed to the previously recommended, and no longer available, "Hotel Vino." To generate this alternative proposal recommendation 830, the machine learning sub-system 814 may automatically query the resource library to identify other possible venues for the two-night stay according to the parameters associated with the task or project (e.g., availability during the indicated weekend, within a particular distance from other venues associated with the task or project, complimentary to other venues associated with the task or project, etc.) and that may satisfy the member's requirements (as indicated in the member profile or through previous member communications). For example, the machine learning sub-system 814 may automatically query the resource library to identify a hotel that is available during the indicated weekend and that comports with the parameters associated with the task or project. Based on the query results, the machine learning sub-system 814 may automatically generate one or more alternative proposal recommendations 830 that may be presented to the representative 802 and the assistant representative 804 for their review. For example, as illustrated in FIG. 8B, the machine learning sub-system 814 may automatically update the communications session 820 to provide the alternative proposal recommendation 830 corresponding to the Hotel Rioja.

Similar to the process described above in connection with FIG. 6B, when the machine learning sub-system 814 generates one or more alternative proposal recommendations to replace the now unavailable proposal recommendation, the machine learning sub-system 814, through a proposal ranking algorithm, may re-rank the set of proposals now including the alternative proposal recommendations 830 to generate a new ranking of the set of proposals. The new ranking may be provided to the representative 802 and the assistant representative 804, which may review the new ranking of the set of proposals and determine which revised proposals to present to the member for the particular project or task. Alternatively, the machine learning sub-system 814 may utilize a proposal selection algorithm, as described herein, to automatically select which revised proposals (if any) may be presented to the member as a result of the unavailability of the previously presented proposal recommendation.

As illustrated in FIG. 8B, in response to the alternative proposal recommendation 830 presented through the communications session 820, the representative 802 may transmit a new communication 822 to the assistant representative 804 to determine the availability of the Hotel Rioja during the same weekend. The communication sub-system 810 may provide this new communication 822 in real-time to the language processing sub-system 812, which may perform a new natural language processing analysis of this communication 822 to generate an output that is indicative of the representative's new request. Through this new natural language processing analysis, the language processing sub-system 812 may identify the anchor phrases "Hotel Rioja," "check their availability," and "same weekend." The anchor phrase "Hotel Rioja" may uniquely identify the proposal recommendation for which the new request has been submitted by the representative 802. The anchor phrase "check their availability" may represent a request to conduct research or otherwise make a determination with regard to the proposal recommendation, specifically a determination as to the availability of the Hotel Rioja. Finally, the anchor phrase "same weekend" may denote a temporal qualification to the request, in this case defining the time and the amount of time for the reservation at Hotel Rioja. The output of the language processing sub-system 812, based on these anchor phrases, may denote the representative's new request to the assistant representative 804 and that further provides a set of parameters for the new request that may be used to supplement this new request for delivery to the assistant representative 804.

The machine learning sub-system 814, in response to receiving the output from the language processing sub-system 812, may automatically, and in real-time, perform one or more operations to assist the assistant representative 804 with regard to the new request submitted by the representative 802 through the communications session 820. These one or more operations may include any of the operations described above in connection with the original request communicated by the representative 802 through the communications session 820. For instance, the machine learning sub-system 814 may automatically present, to the assistant representative 804, the particular proposal recommendation referred to by the representative 802. Additionally, or alternatively, the machine learning sub-system 814 may automatically query the resource library to obtain any information that may assist the assistant representative 804 in addressing the new request submitted by the representative 802 (e.g., availability information for the Hotel Rioja, costs or rates for the indicated weekend, etc.). The machine learning sub-system 814 may further use the aforementioned automated assistance algorithm to automatically query the resource library to obtain information corresponding to the Hotel Rioja and to provide this information to the assistant representative 804 along with the proposal recommendation 830 indicated by the representative 802.

Thus, as communications (such as the representative communications 822 and the assistant representative communications 824) are exchanged over a task- or project-specific communications session 820, the communication sub-system 810, the language processing sub-system 812, and the machine learning sub-system 814 may, in real-time and as these communications are exchanged, obtain feedback related to any actions automatically performed in response to representative requests and/or in response to events that impact previously provided proposals and proposal recommendations. Further, the communication sub-system 810, the language processing sub-system 812, and the machine learning sub-system 814 may, in real-time and as these communications are exchanged, detect representative and/or member approval of any performed actions (e.g., generation and presentation of alternative proposal recommendations, automatic performance of operations to assist the representative 802 and the assistant representative 804, etc.) such that, in response to this approval, the machine learning sub-system 814 may automatically perform, in real-time, supplemental actions to assist the representative 802 and the assistant representative 804 in completing the project or task (e.g., generating proposal tasks that may be performed to complete a project or task according to any approved proposal recommendations, updating the resource library to reflect newly obtained information, etc.).

Although not illustrated in FIGS. 8A-8B, a member also communicates and/or interacts with the task facilitation service 808 via the communication sub-system 810, which uses the language processing sub-system 812 and the machine learning sub-system 814 to analyze communications and/or interactions between the member and the various systems, sub-systems, and services of the task facilitation service 808 in real-time as these communications and/or interactions occur. Additionally, the member can communicate and/or interact with the representative 802, the assistant representative 804, and/or one or more other representatives 806 via the communication sub-system 810. In an embodiment, the communications and/or interactions between the member and the representative 802, the assistant representative 804, and/or the one or more other representatives 806 are analyzed, in real-time and as these communications and/or interactions occur, by the language processing sub-system 812 and the machine learning sub-system 814.

Figure 9:
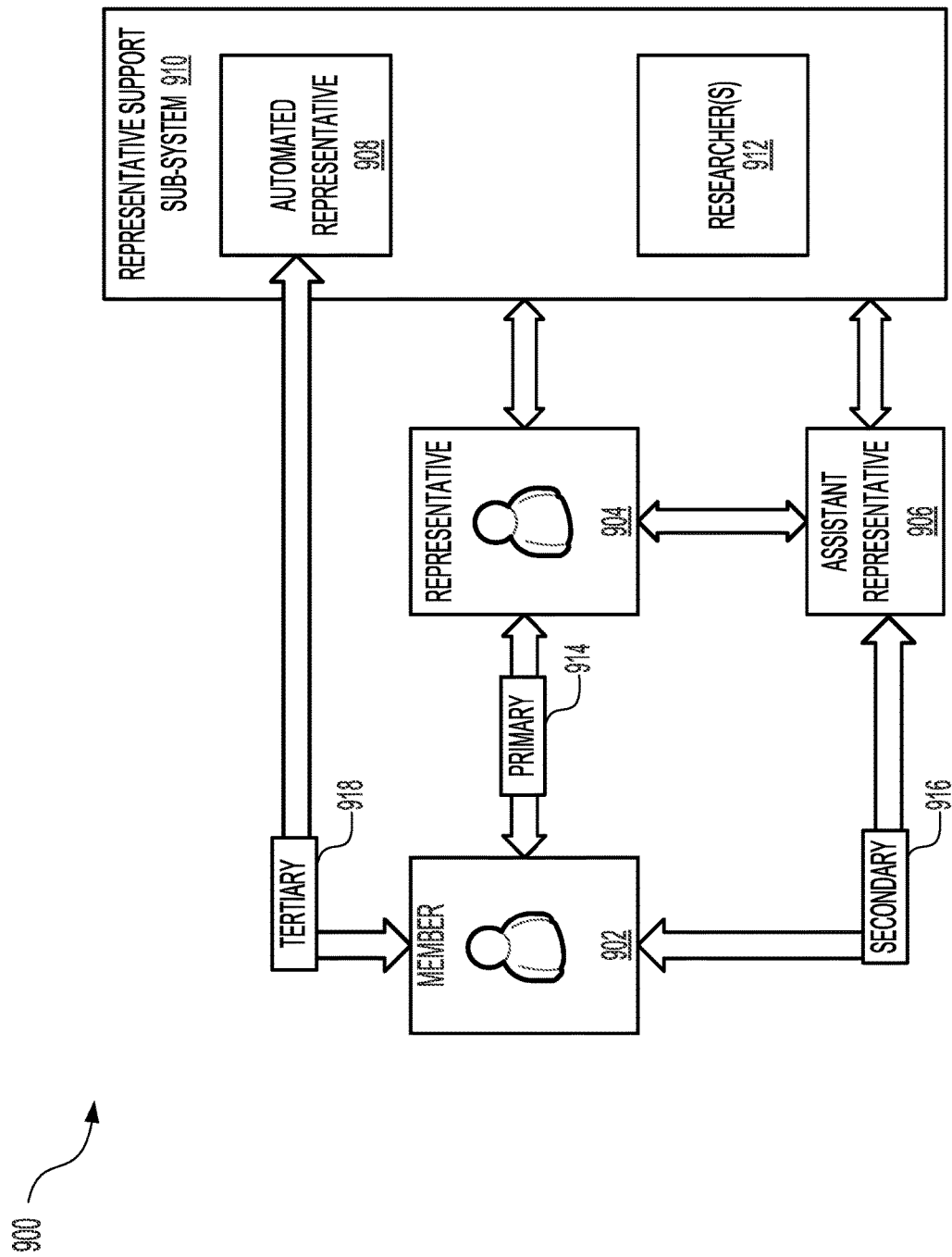
FIG. 9 shows an illustrative example of an environment in which primary and secondary interaction paths between a member and a task facilitation service are shown in accordance with at least one embodiment.

FIG. 9 shows an illustrative example of an environment 900 in which primary and secondary interaction paths between a member 902 and a task facilitation service are shown in accordance with at least one embodiment. In the example illustrated in FIG. 9, a member 902 communicates with the representative 904. In the example illustrated in FIG. 9, the member 902 communicates and/or interacts with the representative 904 via a primary connection 914, using systems and methods such as those described herein. In an embodiment, the member 902 communicates and/or interacts with an assistant representative 906 via a secondary connection 916, using systems and methods such as those described herein. In an embodiment, the member 902 communicates and/or interacts with an automated representative 908 via a tertiary connection 918, using systems and methods such as those described herein. The communications exchanged over the primary connection 914, the secondary connection 916, and the tertiary connection 918 may be performed concurrently and in real-time. In some instances, the primary connection 914, the secondary connection 916, and the tertiary connection 918 may be facilitated through a single communications session such that the member 902 may concurrently communicate with the representative 904, the assistant representative 906, and/or the automated representative 908 through the communications session.

It should be noted that the terms "primary," "secondary," and "tertiary" used herein with respect to the primary connection 914, the secondary connection 916, and the tertiary connection 918 are not intended to imply ranking, ordering, or preference but are merely designations. For example, in some instances, the member 902 may only communicate and/or interact with the representative 904 via the primary connection 914, or may primarily communicate and/or interact with the assistant representative 906 via the secondary connection 916 and occasionally communicate and/or interact with the representative 904 via the primary connection 914, or may primarily communicate and/or interact with the automated representative 908 via the tertiary connection 918 and occasionally communicate and/or interact with the assistant representative 906 via the secondary connection 916, etc.

In the example illustrated in FIG. 9, the representative 904 and the assistant representative 906 communicate and/or interact with a representative support sub-system 910 to perform tasks on behalf of the member 902. In the example illustrated in FIG. 9, the automated representative 908 is associated with the representative support sub-system 910 as described herein. In an embodiment, one or more researchers 912 may also be associated with the representative support sub-system 910. As used herein, the researchers 912 may obtain information such as addresses, social media ratings, operating hours, phone numbers, web addresses, menus, prices, and so on, for a representative 904, for an assistant representative 906, and/or for an automated representative 908. As used herein, researchers 912 do not interact with the member 902 but instead interact with entities that interact with the member 902. Although not illustrated in FIG. 9, researchers may interact with third-party services and/or other services/entities affiliated with the task facilitation service such as those described herein. Although not illustrated in FIG. 9, communications and/or interactions between a representative 904 and the researchers 912 may be received by a communication sub-system, processed by a language processing sub-system, and/or analyzed by a machine learning sub-system using systems and methods such as those described herein. Similarly, communications and/or interactions between an assistant representative 906 and the researchers 912 and/or communications and/or interactions between an automated representative 908 and the researchers 912 may also be received by a communication sub-system, processed by a language processing sub-system, and/or analyzed by a machine learning sub-system using systems and methods such as those described herein.

Figure 10:
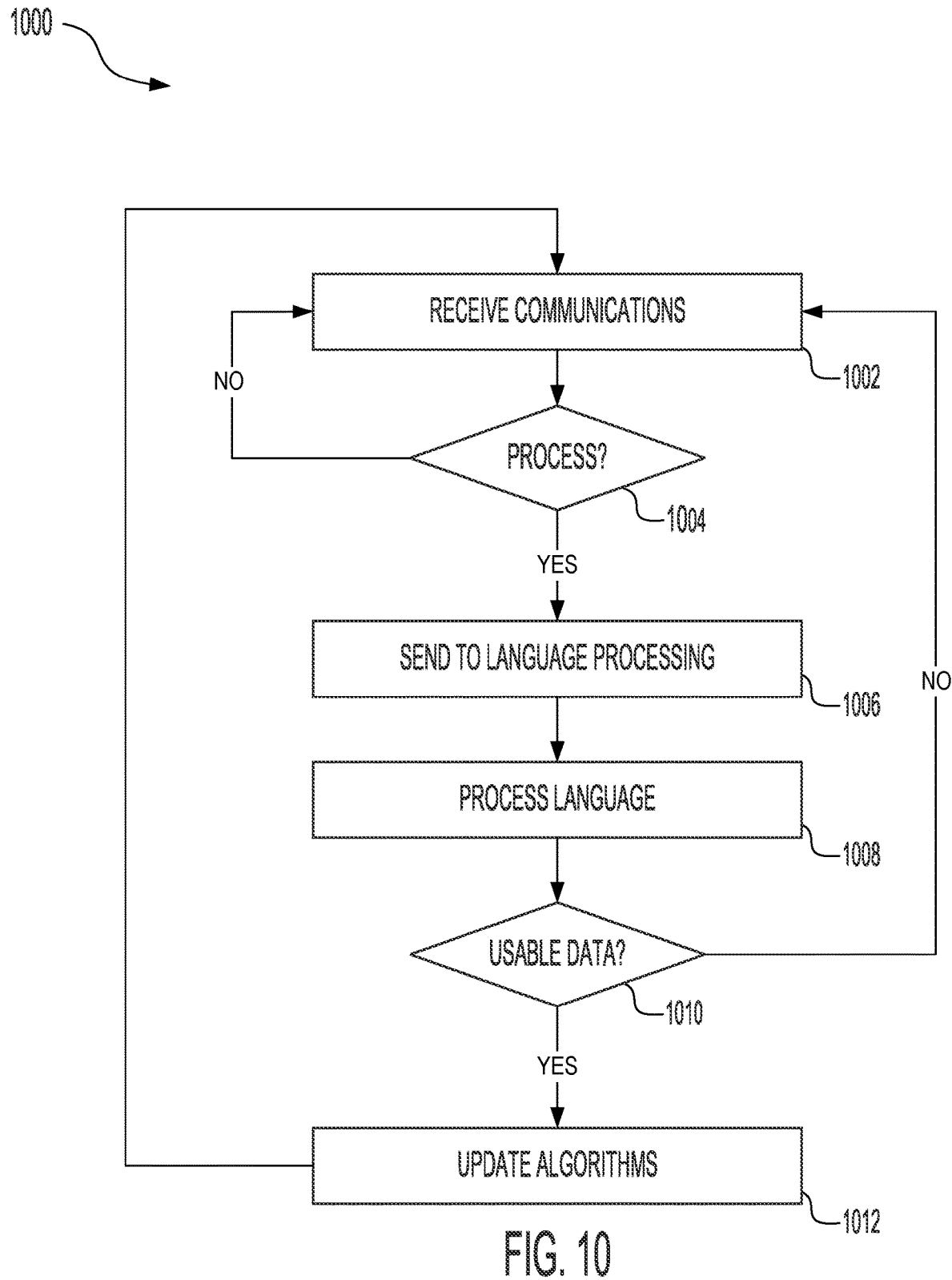
FIG. 10 shows an illustrative example of a process for processing communications received at a task facilitation service in accordance with at least one embodiment.

FIG. 10 shows an illustrative example of a process 1000 for processing, in real-time, communications received at a task facilitation service in accordance with at least one embodiment. Systems and/or sub-systems of the task facilitation service such as the task facilitation service 102 described herein at least in connection with FIG. 1 may perform the example process 1000 illustrated in FIG. 10.

At step 1002 of the example process 1000, systems and/or sub-systems of the task facilitation service receive communications such as those described herein. For example, at step 1002 of the example process 1000, systems and/or sub-systems of the task facilitation service may receive communications from the member to the representative regarding tasks associated with a landscaping project. In an embodiment, the communications between the member and the representative may be received in real-time as these communications are exchanged. For instance, the systems and/or sub-systems of the task facilitation service may continuously monitor, in real-time, any communications sessions between the member and the representative in order to detect any messages exchanged between the member and the representative. Through this continuous and real-time monitoring of these communications sessions, the systems and/or sub-systems of the task facilitation service may receive the communications between the member and the representative as these communications are exchanged.

At step 1004 of the example process 1000, systems and/or sub-systems of the task facilitation service determine whether to process the received communications. For example, the communications from the member to the representative may include feedback from the member about the landscaping company. Such communications are likely to improve the proposal recommendation process and, as such, may be analyzed. Conversely, the communications from the member to the representative may include an innocuous comment about the weather while the landscaping was being performed. Such communications are not likely to improve the recommendation process and, as such, may not be analyzed. As may be contemplated, in an embodiment, all communications may be processed by a language processing system as described herein and the language processing system may determine whether the communications should be processed.

In some instances, the communications may be automatically processed using one or more classical algorithms or processes in real-time to identify a set of anchor words or phrases corresponding to feedback or other information that may be used to improve the proposal recommendation process. For example, the one or more classical algorithms or processes may automatically evaluate a received communication to determine whether the received communication includes one or more anchor terms or phrases corresponding to feedback or other information that may be used to improve the recommendation process. As an illustrative example, if the member has transmitted a message to the representative indicating that "I did not like that landscaping company," the one or more classical algorithms or processes may detect the anchor phrases "I did not like" and "landscaping company." The combination of these anchor phrases may denote a level of dissatisfaction with the landscaping company and thus may be categorized as being negative feedback with regard to a proposal recommendation. If at step 1004 of the example process 1000, systems and/or sub-systems of the task facilitation service determine not to process the communications, the example process 1000 restarts at step 1002 to receive further communications.

If at step 1004 of the example process 1000, systems and/or sub-systems of the task facilitation service determine to process the communications, the example process 1000 continues at step 1006. At step 1006 of the example process 1000, systems and/or sub-systems of the task facilitation service send the communications to a language processing service using systems and methods such as those described herein. For example, the communications from the member to the representative that include feedback from the member about the landscaping company may, at step 1006, may be sent to the language processing service. At step 1008 of the example process 1000, systems and/or sub-systems of the task facilitation service automatically process the communications (e.g., the feedback from the member about the landscaping company) using systems and methods such as those described herein.

At step 1010 of the example process 1000, systems and/or sub-systems of the task facilitation service determine whether there is any usable data in the communications. If at step 1010 of the example process 1000, systems and/or sub-systems of the task facilitation service determine that there is not usable data in the communications, the example process 1000 restarts at step 1002 and to receive further communications.

If at step 1010 of the example process 1000, systems and/or sub-systems of the task facilitation service determine that there is usable data in the communications, the example process 1000 continues at step 1012. At step 1012 of the example process 1000, systems and/or sub-systems of the task facilitation service update the algorithms (e.g., the recommendation algorithm and/or the proposal task generation algorithm) using systems and methods such as those described herein.

As illustrated in FIG. 10, after step 1012 of the example process 1000, the example process 1000 restarts at step 1002 and receives further communications. In an embodiment, the example process 1000 can terminate after step 1012 and not restart at step 1002 after completing step 1012. As may be contemplated, the steps 1002-1012 of the example process 1000 may be performed in a different order than that described, may be performed in parallel, and/or may be re-entrant in that one or more of the steps 1002-1012 of the example process 1000 may be performed first and then followed by one or more of the other steps 1002-1012 of the example process 1000.

Figure 11:
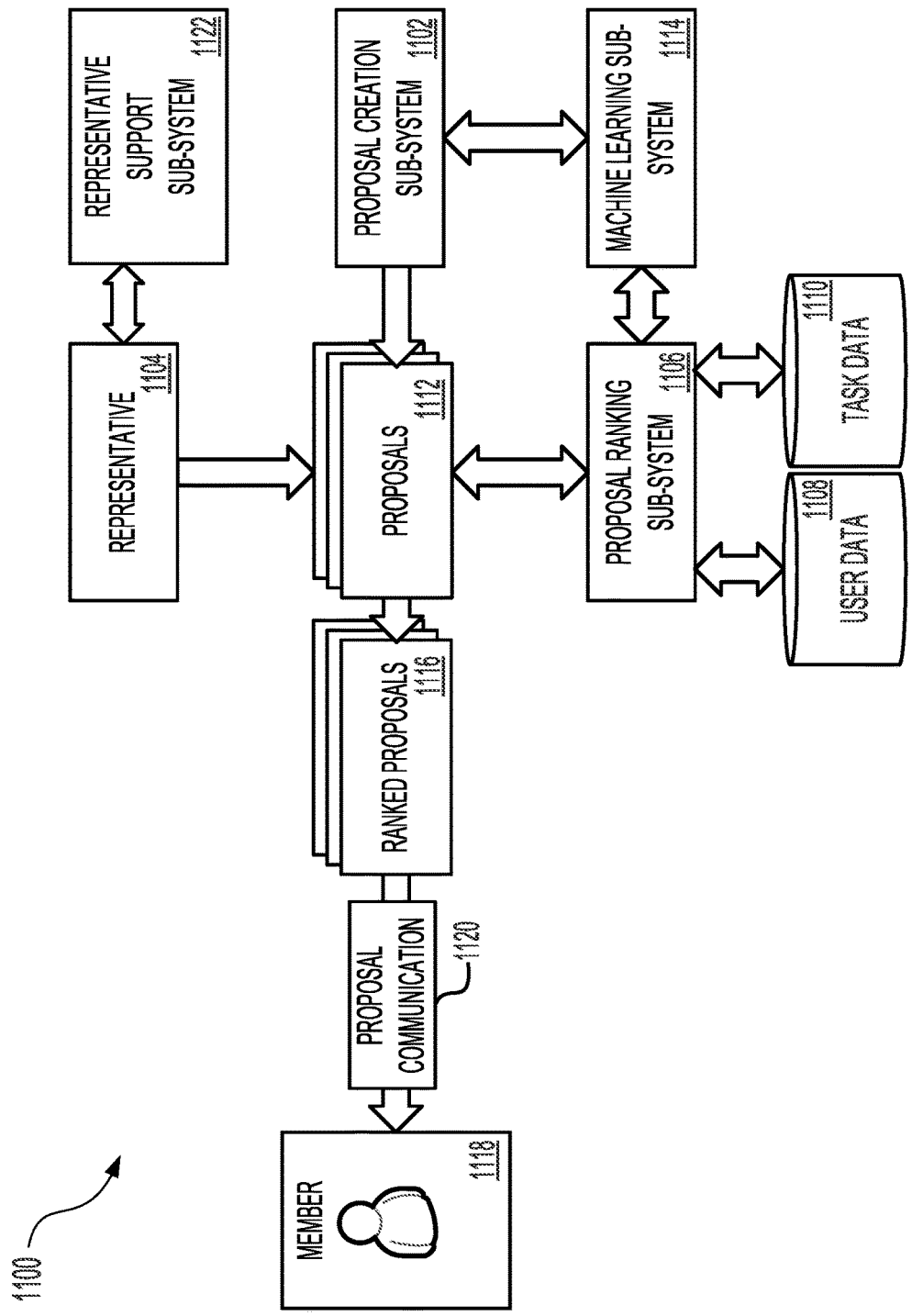
FIG. 11 shows an illustrative example of an environment in which ranked proposals are communicated to a member in accordance with at least one embodiment.

FIG. 11 shows an illustrative example of an environment 1100 in which ranked proposals are communicated to a member in accordance with at least one embodiment. In an embodiment, a proposal creation sub-system 1102 generates proposals 1112 using systems and methods such as those described herein. In an embodiment, the proposal creation sub-system 1102 is a component of the task coordination system 114 described herein at least in connection with FIG. 1. In an embodiment, the proposal creation sub-system 1102 is implemented as a component of the task recommendation system 112 described herein at least in connection with FIG. 1.

As described herein, the proposal creation sub-system 1102 utilizes machine learning algorithms, artificial intelligence systems, and/or computational models to generate proposals 1112 (illustrated in FIG. 11 as the machine-learning sub-system 1114). The proposal creation sub-system 1102 may use, as input to the machine learning algorithm, artificial intelligence system, and/or computational model, a member profile or a model associated with the member and/or the member profile, historical task data for the member, and information corresponding to the task for which a proposal is being generated (i.e., the task parameters). In an embodiment, when a proposal is generated, the proposal creation sub-system 1102 monitors, in real-time, interaction with the task facilitation service to obtain data that can be used to further train the machine learning algorithm, artificial intelligence system, and/or computational model. For example, if a proposal is generated by the proposal creation sub-system 1102 and the representative 1104 recommends some elements of the proposal over other elements, the proposal creation sub-system 1102 may utilize this feedback to further train the machine learning algorithm, artificial intelligence system, and/or computational model to increase the likelihood of recommending preferred proposal elements.

As described above, when the proposal creation sub-system 1102 generates the proposals 1112, some or all of the proposal recommendations of the proposals 1112 may be generated using a machine learning algorithm, an artificial intelligence system, and/or a computational model using a proposal recommendation algorithm. In an embodiment, the proposal recommendations include one or more indications of the suitability of the proposal recommendations. Such indications of the suitability of the proposal recommendation (also referred to herein as a "suitability metric" for the proposal recommendation) may be automatically generated by the proposal creation sub-system 1102 using a machine learning algorithm, an artificial intelligence system, and/or a computational model such as those described herein.

In an embodiment, the representative 1104 receives the proposals 1112 and coordinates the ranking of the proposals so that the ranked proposals 1116 can be communicated 1120 to the member 1118. In an embodiment, the representative 1104 ranks the proposals 1112 to produce the ranked proposals 1116. In an embodiment, the representative 1104 ranks the proposals 1112 to produce the ranked proposals 1116 using the suitability metrics so that, for example, a proposal with a high suitability metric may be ranked higher than a proposal with a lower suitability metric. In an embodiment, the representative selects proposal recommendations from a proposal (e.g., one of the proposals 1112) and/or select proposal recommendations from one or more alternate proposals of the proposals 1112 to produce the ranked proposals 1116 using the suitability metrics.

In an embodiment, a proposal ranking algorithm of the proposal ranking sub-system 1106 is used to automatically rank the proposals so that the ranked proposals 1116 can be communicated 1120 to the member 1118. In an embodiment, the ranking algorithm ranks the proposals 1112 to produce the ranked proposals 1116 using the suitability metrics so that, for example, a proposal with a high suitability metric may be ranked higher than a proposal with a lower suitability metric. In an embodiment, the proposal ranking sub-system 1106 is implemented using a computer system such as the computing device 1902 described herein at least in connection with FIG. 19. In an embodiment, the proposal ranking sub-system 1106 is implemented as an application or as other executable code implemented on a computer system of the task facilitation service.

In an embodiment, the proposal ranking sub-system 1106 implements the proposal ranking algorithm, which may be a machine learning algorithm, an artificial intelligence system, and/or a computational model, to automatically rank the proposals so that the ranked proposals 1116 can be communicated 1120 to the member 1118. In an embodiment, the proposal ranking sub-system 1106 uses member profiles or models of member profiles as input to the machine learning algorithm, artificial intelligence system, and/or computational model to rank the proposals. In an embodiment, the proposal ranking sub-system 1106 uses project and/or task data as input to the machine learning algorithm, artificial intelligence system, and/or computational model to rank the proposals. In an embodiment, the proposal ranking sub-system 1106 uses data from previously generated proposals for the member 1118 and/or for other members as input to the machine learning algorithm, artificial intelligence system, and/or computational model to rank the proposals. In an embodiment, the proposal ranking sub-system 1106 uses data obtained from third-party services such as the third-party services 116 described herein at least in connection with FIG. 1 and/or other services/entities affiliated with the task facilitation service as input to the machine learning algorithm, artificial intelligence system, and/or computational model to rank the proposals. The proposal ranking sub-system 1106 may obtain member profiles, project and/or task data, data from previously generated proposals, third-party service data, and/or other such data from data stores such as the user data 1108 and the task data 1110.

As illustrated in FIG. 11, the proposal ranking sub-system 1106 may use a machine learning sub-system 1114 to rank the proposals so that the ranked proposals 1116 can be communicated 1120 to the member 1118. In an embodiment, the machine learning sub-system 1114 is a component of the proposal ranking sub-system 1106. In an embodiment, the machine learning sub-system 1114 is a component of the task facilitation service 102 described herein at least in connection with FIG. 1. In an embodiment, the machine learning sub-system 1114 is a third-party service running, for example, as a service such as the service 1626 and operating on a computing device such as the computing device 1924, both of which are described herein at least in connection with FIG. 19. In an embodiment, the machine learning sub-system 1114 is a service provided by a computing resources provider such as the computing resources provider 1928 described herein at least in connection with FIG. 19. In such an embodiment, the machine learning sub-system 1114 may be running on a system such as the system 1930 and/or the system 1932, both of which are described herein at least in connection with FIG. 19.

In an illustrative example of how the proposal ranking sub-system 1106 may use a machine learning sub-system 1114 to implement a proposal ranking algorithm to rank the proposals so that the ranked proposals 1116 can be communicated 1120 to the member 1118, a project for a Parents' Anniversary Weekend (described herein below) may include a first proposal for a Wine Tasting Weekend, a second proposal for a different Wine Tasting Weekend, and a third proposal for a Ski Weekend. The first proposal may include preferred proposal recommendations for a 2-night stay, a Wine Tasting, and a Dinner and may include a recommendation for a Surprise Activity that is not preferred. The second proposal may include preferred proposal recommendations for the Wine Tasting and the Surprise Activity and may include recommendations for the Dinner and the Surprise Activity that are not recommended. The third proposal (for the Ski Weekend) may include preferred recommendations for the 2-night stay, a Ski Area, a Dinner, and a Surprise Activity but a Ski Weekend itself may not be preferred by the member and/or the member's parents. In this example, the proposal ranking algorithm may rank the Wine Tasting Weekend proposals higher than the Ski Weekend and the first proposal for a Wine Tasting Weekend (with three preferred proposal recommendations) as higher than the second proposal for a Wine Tasting Weekend (with two preferred proposal recommendations) as lower than the first proposal, but higher than the third proposal (for the Ski Weekend).

In an embodiment, the representative 1104 receives the output of the proposal ranking sub-system 1106 and selects the proposals (i.e., the ranked proposals 1116) to communicate to the member 1118. For example, the representative 1104 may examine each of the proposals and/or the proposal recommendations and based on one or more suitability metrics, either select or deselect the one or more proposals using systems and methods such as those described herein. In some instances, the representative 1104 may either select or deselect the associated proposal based on their own personal knowledge of the member 1118 (e.g., prior knowledge of the member's preferences, prior communications exchanged between the representative 1104 and the member 1118, examination of the member profile associated with the member 1118, etc.). In an embodiment, the representative's selection or deselection of the associated proposal may be used to dynamically update the proposal ranking algorithm described above. For example, if the representative 1104 selects a particular proposal that does not have a high suitability metric and/or was not ranked highly by the proposal ranking algorithm, the proposal ranking sub-system 1106 may use this feedback as an indication that the proposal ranking algorithm may not have accurate ranked the proposals presented to the representative 1104. Accordingly, the proposal ranking sub-system 1106 may update the proposal ranking algorithm such that, for similar projects and/or tasks, similar proposals are ranked more highly. As another illustrative example, if the representative 1104 selects a particular proposal that has a high suitability metric and/or has been ranked highly by the proposal ranking algorithm, the proposal ranking sub-system 1106 may use this feedback to reinforce the proposal ranking algorithm.

In an embodiment, the representative's selection or deselection of an associated proposal may be used to dynamically update, in real-time, the ranking of the set of proposals that may be communicated to the member 1118 for a particular project or task. As noted above, if the representative 1104 selects a particular proposal that does not have a high suitability metric and/or was not ranked highly by the proposal ranking algorithm, the proposal ranking sub-system 1106 may use this feedback to update the proposal ranking algorithm such that, for similar projects and/or tasks, similar proposals are ranked more highly. The newly updated proposal ranking algorithm may again process the set of proposals for the particular project or task to dynamically, and in real-time, provide a new ranking of the set of proposals.

In some instances, if the representative modifies one or more proposals (including any corresponding proposal recommendations) for a particular project or task, the proposal ranking algorithm may dynamically, and in real-time, process the set of proposals for the particular project or task (including the modified one or more proposals) to provide a new ranking for the set of proposals. For example, if the representative modifies a proposal to include an additional preferred proposal recommendation, the proposal ranking algorithm may dynamically, and in real-time, update the ranking for the set of proposals such that the modified proposal may have a higher ranking as a result of the modified proposal including an additional preferred proposal recommendation. As another illustrative example, if the representative designates a particular proposal recommendation as no longer being preferred, the proposal ranking algorithm may dynamically, and in real-time, update the ranking for the set of proposals such that proposals including the no longer preferred proposal recommendation may be ranked lower compared to other proposals that still include other preferred proposal recommendations. Thus, as changes are made to the proposals by the representative or by the systems described herein for different tasks and projects, the proposal ranking algorithm may dynamically, and in real-time, update corresponding proposal rankings for proposals associated with these different tasks and projects.

In an embodiment, the proposal ranking sub-system 1106 implements a proposal selection algorithm to select the proposals (i.e., the ranked proposals 1116) to automatically communicate to the member 1118 on behalf of the representative 1104. In an embodiment, the proposal selection algorithm is implemented as a machine learning algorithm, artificial intelligence system, and/or computational model such as those described herein. In an embodiment, the proposal ranking sub-system 1106 uses data such as member profiles, project or task data, data from previously generated proposals, and/or data obtained from third-party services and/or other services/entities associated with the task facilitation service as input to the proposal selection algorithm to automatically select the proposals (i.e., the ranked proposals 1116) to communicate to the member 1118. As may be contemplated, the proposal ranking sub-system 1106 may obtain the data from the user datastore 1108 and the task datastore 1110. In an embodiment, the proposal selection algorithm is implemented by the machine learning sub-system 1114. In an embodiment, the proposal selection algorithm is implemented by another component of the task facilitation service.

In some instances, the proposal selection algorithm may be implemented using classical algorithms that may be configured to automatically process the suitability metrics associated with the proposals and/or the proposal recommendations and the corresponding ranks provided by the proposal ranking sub-system 1106 to identify which of these proposals and/or proposal recommendations are to be communicated to the member 1118. For example, the proposal selection algorithm may automatically select a set number of proposals having the highest rankings, where the set number may be determined based on the member's preferences (as defined in the member profile associated with the member 1118, indicated by the representative 1104, and the like). In some instances, the proposal selection algorithm may apply a weight to each of the individual rankings and individual suitability metrics associated with the proposals in order to calculate an aggregate score for each proposal. The aggregated scores for the set of proposals may be used to select which proposals are to be selected for presentation to the member 1118.

In an embodiment, when the ranked proposals 1116 are communicated 1120 to the member 1118, the ranked proposals 1116 are reformatted from a format provided to the representative 1104 to a format suitable to communicate the proposals to the member 1118. In an embodiment, information provided with the proposals 1112 to enable the representative 1104 and/or the proposal ranking sub-system 1106 to produce the ranked proposals 1116 is removed from the ranked proposals 1116 before the ranked proposals 1116 are communicated 1120 to the member 1118. For example, the proposal creation sub-system 1102 may include information such as internal rankings of various service providers, contact information for professionals associated with the various proposals, or other such information. In such an example, that information may be removed from the ranked proposals 1116 when the ranked proposals 1116 are reformatted from a format provided to the representative 1104 to a format suitable to communicate 1120 the proposals to the member 1118. In an embodiment, the ranked proposals 1116 are reformatted by the representative 1104. In an embodiment, the ranked proposals 1116 are automatically reformatted by a system (or sub-system) of the task recommendation system.

In an embodiment, one or more algorithms associated with the proposal communication process are updated when the proposals have been ranked and/or selected. For example, as described herein, the proposal recommendation algorithm of the proposal creation sub-system 1102 may be updated based on the proposal ranking and/or proposal selection. As may be contemplated, if a proposal is generated by the proposal recommendation algorithm and that proposal is not ranked highly and/or not selected as a ranked proposal to communicate to the member 1118, the machine learning algorithm, artificial intelligence system, and/or computational model of the proposal recommendation algorithm may be updated to reflect that that proposal was not a good recommendation. Similarly, if a proposal is generated by the proposal recommendation algorithm and that proposal is ranked highly and/or selected as a ranked proposal to communicate to the member 1118, the machine learning algorithm, artificial intelligence system, and/or computational model of the proposal recommendation algorithm may be updated to reflect that that proposal was a good recommendation.

Similarly, the proposal ranking algorithm may be updated so that when a proposal is not selected as a ranked proposal to communicate to the member 1118, the machine learning algorithm, artificial intelligence system, and/or computational model of the proposal ranking algorithm may be updated to reflect that the proposal was not a good recommendation and when a proposal is selected as a ranked proposal to communicate to the member 1118, the machine learning algorithm, artificial intelligence system, and/or computational model of the proposal recommendation algorithm may be updated to reflect that the proposal was a good recommendation. In an embodiment, the representative 1104 provides a final verification of the ranked proposals before they are communicated to the member 1118. In such an embodiment, the proposal recommendation algorithm, the proposal ranking algorithm, and/or the proposal selection algorithm may be updated based on this final verification by the representative 1104.

In an embodiment, the proposal ranking algorithm is updated dynamically, continuously, and in real-time so that, for example, when the proposals 1112 are received from the proposal creation sub-system 1102, the proposal ranking algorithm may be updated in real-time. Similarly, when the proposals 1112 are ranked by the proposal ranking sub-system 1106, the proposal ranking algorithm may be updated in real-time. As may be contemplated, when the proposals 1112 and/or the ranked proposals 1116 are selected (e.g., using the proposal selection algorithm), when the representative 1104 provides a final verification of the ranked proposals 1116 before they are communicated 1120 to the member 1118, and/or when the ranked proposals are communicated 1120 to the member 1118, the proposal ranking algorithm may be updated in real-time. In an embodiment, the proposal ranking algorithm is continuously and/or dynamically updated so that the proposal ranking algorithm may be updated several times during the processes illustrated in FIG. 11 and described herein. In such an embodiment, the proposal ranking algorithm may be updated more than once during the steps of the processes illustrated in FIG. 11 and described herein. For example, when the proposals 1112 are ranked by the proposal ranking sub-system, a plurality of steps may be undertaken to rank the proposals. In such an example and in an embodiment where the proposal ranking algorithm is continuously and/or dynamically updated, the proposal ranking algorithm may be updated several times (i.e., during one or more of the plurality of steps undertaken to rank the proposals).

It should be noted that the proposal recommendation algorithm and the proposal ranking algorithm may be updated in real-time as different proposals are generated and ranked for communication to different members associated with the task facilitation service. For example, the proposal recommendation algorithm and the proposal ranking algorithm may continuously generate and rank different proposals for different tasks/projects associated with the member 1118 and other members simultaneously in real-time. Further, as proposals are communicated to different members, any feedback corresponding to the ranking and selection of these proposals may be used to dynamically update the proposal recommendation algorithm and the proposal ranking algorithm in real-time such that, for other tasks/projects being processed contemporaneously and in real-time, the proposal recommendation algorithm and the proposal ranking algorithm may provide accurate results (e.g., proposals, rankings, etc.).

In an embodiment, other algorithms described herein for the systems and methods used to communicate ranked proposals to a member are also updated dynamically, continuously, and in real-time. For example, when the proposal creation sub-system 1102 generates the proposals 1112 using a proposal recommendation algorithm (as described herein above), the proposal recommendation algorithm may be updated in real-time and at the time that the proposal recommendation algorithm is used by the proposal creation sub-system 1102 to generate the proposals 1112. Similarly, the proposal recommendation algorithm may be updated continuously and/or dynamically so that, for example, the proposal recommendation algorithm may be updated several times during the processes for proposal generation described herein. Accordingly, when the proposal creation sub-system 1102 generates the proposals 1112 using the proposal recommendation algorithm and a plurality of steps is undertaken to generate the proposals (as described herein), the proposal recommendation algorithm may be updated several times (i.e., dynamically, continuously, and in real-time) during the plurality of steps undertaken to generate the proposals.

In another example of other algorithms that may be updated dynamically, continuously, and in real-time, when proposal ranking sub-system 1106 implements a proposal selection algorithm to select the proposals (as described herein above), the proposal selection algorithm may also be updated in real-time and at the time that the proposal selection algorithm is used by the proposal ranking sub-system 1106 to select the proposals. Similarly, the proposal selection algorithm may also be updated continuously and/or dynamically so that the proposal selection algorithm may be updated several times during the processes for proposal selection (e.g., when the proposal ranking sub-system 1106 selects the proposals 1112, the proposal selection algorithm may be updated several times during the steps undertaken to select the proposals).

In an embodiment, the representative 1104 interacts with the proposals 1112 and/or the ranked proposals 1116 using an application associated with the task facilitation service such as those described herein. In an embodiment, the proposals 1112 and the ranked proposals 1116, are communicated to the representative 1104 via a network such as the network 1922 and displayed using an application running on a computing device such as the computing device 1902, both of which are described herein at least in connection with FIG. 19. The application used to display the proposals 1112 and/or the ranked proposals 1116 is described in more detail herein. Interactions between the proposal creation sub-system 1102, the machine learning sub-system 1114, the proposal ranking sub-system 1106, the user data 1108, the task data 1110, the representative 1104, and/or other systems of the task facilitation service may also be facilitated by applications running on various computing devices and communicated using various networks such as those described herein.

In an embodiment, the ranked proposals 1116 are communicated 1120 to the member 1118. As described herein, in an embodiment, the ranked proposals 1116 are communicated 1120 to the member 1118 via a network such as the network 1922 and displayed using an application running on a computing device such as the computing device 1902, both of which are described herein at least in connection with FIG. 19. The application used to display the ranked proposals 1116 is described in more detail herein.

In an embodiment, the proposals 1112 are sent directly to the member 1118 without ranking, selecting, or reformatting by the representative 1104 and without any ranking, selecting, or reformatting by systems or methods such as those described herein. In an embodiment, the ranked proposals 1116 are ranked by the proposal ranking sub-system 1106 and sent directly to the member 1118 without any selecting or reformatting by the representative 1104 and without any selecting or reformatting by systems or methods such as those described herein. In an embodiment, the ranked proposals are selected using the proposal selection algorithm and sent to the member 1118 without any reformatting by the representative 1104 and without any reformatting by systems or methods such as those described herein. In an embodiment, the proposal communication process from proposal generation (e.g., by the proposal creation sub-system 1102) to ranked proposal communication 1120 to the member 1118 is an automatic process, managed by systems and sub-systems of the task facilitation service such as those described herein.

As may be contemplated, the proposal communication process from proposal generation (e.g., by the proposal creation sub-system 1102) to ranked proposal communication 1120 to the member 1118 is an automatic process, managed by systems and sub-systems of the task facilitation service such as those described herein and, as such, various operations performed by the representative 1104 may be additionally, or alternatively, performed using one or more machine learning algorithms or artificial intelligence such as those described herein. For example, as proposals are generated, recommended, ranked, selected, and reformatted over time, systems of the task facilitation service may continuously and automatically update the member profile associated with the member 1118 according to feedback related to that generation of proposals, recommendation of proposals, ranking of proposals, selecting of proposals, and reformatting of proposals as well as the coordination of tasks and/or performance of tasks.

In an embodiment and after a member profile associated with the member 1118 has been updated over a period of time or over a set of proposals, proposal recommendations, elements of the proposal creation sub-system 1102 and/or the proposal ranking sub-system 1106 utilize machine learning algorithms, artificial intelligence systems, and/or computational models to automatically and dynamically generate new proposals, proposal rankings, proposal selections, and/or proposal formatting based on the various attributes of the member profile with or without the interaction of the representative 1104. In an embodiment, the proposal creation sub-system 1102 and/or the proposal ranking sub-system 1106 automatically communicate with the member 1118 to obtain information required for projects and can automatically generate, rank, select, and format proposals that may be presented to the member 1118 for performance of tasks associated with the proposals. The representative 1104 may also monitor communications between systems and sub-systems of the task facilitation service (e.g., the proposal creation sub-system 1102 and/or the proposal ranking sub-system 1106) and the member 1118 to ensure that the conversation maintains a positive polarity as described herein. This may allow the representative 1104 to address any member concerns and perform any tasks on behalf of the member 1118, restoring a positive polarity to the conversation.

As described herein, member preferences (including dynamically evolving member preferences) may be used by the proposal creation sub-system 1102, the proposal ranking sub-system 1106, and/or the machine learning sub-system to automatically and dynamically generate new proposals, proposal rankings, proposal selections, and/or proposal formatting and also to dynamically, continuously, and in real-time update various algorithms used to generate new proposals, rank proposals, select proposals, and/or format proposals. For example, to reduce the cognitive load on members and their families in performing various tasks, ranked proposals 1116 may be communicated 1120 to the member 1118 with only a minimal amount of information needed for the member to evaluate the proposal, thereby not overly burdening the member with extraneous information and, accordingly, reducing the cognitive load on members. In such an example, ranked proposals 1116 may be formatted so that they are communicated 1120 to the member broadly (e.g., "For your Parents' Anniversary Weekend, we propose A Wine Tasting Weekend") with details about the proposal recommendations, proposal ranking, alternate proposals and/or other such information communicated to the member if requested by the member 1118. In such an example, formatting the ranked proposals 1116 so that they are communicated 1120 broadly to the member 1118 may be as a result of standing member preferences, or may be as a result of the member specifying minimal involvement with the proposal generation when defining the parameters of the task, or may be a result of the representative 1104 knowing that the member 1118 is currently very busy, or may be as a result of other systems and/or sub-systems of the task facilitation service determining that the member would prefer minimal information for this project and/or proposal recommendation. As may be contemplated, member preferences may evolve dynamically and one aspect of reducing the cognitive load on a member is for systems and/or sub-systems of the task facilitation service to dynamically respond to and/or anticipate those evolving preferences.

Accordingly, unlike automated customer service systems and environments, wherein these systems may have little to no knowledge of the users interacting with agents or other automated systems, systems and/or sub-systems of the task facilitation service (e.g., the proposal creation sub-system 1102 and/or the proposal ranking sub-system 1106) can continuously update the member profile to provide up-to-date information about the member 1118. This up-to-date information may be based on the member's interaction with the systems and/or sub-systems of the task facilitation service and/or interaction with the representative 1104. This up-to-date information may also be based on the proposals generated, the proposals recommended, the proposals selected, and/or the tasks performed on behalf of the member 1118 over time. This information may be automatically and dynamically updated as the member 1118 interacts with systems and/or sub-systems of the task facilitation service and/or interacts with the representative 1104. This information may also be automatically and dynamically updated as proposals are generated, recommended, selected, formatted, and performed for the member 1118 over time and this historical information may be used by the systems and/or sub-systems of the task facilitation service (e.g., the proposal creation sub-system 1102 and/or the proposal ranking sub-system 1106) to anticipate, identify, and present appropriate or intelligent responses to member 1118 queries, needs, and/or goals.

In the example illustrated in FIG. 11, the representative 1104 communicates and/or interacts with a representative support sub-system 1122 using systems and methods such as those described herein. For example, the representative 1104 may interact with the representative support sub-system 1122 to obtain hotel information for the Parents' Anniversary Weekend proposal for "A Wine Tasting Weekend," or to obtain winery hours, or to obtain other such information.

Figure 12:
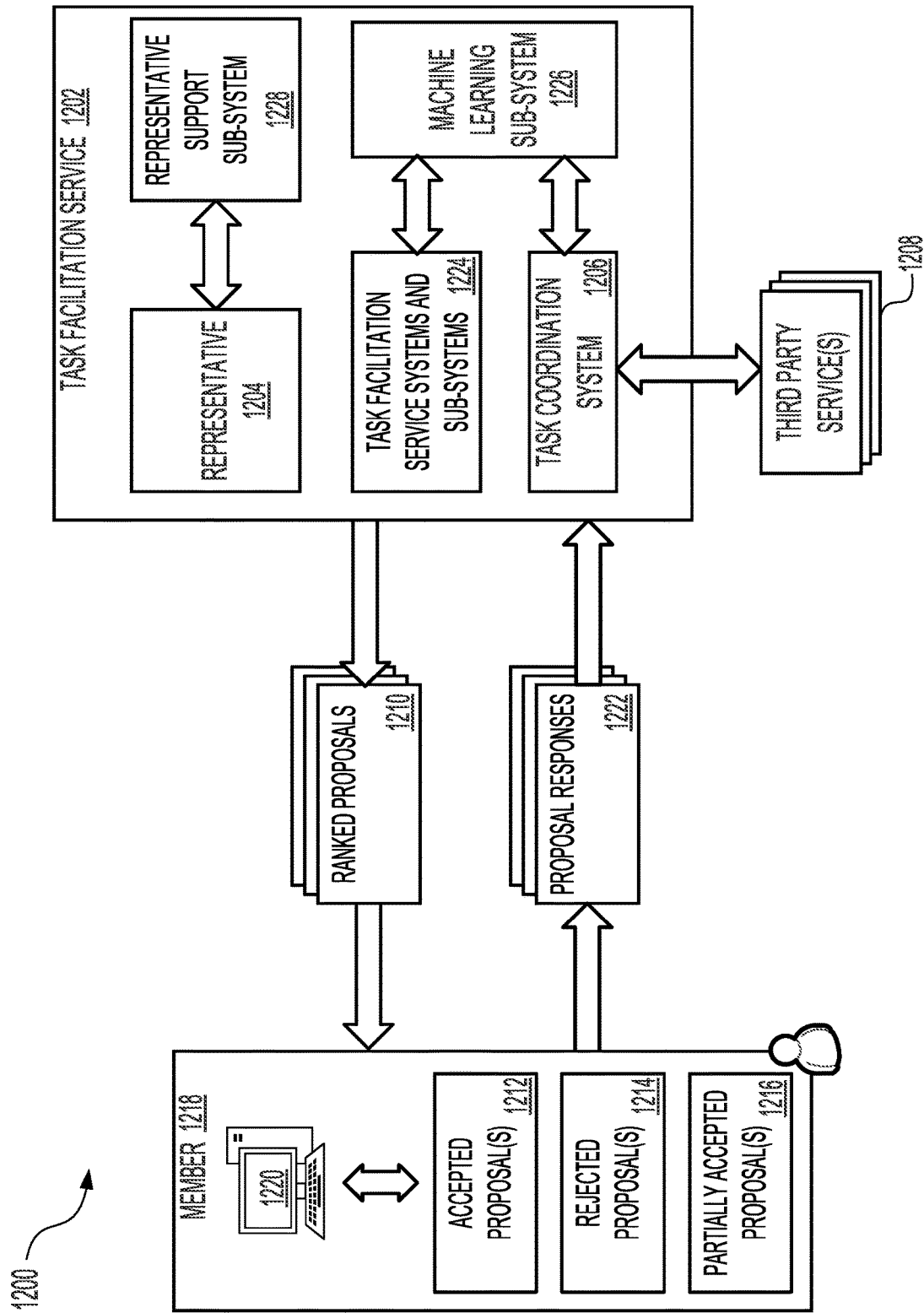
FIG. 12 shows an illustrative example of an environment in which proposal responses are accepted back from the member and processed in accordance with at least one embodiment.

FIG. 12 shows an illustrative example of an environment 1200 in which proposal responses are obtained from the member 1218 and processed in accordance with at least one embodiment. In an embodiment, systems of a task facilitation service 1202 generate a set of ranked proposals 1210 using systems and methods such as those described herein. In an embodiment, when a member 1218 receives the communicated ranked proposals 1210, the member 1218 performs one or more actions to accept, reject, and/or partially accept the communicated ranked proposals 1210, using systems and methods such as those described herein. In an embodiment, the member 1218 receives the ranked proposals 1210 using an application (not illustrated in FIG. 12) operating on a computing device 1220 or through a web portal accessible using a browser application implemented on the computing device 1220. In an embodiment, the ranked proposals 1210 are communicated to the member 1218 via a network such as the network 1922 and displayed using an application running on a computing device such as the computing device 1902, both of which are described herein at least in connection with FIG. 19. The application used to display the ranked proposals 1210 is described in more detail herein.

In an embodiment, the member 1218 uses the application or web portal to accept a set of proposals from the ranked proposals 1210 (e.g., the accepted proposals 1212). Using the example of the Parents' Anniversary Weekend, described above, the member 1218 may accept the recommended (or highest ranked) proposal for the Wine Tasting Weekend with three preferred recommendations as the accepted proposal. As may be contemplated, the member 1218 may also select one or more of the other ranked proposals 1210 as an accepted proposal. In an embodiment (described below) the member 1218 can select more than one of the ranked proposals 1210 as accepted proposals. In such an embodiment, the member may indicate that two (or more) of the proposals are acceptable proposals 1212. In such an embodiment, systems and/or sub-systems 1224 of the task facilitation service 1202 may use techniques such as those described herein to analyze the accepted proposals in the set of accepted proposals 1212 to determine which of the proposals may be selected and the tasks performed on behalf of the member using the task coordination system 1206 and/or the third party service(s) 1208 or other services/entities affiliated with the task facilitation service 1202.

The systems and/or sub-systems 1224 of the task facilitation service 1202 include, but are not limited to, a task recommendation system, a task coordination system, a proposal creation sub-system, a task monitoring sub-system such as the task monitoring sub-system, a proposal ranking sub-system, and a machine learning sub-system. In an embodiment, systems and/or sub-systems 1224 of the task facilitation service 1202 analyze the multiple accepted proposals in the set of accepted proposals 1212 to determine which of the proposals are selected for performance using the machine learning sub-system 1226. In an embodiment, the set of accepted proposals 1212 is an empty set (i.e., none of the ranked proposals 1210 is accepted). In such an embodiment, the member 1218 may find none of the ranked proposals acceptable. For example, the member 1218 may have information (not available to the task facilitation service 1202) that their parents no longer drink wine and do not like skiing. In such an embodiment, the systems and sub-systems of the task facilitation service 1202 may use the machine learning sub-system 1226 to, for example, generate a new set of ranked proposals for the member 1218 based on this updated information (i.e., that none of the proposals previously presented were acceptable).

In an embodiment, the member 1218 uses the application or web portal to reject a set of proposals from the ranked proposals 1210 (e.g., the rejected proposals 1214). For example, the member 1218, may reject the second Wine Tasting Weekend and may also reject the Ski Weekend (and accept the first Wine Tasting Weekend). In an embodiment, the set of rejected proposals 1214 is an empty set (i.e., none of the ranked proposals 1210 is rejected). In some embodiments (e.g., in the absence of an accepted or a partially accepted proposal), this can be an indication that all proposals are acceptable the task facilitation service 1202 may use the machine learning sub-system 1226 to analyze the multiple accepted proposals to determine which of the proposals may be selected for performance (e.g., which of the proposals may be selected and the tasks performed on behalf of the member using the task coordination system 1206 and/or the third party service(s) 1208.

In an embodiment, the member 1218 uses the application or web portal to partially accept a set of proposals from the ranked proposals 1210 (e.g., the set of partially accepted proposals 1216). In an embodiment, a partially accepted proposal is a proposal wherein the member accepts one or more of the proposal recommendations of the proposal and rejects one or more of the proposal recommendations of the proposal. For example, the first Wine Tasting Weekend may be partially accepted by the member 1218 if the member likes the restaurant, the winery, and the surprise activity, but does not like the proposed location for the 2-night stay. In such an example, the member 1218 may select an element from another proposal (e.g., the 2-night stay from the second Wine Tasting Weekend) or the member 1218 may suggest a different location for the 2-night stay. In such an example, the partially accepted proposal (e.g., the first Wine Tasting Weekend with a modified proposal recommendation) may be referred to herein as a "counter-proposal" for the project.

In an embodiment, a counter-proposal may be communicated to the task facilitation service 1202 where systems and/or sub-systems 1224 of the task facilitation service 1202 may analyze the counter proposal (e.g., using the machine learning sub-system 1226 described herein) to determine what actions should be undertaken in response to the counter-proposal. In an embodiment, the representative 1204 analyzes the counter proposal to determine what actions should be undertaken in response to the counter proposal. In an embodiment, if the counter-proposal is acceptable, systems and/or or sub-systems 1224 of the task facilitation service 1202 can communicate acceptance of the counter-proposal to the member 1218. In an embodiment, systems and/or sub-systems 1224 of the task facilitation service 1202 can accept the counter-proposal and select the counter-proposal for performance without communication of the acceptance of the counter-proposal in order to reduce the cognitive load on the member 1218.

It should be noted that while the task facilitation service 1202 may implement a machine learning sub-system 1226 as described herein to automatically generate new sets of ranked proposals for the member 1218, analyze accepted proposals to determine which of the accepted proposals may be selected for performance, and analyzing any received counter-proposals, the task facilitation service 1202 may alternatively utilize one or more classical algorithms to perform these operations. For example, if the member 1218 rejects the ranked proposals 1210 provided by the task facilitation service 1202, the task facilitation service 1202 (through use of the one or more classical algorithms) may automatically, and in real-time, use any feedback provided by the member 1218 in their proposal response to generate a new set of proposals that omit any proposal recommendations that may have led to the rejection of the ranked proposals 1210. As another illustrative example, if the member 1218 submits a proposal response that includes a set of accepted proposals 1212, the task facilitation service 1202, through use of the one or more classical algorithms, may review the set of accepted proposals 1212 according to their assigned rank and select one or more proposals from the set of accepted proposals 1212 for performance. The number of proposals selected may be determined based on the member's preferences or as otherwise defined in the member profile associated with the member 1218. As another illustrative example, the one or more classical algorithms may be used to automatically, and in real-time, analyze a received counter-proposal using the aforementioned resource library to determine whether the member's counter-proposal is feasible for performance. For instance, if the member 1218 suggests a different location for the 2-night stay, the one or more classical algorithms may query the resource library to determine whether the different location is available for the 2-night stay. Based on this query, the task facilitation service 1202 may determine whether the counter-proposal may be accepted.

When the member 1218 performs one or more actions to accept, reject, and/or partially accept the communicated ranked proposals 1210, the set of accepted proposals 1212, the set of rejected proposals 1214, and/or the set of partially accepted proposals 1216 may be communicated back to the task facilitation service 1202 as a set of proposal responses 1222. In an embodiment, the member provides the set of proposal responses 1222 as indications to the task facilitation service 1202 as to which proposals of the set of ranked proposals 1210 are accepted, rejected, and/or partially accepted. As used herein, the set of proposal responses 1222 may also be referred to as a proposal response (i.e., in singular form) that includes a plurality of acceptances, rejections, and/or partial acceptances. For example, a set of ranked proposals may have six ranked proposals with two accepted, three rejected, and one partially accepted. In this example, these may be referred to as "a set of proposal responses" with six members in the set or may be referred to as a "proposal response" where the proposal response is equivalent to a set of proposal responses with six members in the set. That is, a "proposal response" in singular may, without a loss of generality, refer to one or more proposal responses.

In an embodiment, the member 1218 communicates the set of accepted proposals 1212 to the task facilitation service 1202 and the rejection of the other proposals may be determined by systems and/or sub-systems 1224 of the task facilitation service 1202. For example, if the member 1218 communicates that the first Wine Tasting Weekend is accepted and does not communicate any information about the second Wine Tasting Weekend or the Ski Weekend (i.e., neither rejecting nor partially accepting the proposals), systems and/or sub-systems 1224 of the task facilitation service 1202 (e.g., using the machine learning sub-system 1226 described herein) may determine that the second Wine Tasting Weekend and the Ski Weekend are rejected based on the acceptance of the first Wine Tasting Weekend and the lack of information about the other proposals.

In an embodiment, the member 1218 communicates a set of partially accepted proposals 1216 to the task facilitation service 1202 in addition to the set of accepted proposals 1212 and the rejection of the other proposals may be assumed by systems and/or sub-systems 1224 of the task facilitation service 1202. For example, if the member 1218 communicates that the first Wine Tasting Weekend is accepted and communicates that the second Wine Tasting Weekend is partially accepted, but does not communicate any information about the Ski Weekend (i.e., neither rejecting nor partially accepting the Ski Weekend proposal), systems and/or sub-systems 1224 of the task facilitation service 1202 (e.g., using the machine learning sub-system 1226 described herein) may determine that the Ski Weekend is rejected based on the acceptance of the first Wine Tasting Weekend, the partial acceptance of the second Wine Tasting Weekend, and the lack of information about the Ski Weekend proposal. As may be contemplated, the acceptance of the first Wine Tasting Weekend and the partial acceptance of the second Wine Tasting Weekend is similar to the situation where the member communicates acceptance and/or partial acceptance of more than one proposal and accordingly, systems and/or sub-systems 1224 of the task facilitation service 1202 may use techniques such as those described herein to analyze the multiple accepted proposals (e.g., using the machine learning sub-system 1226 described herein) to determine which of the proposals may be selected for performance.

In an embodiment, the member 1218 communicates the set of rejected proposals 1214 to the task facilitation service 1202 and the acceptance of the other proposals may be assumed by systems and/or sub-systems 1224 of the task facilitation service 1202. For example, if the member 1218 communicates that the second Wine Tasting Weekend and the Ski Weekend are rejected, and does not communicate acceptance or partial acceptance of the first Wine Tasting Weekend, systems and/or sub-systems 1224 of the task facilitation service 1202 (e.g., using the machine learning sub-system 1226 described herein) may determine that the first Wine Tasting Weekend is accepted based on the rejection of the second Wine Tasting Weekend and the Ski Weekend and may determine that the first Wine Tasting Weekend may be selected for performance.

In an embodiment, the member 1218 communicates the set of accepted proposals 1212, the set of rejected proposals 1214, and/or the set of partially accepted proposals 1216 to the task facilitation service 1202. In such an embodiment, the acceptance, rejection, and/or partial acceptance of any of the proposals may not be assumed by systems and/or sub-systems 1224 of the task facilitation service 1202. For example, the member 1218 may accept the first Wine Tasting Weekend, reject the second Wine Tasting Weekend and the Ski Weekend, and not partially accept any proposal. In this example, since all of the proposals have either been accepted or rejected and there are not multiple accepted and/or partially accepted proposals, systems and/or sub-systems 1224 of the task facilitation service 1202 may determine that the first Wine Tasting Weekend may be selected for performance without any further analysis.

In an embodiment, machine learning models associated with the proposal recommendation algorithm, the proposal ranking algorithm, the proposal selection algorithm described herein, and/or any other algorithms described herein are updated in response to the set of accepted proposals 1212, the set of rejected proposals 1214, and/or the set of partially accepted proposals 1216 communicated to the task facilitation service 1202. For example, an accepted proposal of the set of accepted proposals 1212 may be used by machine learning models associated with the proposal recommendation algorithm, the proposal ranking algorithm, and/or the proposal selection algorithm as an indication that the accepted proposal was a good recommendation, was well ranked, and was properly selected.

In the example illustrated in FIG. 12, the representative 1204 communicates and/or interacts with a representative support sub-system 1228 using systems and methods such as those described herein. For example, the representative 1204 may interact with the representative support sub-system 1228 to obtain hotel information for the Parents' Anniversary Weekend proposal for "A Wine Tasting Weekend," or to obtain winery hours, or to obtain slope difficulty for the "Ski Weekend," or to obtain other such information.

Figure 13:
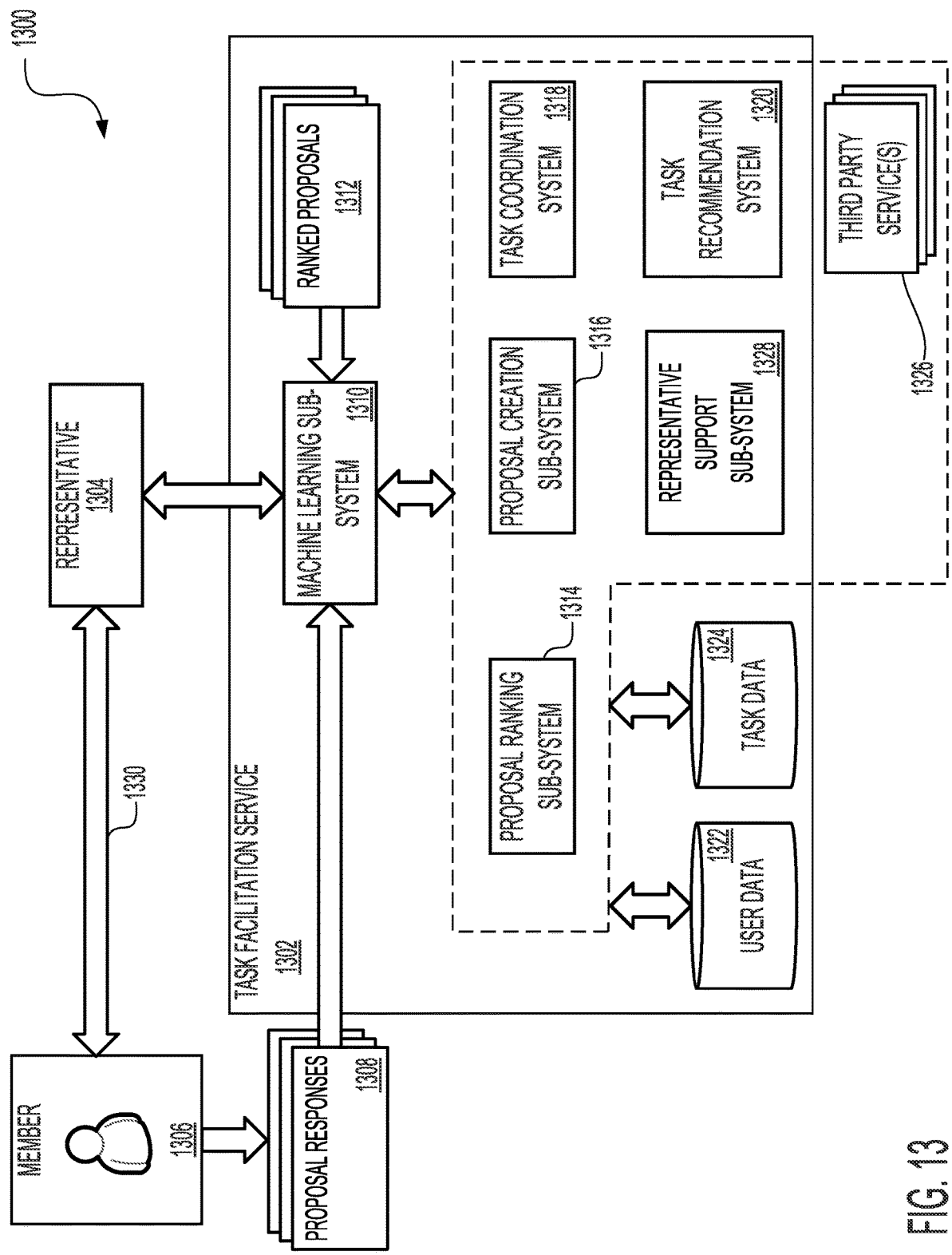
FIG. 13 shows an illustrative example of an environment in which proposal responses are accepted and processed by systems of a task facilitation service in accordance with at least one embodiment.

FIG. 13 shows an illustrative example of an environment 1300 in which proposal responses are accepted and processed by systems of a task facilitation service in accordance with at least one embodiment. In the example illustrated in FIG. 13, a machine learning sub-system 1310 is trained and updated with information from various services associated with a task facilitation service 1302 using systems and methods such as those described herein. For instance, the machine learning sub-system 1310 may be trained using sample and/or live data and updated as a result of receiving data from systems and/or sub-systems of the task facilitation service 1302.

As described herein, the machine learning sub-system 1310 may be used to implement one or more algorithms such as those described herein (e.g., the proposal recommendation algorithm, the proposal ranking algorithm, the proposal selection algorithm, the vendor recommendation algorithm, the task recommendation algorithm, the proposal task generation algorithm, and/or other such algorithms). As also described herein, the machine learning sub-system 1310 may be used to implement the aforementioned algorithms, which may be dynamically trained using machine learning, artificial intelligence systems, and/or computational models using sample data and/or actual data.

In an embodiment, the machine learning sub-system 1310 is updated using the ranked proposals 1312 using systems and methods also as described herein at least in connection with FIG. 11. For example, the ranked proposals 1312 can be used by the machine learning sub-system 1310 to update the proposal recommendation algorithm, the proposal ranking algorithm, the proposal selection algorithm, and/or the vendor recommendation algorithm as described herein.

In an embodiment, the machine learning sub-system 1310 is updated using the proposal responses 1308 using systems and methods as described herein. For example, the proposal responses 1308 can be used by the machine learning sub-system 1310 to update, for example, the proposal recommendation algorithm, the proposal ranking algorithm, the proposal selection algorithm, and/or the vendor recommendation as described herein.

In an embodiment, the machine learning sub-system 1310 is updated in real-time using communications 1330 between the member 1306 and the representative 1304 as these communications are exchanged. In an embodiment, the machine learning sub-system 1310 is updated in real-time using communications between the member 1306 and systems and sub-systems of the task facilitation service 1302 as these communications are exchanged. In an embodiment, the communications 1330 between the member 1306 and the representative 1304 and/or the communications between the member 1306 and systems and sub-systems of the task facilitation service 1302 can be used in real-time by the machine learning sub-system 1310 as these communications are exchanged to update the various algorithms described herein (e.g., the proposal recommendation algorithm, the proposal ranking algorithm, the proposal selection algorithm, and/or the vendor recommendation algorithm).

In an embodiment, the machine learning sub-system 1310 is updated using data from various systems and sub-systems of the task facilitation service 1302. For example, data from the proposal ranking sub-system 1314 may be used by the machine learning sub-system 1310 to update the various algorithms described herein. In another example, data from the proposal creation sub-system 1316 may be used by the machine learning sub-system 1310 to update the various algorithms described herein. In another example, data from the task coordination system 1318 may be used by the machine learning sub-system 1310 to update the various algorithms described herein. In another example, data from the task recommendation system 1320 may be used by the machine learning sub-system 1310 to update the various algorithms described herein.

In an embodiment, data from other systems, sub-systems, services, and data sources may be used by the machine learning sub-system 1310 to update the various algorithms described herein including, but not limited to, the third party service(s) 1326, user data 1322, and the task data 1324 as described herein. In the example illustrated in FIG. 13, various systems, sub-systems, and services of the task facilitation service 1302 communicate and/or interact with a representative support sub-system 1316 using systems and methods such as those described herein. For example, the representative 1304 may interact with the representative support sub-system 1328 to obtain information about various proposals and tasks as described herein.

Figure 14:
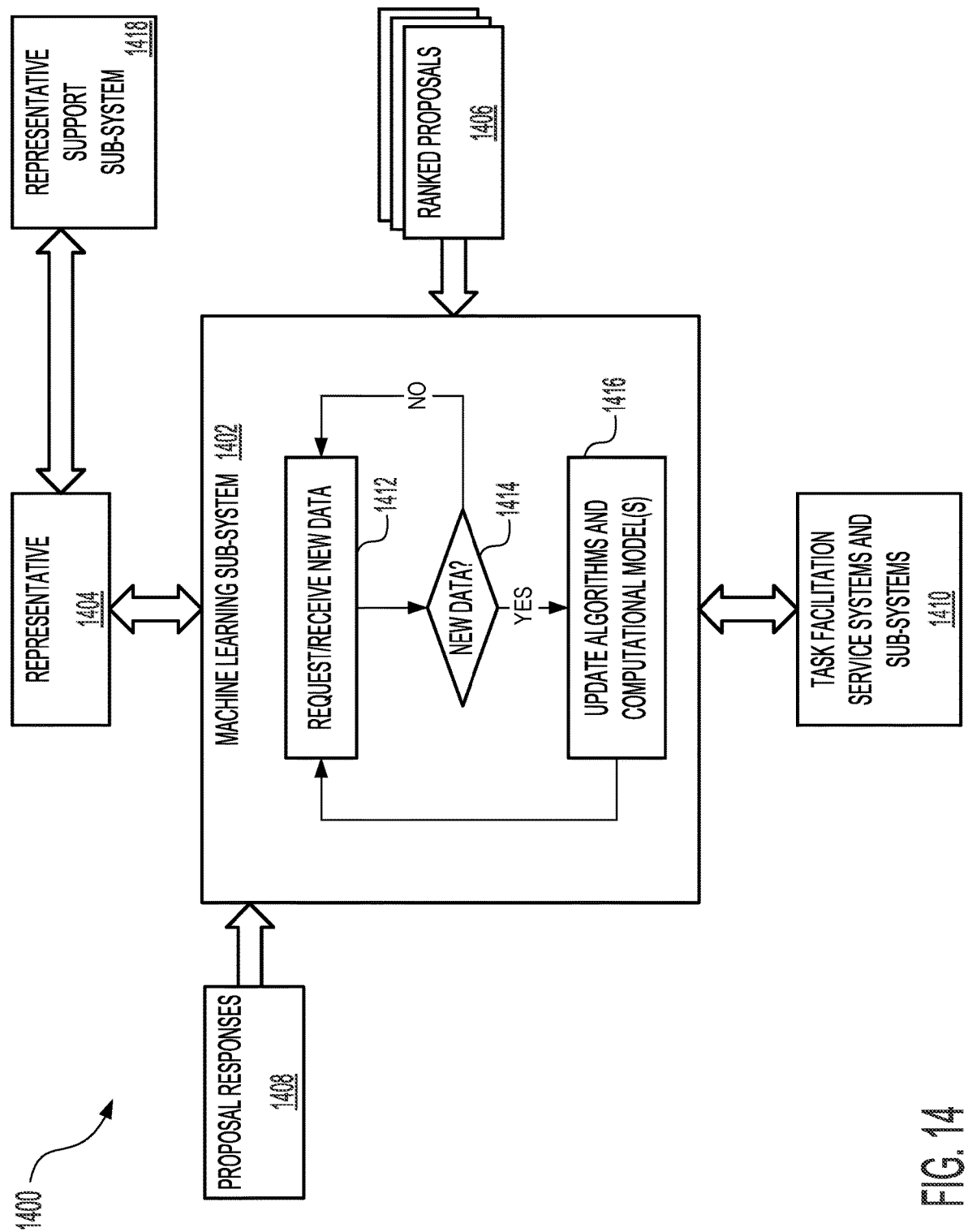
FIG. 14 shows an illustrative example of an environment in which proposal responses are accepted and processed by a machine learning sub-system of a task facilitation service in accordance with at least one embodiment.

FIG. 14 shows an illustrative example of an environment 1400 in which proposal responses are accepted and processed by a machine learning sub-system 1402 of a task facilitation service in accordance with at least one embodiment. In an embodiment, the machine learning sub-system 1402 is updated with information from various services associated with the task facilitation service 102 described herein at least in connection with FIG. 1. In an embodiment, the machine learning sub-system 1402 is dynamically trained and updated in real-time using systems and methods such as those described herein (e.g., the machine learning sub-system 1402 is trained using sample and/or live data and updated as a result of receiving data from systems and/or sub-systems of the task facilitation service).

As described herein at least in connection with FIG. 13, the machine learning sub-system 1402 implements one or more algorithms such as the proposal recommendation algorithm, the proposal ranking algorithm, the proposal selection algorithm, the vendor recommendation algorithm, the task recommendation algorithm, the proposal task generation algorithm, and/or other such algorithms. As also described herein the machine learning sub-system 1402 implements these algorithms using machine learning, artificial intelligence systems, and/or computational models. Further, the machine learning sub-system 1402 may train such algorithms in real-time using sample data and/or actual data. For instance, the machine learning sub-system 1402 may dynamically update, in real-time, such algorithms using information received from systems and/or sub-systems of the task facilitation service as this information is obtained.

In an embodiment, the machine learning sub-system 1402 is updated with information from ranked proposals 1406. The machine learning sub-system 1402 may additionally, or alternatively, be updated using the proposal responses 1408 provided by members associated with the task facilitation service. For example, information from the ranked proposals 1406 and/or from the proposal responses 1408 may be used by the machine learning sub-system 1402 to update the various algorithms described herein.

In an embodiment, the machine learning sub-system 1402 is updated in real-time using communications between the member and the representative 1404 as these communications are exchanged. Additionally, the machine learning sub-system 1402 may be updated in real-time using communications between the member and task facilitation service systems and sub-systems 1410 as these communications are exchanged. For instance, as these communications are exchanged between the member and the representative 1404 and/or the task facilitation service and sub-systems 1410, the machine learning sub-system 1402 may update, in real-time, the various algorithms described herein. In an embodiment, the machine learning sub-system 1402 is updated using data from various task facilitation service systems and sub-systems 1410 as described herein.

In the example illustrated in FIG. 14, the machine learning sub-system 1402 is updated by first requesting and/or receiving new data at step 1412. For example, the machine learning sub-system 1402 may receive, in real-time, new data when the set of ranked proposals 1406 is generated by the aforementioned proposal creation sub-system. In such an example, the task facilitation service may update the machine learning sub-system 1402 in real-time when the ranked proposals 1406 are generated. In another example, the machine learning sub-system 1402 may request data from the task coordination system 114 and/or the task recommendation system 112 (as described herein at least in connection with FIG. 1) such that, when the requested data is received, the requested data may be used to update the machine learning sub-system 1402.

In the example illustrated in FIG. 14, the machine learning sub-system 1402, at step 1414, may determine whether the requested and/or received data is new data. As may be contemplated, the requested and/or received data may be received from multiple sources (e.g., from multiple systems and/or or sub-systems of the task facilitation service). Accordingly, the data received and/or requested in step 1412 may not be new data if, for example, the data was previously received. In an embodiment, if the machine learning sub-system 1402 determines that the requested and/or received data is not new data (the "NO" branch), the machine learning sub-system 1402 may continue requesting and/or receiving new data at step 1412. In an embodiment, if the machine learning sub-system 1402 determines that the requested and/or received data is new data (the "YES" branch), the machine learning sub-system 1402 may, at step 1416, update the various algorithms and/or computational models as described herein. In some instances, the machine learning sub-system 1402 may dynamically update these algorithms and/or computational models in real-time as the new data is received. As noted above, the new data may include communications exchanged between a member and the representative 1404 and/or one or more task facilitation service systems and sub-systems 1410. Thus, the machine learning sub-system 1402 may dynamically update the various algorithms and computational models implemented by the task facilitation service in real-time as these communications are exchanged.

The machine learning sub-system 1402 may continue requesting and/or receiving new data at step 1412 from the aforementioned sources. It should be noted that the various operations associated with the process described in FIG. 14 may be performed simultaneously by the machine learning sub-system 1402 in real-time as new data is received and utilized to update the various algorithms and computational models described herein. For instance, as the machine learning sub-system 1402 is updating the various algorithms and computational models described herein, the machine learning sub-system 1402 may be simultaneously requesting and receiving new data from the various data sources described herein and determining whether the received data includes new data that may be used to further update the various algorithms and computational models. Further, the process whereby the machine learning sub-system 1402 is updated may be performed in parallel (e.g., with multiple update "threads" each responding to individual requested and/or received data), may be performed using virtual machines from, for example, a computing resources provider such as the computing resources provider 1928 described herein at least in connection with FIG. 19, and/or may be performed using some other method. Additionally, while the process whereby the machine learning sub-system 1402 is updated (e.g., in steps 1412, 1414, and 1416) is illustrated in FIG. 14 as reentrant (e.g., that it explicitly restarts continuously), the process whereby the machine learning sub-system 1402 is updated may be implemented as a non-reentrant process where the returns to step 1412 do not occur. In the example illustrated in FIG. 14, the representative 1404 communicates and/or interacts with a representative support sub-system 1418 using systems and methods such as those described herein. For example, the representative 1404 may interact with the representative support sub-system 1418 to obtain information about various proposals and tasks as described herein.

Figure 15:
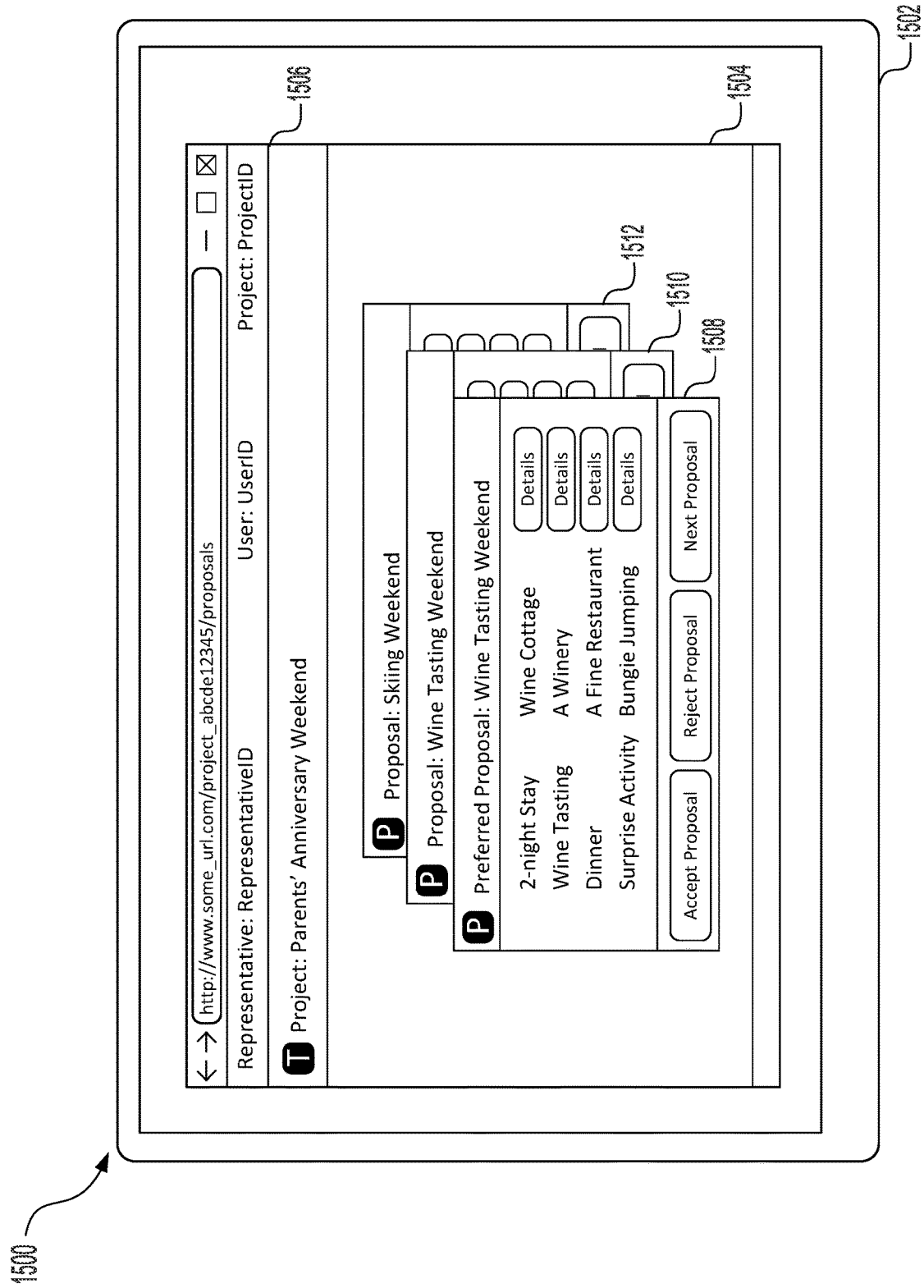
FIG. 15 shows an illustrative example of an environment in which communicated proposals are received by a member in accordance with at least one embodiment.

FIG. 15 shows an illustrative example of an environment 1500 in which communicated proposals are received by a member in accordance with at least one embodiment. In an embodiment, proposals are communicated to a member using systems and methods such as those described herein. In an embodiment, a computing device 1502 is used to display an application 1504. In an embodiment, a member (interacts with systems of the task facilitation service via the computing device 1502. In an embodiment, the application 1504 displays user interface elements such as those described herein to convey information obtained from systems of the task facilitation service and presented to a member.

Figure 19:
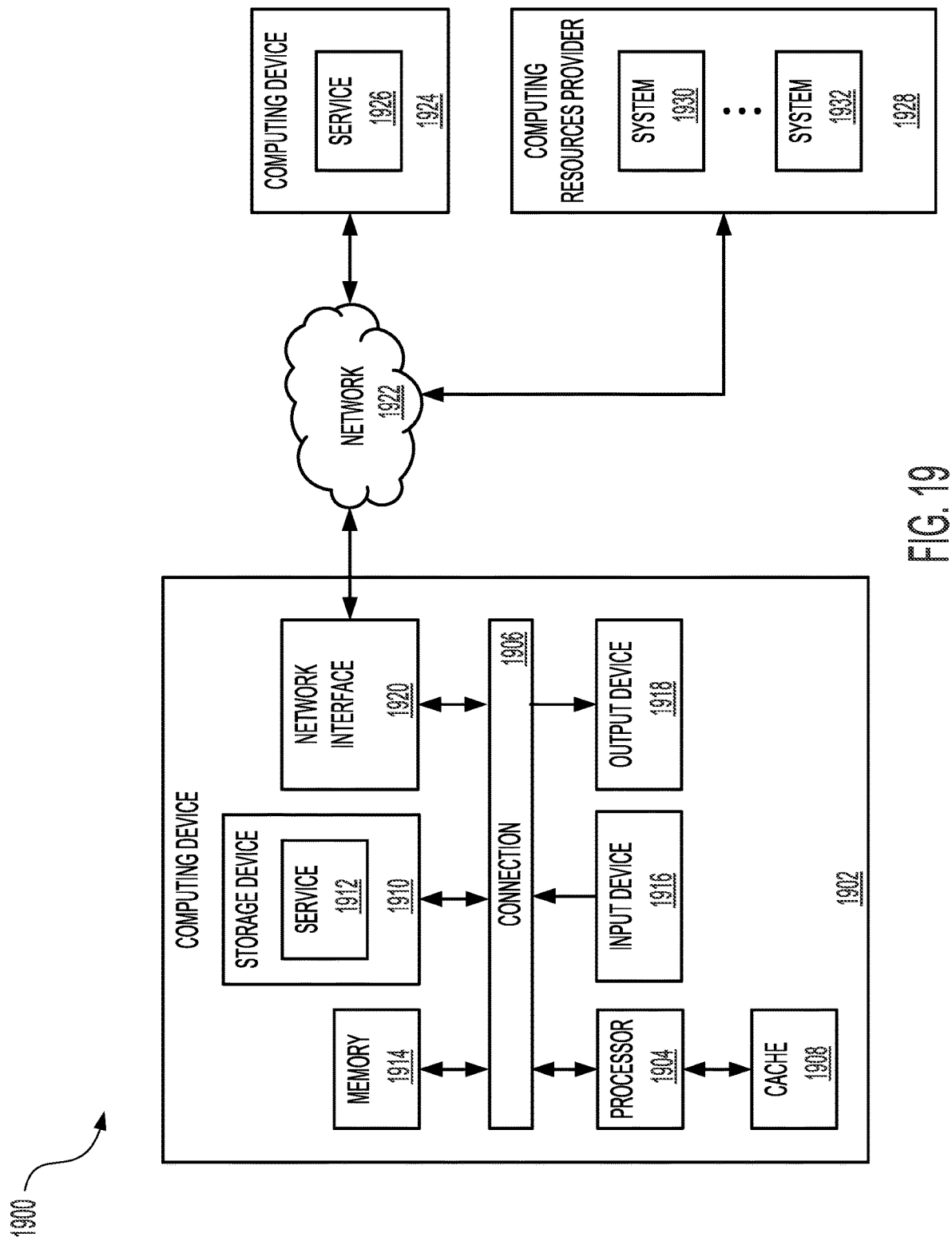
FIG. 19 illustrates a computing system architecture, including various components in electrical communication with each other, in accordance with various embodiments.

In an embodiment, the application 1504 receives the obtained information via a network interface (e.g., the network interface 1920 described herein at least in connection with FIG. 19) that is associated with the computing device 1502 (e.g., the computing device 1902, the computing device 1924, or a computing device associated with the computing resources provider 1928, all described herein at least in connection with FIG. 19). In an embodiment, the application 1504 provides the information obtained from the representative via the network interface that is associated with the computing device 1502.

In an embodiment, user interface elements of the application 1504 are used to display an information bar 1506 that specifies information including, but not limited to, an identifier of the representative, an identifier of the member, and an identifier of a current project, and a title of the project. In an embodiment, user interface elements of the application 1504 are used to display one or more proposals communicated to the member. In the example illustrated in FIG. 15, user interface elements of the application 1504 are used to display a preferred proposal 1508, a first alternate proposal 1510, and a second alternate proposal 1512. In the example illustrated in FIG. 15, each of the proposals (e.g., the preferred proposal 1508, the first alternate proposal 1510, and the second alternate proposal 1512) includes the proposal options and the corresponding proposal recommendations. In an embodiment, the displayed proposals include various other user interface elements including, but not limited to, buttons to obtain additional details about the proposal recommendations, a button to accept the proposal, a button to reject the proposal, a button to look at the next proposal, and other such user interface elements. In an embodiment, user interface elements of the application 1504 can be used to obtain additional information about the project such as, for example, information about the factors used to prefer the preferred proposal 1508.

Figure 16:
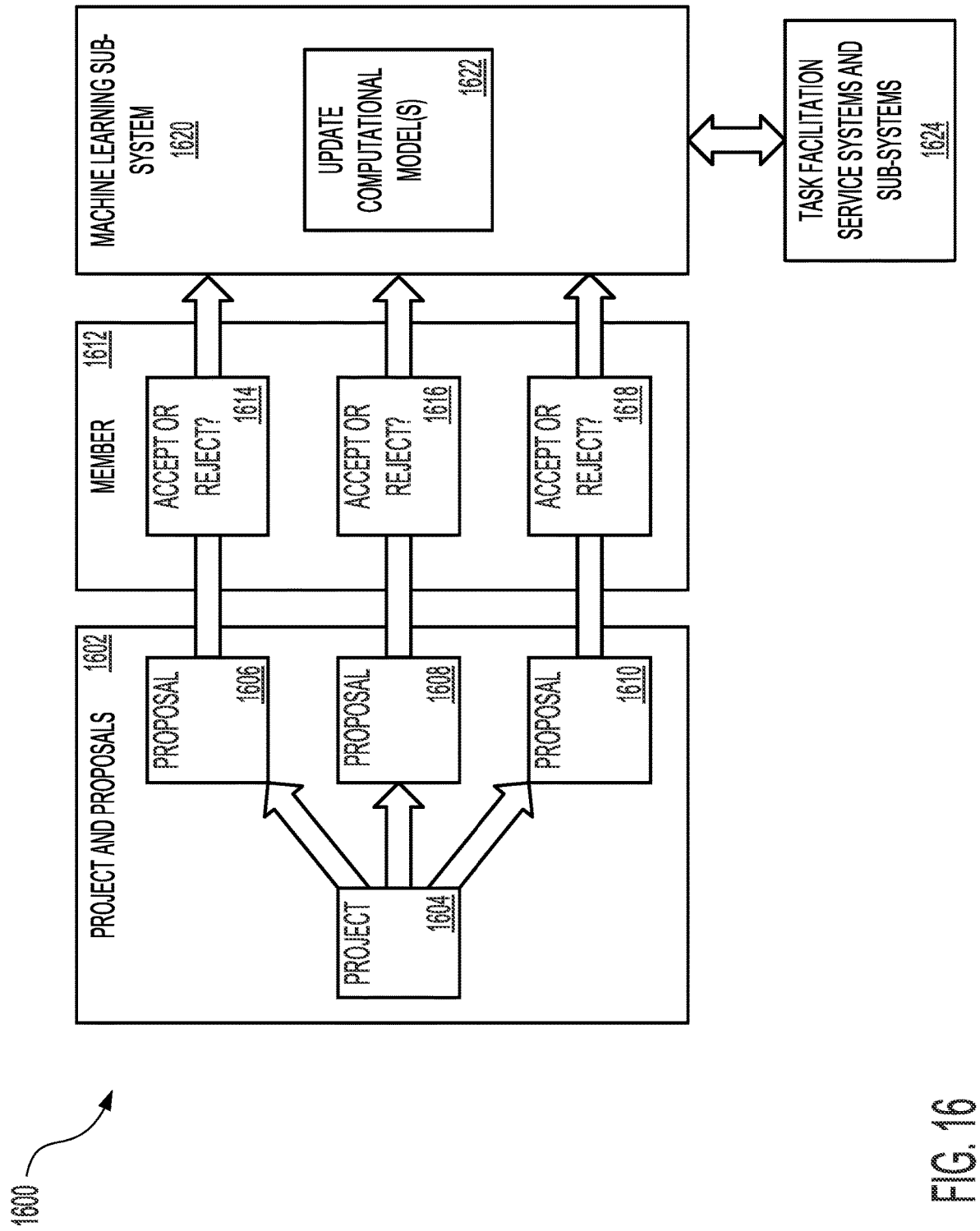
FIG. 16 shows an illustrative example of an environment in which a machine learning sub-system of a task facilitation service accepts and processes proposal acceptances in accordance with at least one embodiment.

FIG. 16 shows an illustrative example of an environment 1600 in which a machine learning sub-system of a task facilitation service accepts and processes proposal acceptances in accordance with at least one embodiment. In the example illustrated in FIG. 16, a project and proposal 1602 includes a project 1604 (e.g., the Parents' Anniversary Weekend project described herein) and three proposals 1606-1610 as described herein. In the example illustrated in FIG. 16, the three proposals include a proposal 1606, a proposal 1608, and a proposal 1610. As may be contemplated, the example illustrated in FIG. 16 is akin to the example illustrated in FIG. 15, where the proposal 1606 is akin to the preferred proposal 1508 (i.e., for the first Wine Tasting Weekend), the proposal 1608 is akin to the first alternate proposal 1510 (i.e., for the second Wine Tasting Weekend), and the proposal 1610 is akin to the second alternate proposal 1512 (i.e., for the Ski Weekend).

In the example illustrated in FIG. 16, a member can accept or reject 1614 the proposal 1606 using systems and methods described herein. In the example illustrated in FIG. 16, the member can also accept or reject 1616 the proposal 1608 and accept or reject 1618 the proposal 1610. In an embodiment (not illustrated in FIG. 16), the member can also partially accept the proposal 1606, the proposal 1608, and/or the proposal 1610, also using systems and methods described herein.

As described herein, the acceptance, rejection, and/or partial acceptance of the proposals (e.g., the proposal 1606, the proposal 1608, and/or the proposal 1610) may be used by a machine learning sub-system 1620 to update computational models and/or algorithms implemented by the task facilitation service systems and/or sub-systems 1624 such as those described herein (e.g., the proposal recommendation algorithm, the proposal ranking algorithm, the proposal selection algorithm of the proposal ranking sub-system, the vendor recommendation algorithm, the task recommendation algorithm, the proposal task generation algorithm, and/or any other algorithm implemented by the task facilitation service).

In an embodiment, the accepted and/or partially accepted proposals may be selected by task facilitation service systems and/or sub-systems 1624 for performance on behalf of the member using systems and methods such as those described herein. For example, using the Parents' Anniversary Weekend example described herein at least in connection with FIG. 15, the member may accept the proposal 1606 (i.e., the preferred proposal 1508, for the first Wine Tasting Weekend), reject the proposal 1608 (i.e., the first alternate proposal 1510, for the second Wine Tasting Weekend), and reject the proposal 1610 (i.e., the second alternate proposal 1512, for the Ski Weekend). In such an example, the first Wine Tasting Weekend may be selected by systems and/or sub-systems of the task facilitation service systems and/or sub-systems 1624 for performance on behalf of the member.

In another example, the member may reject the proposal 1606 (i.e., the preferred proposal 1508, for the first Wine Tasting Weekend), reject the proposal 1608 (i.e., the first alternate proposal 1510, for the second Wine Tasting Weekend), and accept the proposal 1610 (i.e., the second alternate proposal 1512, for the Ski Weekend). In such an example, the Ski Weekend may be selected by systems and/or sub-systems of the task facilitation service systems and/or sub-systems 1624 for performance on behalf of the member.

In another example, the member may reject the proposal 1606 (i.e., the preferred proposal 1508, for the first Wine Tasting Weekend), partially accept the proposal 1608 (i.e., the first alternate proposal 1510, for the second Wine Tasting Weekend), and partially accept the proposal 1610 (i.e., the second alternate proposal 1512, for the Ski Weekend). In such an example, elements of the second Wine Tasting Weekend may be combined with elements of the Ski Weekend by systems and/or sub-systems of the task facilitation service systems and/or sub-systems 1624 and this combined proposal may be selected for performance on behalf of the member.

In another example, the member may accept the proposal 1606 (i.e., the preferred proposal 1508, for the first Wine Tasting Weekend), accept the proposal 1608 (i.e., the first alternate proposal 1510, for the second Wine Tasting Weekend), and also accept the proposal 1610 (i.e., the second alternate proposal 1512, for the Ski Weekend). In such an example, elements of the second Wine Tasting Weekend may determine which proposal may be selected for performance on behalf of the member.

In another example, the member may not respond to the proposal 1606 (i.e., may neither accept nor reject the preferred proposal 1508 for the first Wine Tasting Weekend), not respond to the proposal 1608 (i.e., may neither accept nor reject the first alternate proposal 1510 for the second Wine Tasting Weekend), and may reject the proposal 1610 (i.e., the second alternate proposal 1512, for the Ski Weekend). In such an example, systems and/or sub-systems of the task facilitation service systems and/or sub-systems 1624 may determine which of the proposal 1606 and the proposal 1608 may be select for performance on behalf of the member. As may be contemplated, such determination may include some of the elements of the proposal 1606 and may include some of the elements of the proposal 1608.

Figure 17:
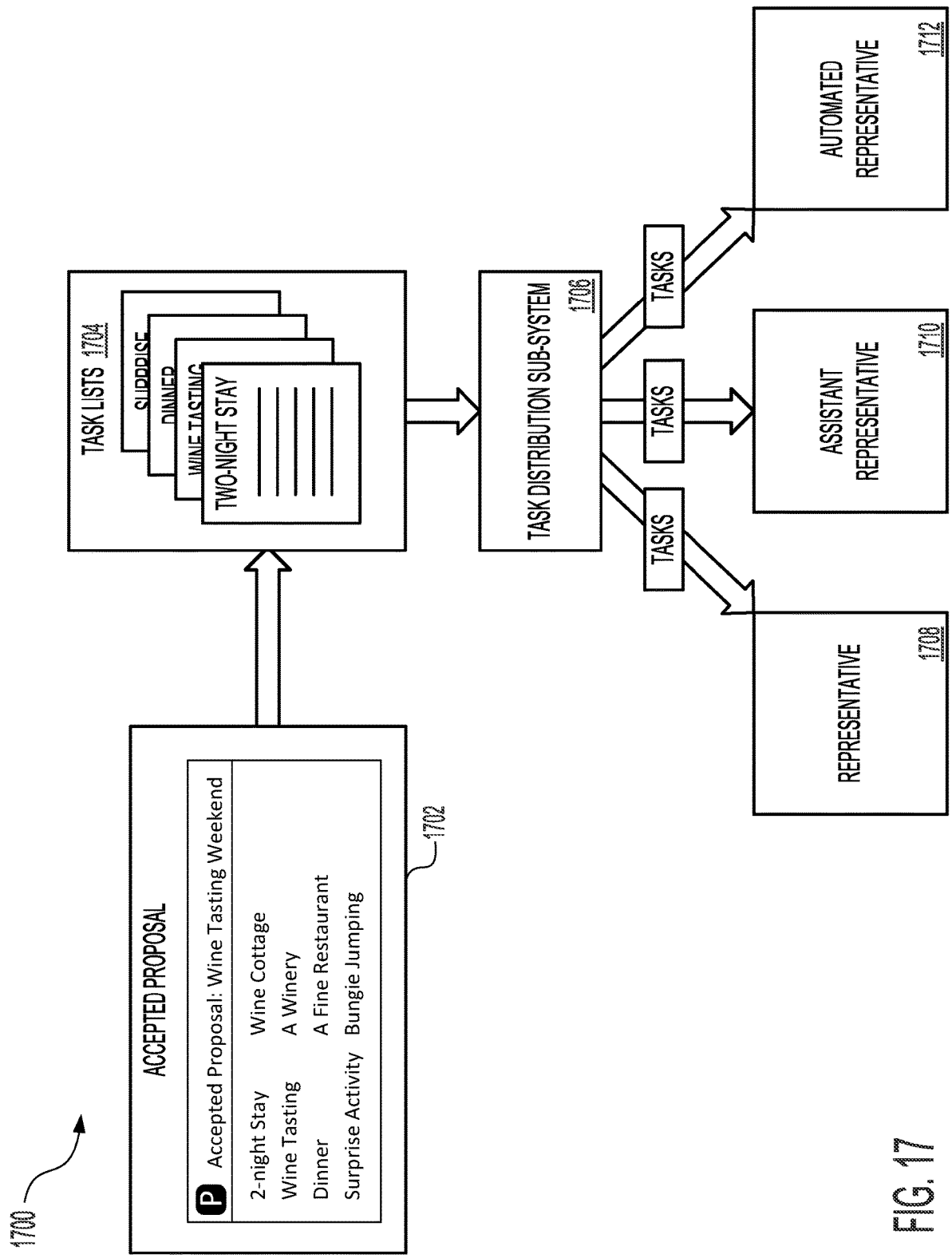
FIG. 17 shows an illustrative example of an environment in tasks of an accepted proposal are delegated for performance in accordance with at least one embodiment.

FIG. 17 shows an illustrative example of an environment 1700 in which tasks of an accepted proposal are delegated for performance in accordance with at least one embodiment. In the example illustrated in FIG. 17, an accepted proposal 1702 (e.g., one of the accepted proposals 1212 and/or one of the partially accepted proposals 1216, both described herein at least in connection with FIG. 12) may be used by the task facilitation service 102 described herein at least in connection with FIG. 1 to create one or more task lists 1704. In the example illustrated in FIG. 17, the one or more task lists 1704 include tasks for the "two-night stay," the "wine tasting," the "dinner," and the "surprise activity." In the example illustrated in FIG. 17, the tasks in the task lists 1704 are distributed by a task distribution system 1706 which analyzes the tasks in the task lists 1704 and determines which tasks should be performed by the representative 1708, which tasks may be performed by an assistant representative 1710, and which tasks may be performed by an automated representative 1712.

For example, a task to book the hotel room for the 2-night stay may be delegated to an assistant representative 1710 and/or may be delegated to a suitably configured automated representative 1712. Conversely, a task to determine the timing and/or other logistics for a surprise activity may require the personal attention of the representative 1708. Although not illustrated in FIG. 17, in an embodiment, the representative 1708 may further delegate tasks and/or sub-tasks to the assistant representative 1710 and/or to the automated representative 1712. Similarly, although not illustrated in FIG. 17, the assistant representative 1710 may further delegate tasks and/or sub-tasks to the automated representative 1712 and/or may request additional help from the representative 1708 (e.g., if the task requires the personal attention of the representative 1708). Similarly, although also not illustrated in FIG. 17, the automated representative 1712 may not be able to perform certain tasks and/or sub-tasks and may request help from the assistant representative 1710 and/or from the representative 1708.

Figure 18:
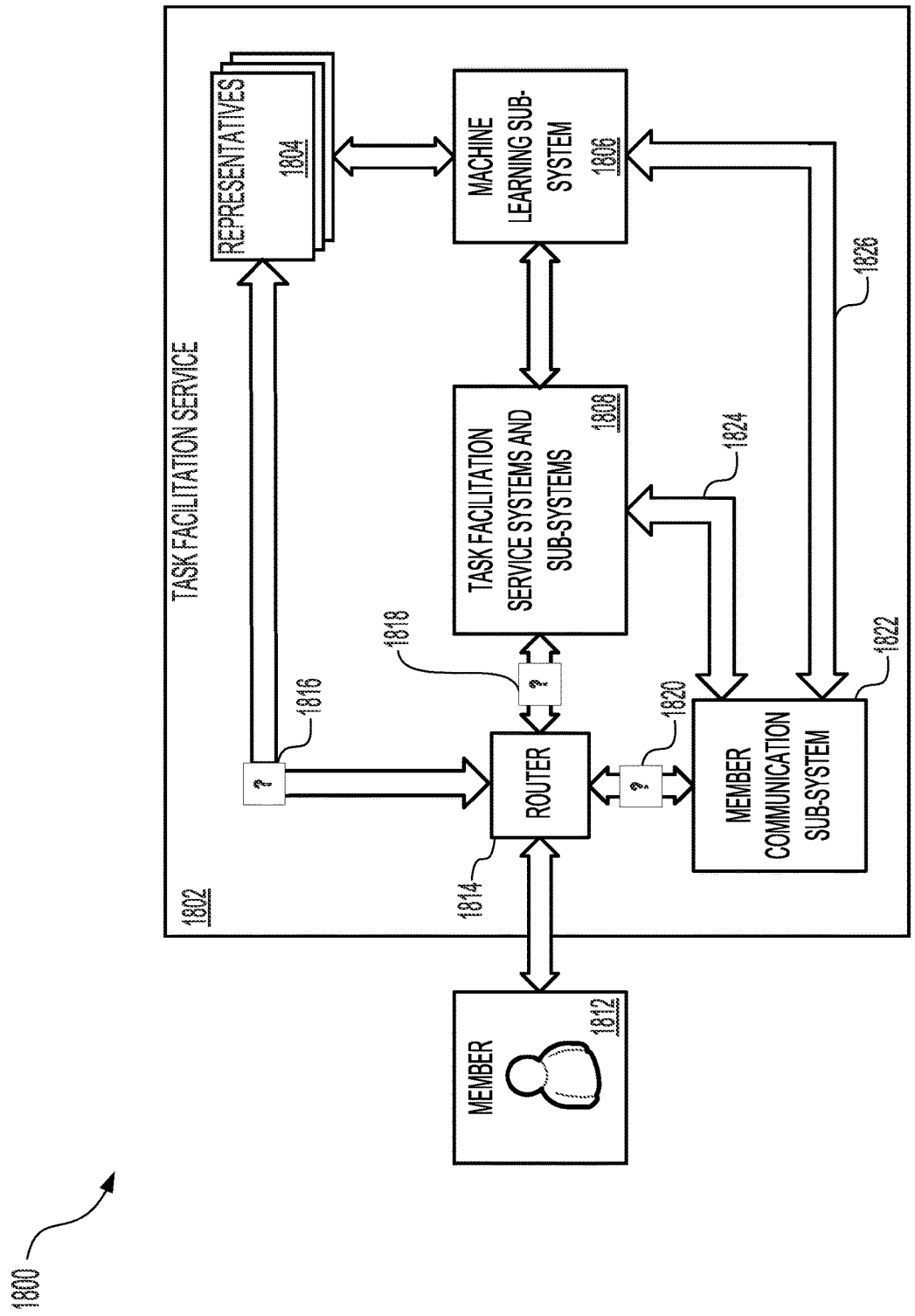
FIG. 18 shows an illustrative example of an environment in which communications with members are processed in accordance with at least one embodiment.

FIG. 18 shows an illustrative example of an environment 1800 in which communications with members are processed in accordance with at least one embodiment. In an embodiment, operations performed by representatives 1804 are partially and/or fully performed using one or more machine learning algorithms, artificial intelligence systems and/or computational models. For example, as the representatives 1804 perform or otherwise coordinate performance of tasks on behalf of a member 1812, the task facilitation service 1802 may update a profile of the member 1812 and/or a computational model of the profile of the member 1812.

In an embodiment, as the representatives 1804 perform or otherwise coordinate performance of tasks on behalf of a member 1812, the task facilitation service 1802 updates a profile of the member 1812 and/or a computational model of the profile of the member 1812 continuously. For example, as a member 1812 communicates with a system of the task facilitation service 1802, the task facilitation service 1802 may update the profile of the member 1812 and/or a computational model of the profile of the member 1812 continuously during the course of the interaction.

In an embodiment, as the representatives 1804 perform or otherwise coordinate performance of tasks on behalf of a member 1812, the task facilitation service 1802 updates a profile of the member 1812 and/or a computational model of the profile of the member 1812 dynamically. For example, as a task is performed on behalf of a member 1812, a vendor performing the task may provide regular updates to the task facilitation service 1802 and the task facilitation service 1802 may update the profile of the member 1812 and/or a computational model of the profile of the member 1812 dynamically at each update from the vendor.

In an embodiment, as the representatives 1804 perform or otherwise coordinate performance of tasks on behalf of a member 1812, the task facilitation service 1802 updates a profile of the member 1812 and/or a computational model of the profile of the member 1812 automatically. For example, when a proposal is generated for the member, the task facilitation service 1802 may update the profile of the member 1812 and/or a computational model of the profile of the member 1812 automatically as part of the proposal generation process.

In an embodiment, as the representatives 1804 perform or otherwise coordinate performance of tasks on behalf of a member 1812, the task facilitation service 1802 updates a profile of the member 1812 and/or a computational model of the profile of the member 1812 in real-time. For example, when a member 1812 accepts a proposal, the task facilitation service 1802 may update the profile of the member 1812 and/or a computational model of the profile of the member 1812 at the time that the proposal acceptance is provided, rather than delaying the update.

In an embodiment, the task facilitation service 1802 updates a profile of the member 1812 and/or a computational model of the profile of the member 1812 using a machine learning sub-system 1806 of the task facilitation service 1802. In an embodiment, a machine learning sub-system 1806 is a component of the task facilitation service 1802 that is configured to implement machine learning algorithms, artificial intelligence systems, and/or computation models. In an example, a machine learning sub-system 1806 may use various algorithms to train a machine learning model using sample and/or live data. Additionally, a machine learning sub-system 1806 may update the machine learning model as new data is received. In another example, the machine learning sub-system 1806 may train and/or update various artificial intelligence systems or generate, train and/or update various computational models. For example, a computational model of the profile of the member 1812 may be generated, trained and/or updated by the machine learning sub-system 1806 as new information is received about the member 1812.

In an embodiment, after the profile of the member 1812 and/or a computational model of the profile of the member 1812 has been updated over a period of time (e.g., six months, a year, etc.) and/or over a set of tasks (e.g., twenty tasks, thirty tasks, etc.), systems of the task facilitation service 1802 (e.g., a task recommendation system) utilize one or more machine learning algorithms, artificial intelligence systems and/or computational models to generate new tasks continuously, automatically, dynamically, and in real-time. For example, the task recommendation system may generate new tasks based on the various attributes of the member's profile (e.g., historical data corresponding to member-representative communications, member feedback corresponding to representative performance and presented tasks/proposals, etc.) with or without representative interaction. In an embodiment, systems of task facilitation service 1802 (e.g., a task recommendation system) can automatically communicate with the member 1812 to obtain any additional information needed and can also generate proposals that may be presented to the member 1812 for performance of these tasks.

In the example illustrated in FIG. 18, communications between the member 1812 and the task facilitation service 1802 may be routed to one or more entities within the task facilitation service 1802. The example illustrated in FIG. 18 shows a communication router 1814 (referred to in the illustration as a "router") however, as may be contemplated and as illustrated in FIG. 18, the router 1814 is an abstract representation of one or more techniques for routing communications between entities. Accordingly, communications from the member 1812 to the task facilitation service 1802 may be routed to one or more entities of the task facilitation service and communications from the one or more entities of the task facilitation service 1802 may be routed back to the member 1812.

In the example illustrated in FIG. 18, the representatives 1804 can monitor communications between task facilitation service systems and/or sub-systems 1808 and the member 1812 to ensure that the interaction maintains a positive polarity as described herein because the communications can be routed 1816 to the representatives 1804 and also routed 1818 to task facilitation service systems and/or sub-systems 1808. For example, if a member 1812 is interacting with the task recommendation system, the representatives 1804 can determine whether the member 1812 is satisfied with the interaction. If the representatives 1804 determine that the conversation has a negative polarity (e.g., that the member 1812 is not satisfied with the interaction), the representatives 1804 may intervene to improve the interaction.

Similarly, other interactions between task facilitation service systems and/or sub-systems 1808 and the member 1812 may be routed 1820 to a member communication sub-system 1822 which may be configured to monitor the interactions between task facilitation service systems and/or sub-systems 1808 and the member 1812. In an embodiment, the member communication sub-system 1822 can be configured to intercept the interactions between task facilitation service systems and/or sub-systems 1808 and the member 1812 (using, for example, the router 1814). In such an embodiment, all such interactions can be routed 1820 between the member 1812 and the member communication sub-system 1822 and can be routed 1824 between the member communication sub-system 1822 and the task facilitation service systems and/or sub-systems 1808. In such an embodiment, interactions between the task facilitation service systems and/or sub-systems 1808 and the member 1812 may not be routed 1818 directly. In such an embodiment, the representatives 1804 may still monitor interactions between task facilitation service systems and/or sub-systems 1808 and the member 1812 to ensure that the interaction maintains a positive polarity as described above (e.g., by routing 1816 the interactions to the representatives 1804).

In an embodiment, the representatives 1804 can interact with the machine learning sub-system 1806 to update the profile of the member indicating changing member preferences based on an interaction between the representatives 1804 the member 1812. In an embodiment, the task facilitation service systems and/or sub-systems 1808 can interact with the machine learning sub-system 1806 to update the profile of the member when, for example, a proposal is accepted or rejected. Additionally, as illustrated in FIG. 18, the interactions between the task facilitation service 1802 and the member 1812 can be additionally routed 1826 between the member communication sub-system 1822 and the machine learning sub-system 1806. Accordingly, interactions between the member 1812 and, for example, a proposal creation sub-system may be used to update the profile of the member as a proposal is created.

Thus, unlike automated customer service systems and environments, wherein the systems and environment may have little or no knowledge of users interacting with agents and/or other automated systems, task facilitation service systems and/or sub-systems 1808 can update the profile of the member 1812 and/or a computational model of the profile of the member 1812 continuously, dynamically, automatically, and/or in real-time. For example, task facilitation service systems and/or sub-systems 1808 can update the profile of the member 1812 and/or a computational model of the profile of the member 1812 using the machine learning sub-system 1806 as described herein. Accordingly, task facilitation service systems and/or sub-systems 1808 can update the profile of the member 1812 and/or a computational model of the profile of the member 1812 to provide up-to-date information about the member based on the member's automatic interaction with the task facilitation service 1802, based on the member's interaction with the representative 1804, and/or based on tasks performed on behalf of the member 1812 over time. This information may also be updated continuously, automatically, dynamically, and/or in real-time as tasks and/or proposals are created, proposed, and performed for the member 1812. This information may also be used by the task facilitation service 1802 to anticipate, identify, and present appropriate or intelligent interactions with the member 1812 (e.g., in response to member 1812 queries, needs, and/or goals).

FIG. 19 illustrates a computing system architecture 1900, including various components in electrical communication with each other, in accordance with some embodiments. The example computing system architecture 1900 illustrated in FIG. 19 includes a computing device 1902, which has various components in electrical communication with each other using a connection 1906, such as a bus, in accordance with some implementations. The example computing system architecture 1900 includes a processing unit 1904 that is in electrical communication with various system components, using the connection 1906, and including the system memory 1914. In some embodiments, the system memory 1914 includes read-only memory (ROM), random-access memory (RAM), and other such memory technologies including, but not limited to, those described herein. In some embodiments, the example computing system architecture 1900 includes a cache 1908 of high-speed memory connected directly with, in close proximity to, or integrated as part of the processor 1904. The system architecture 1900 can copy data from the memory 1914 and/or the storage device 1910 to the cache 1908 for quick access by the processor 1904. In this way, the cache 1908 can provide a performance boost that decreases or eliminates processor delays in the processor 1904 due to waiting for data. Using modules, methods and services such as those described herein, the processor 1904 can be configured to perform various actions. In some embodiments, the cache 1908 may include multiple types of cache including, for example, level one (L1) and level two (L2) cache. The memory 1914 may be referred to herein as system memory or computer system memory. The memory 1914 may include, at various times, elements of an operating system, one or more applications, data associated with the operating system or the one or more applications, or other such data associated with the computing device 1902.

Other system memory 1914 can be available for use as well. The memory 1914 can include multiple different types of memory with different performance characteristics. The processor 1904 can include any general purpose processor and one or more hardware or software services, such as service 1912 stored in storage device 1910, configured to control the processor 1904 as well as a special-purpose processor where software instructions are incorporated into the actual processor design. The processor 1904 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1904 can be a microprocessor, a microcontroller, a digital signal processor ("DSP"), or a combination of these and/or other types of processors. In some embodiments, the processor 1904 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1900, an input device 1916 can represent any number of input mechanisms, such as a microphone for speech, a touch-sensitive screen for gesture or graphical input, keyboard, mouse, motion input, pen, and other such input devices. An output device 1918 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1900. In some embodiments, the input device 1916 and/or the output device 1918 can be coupled to the computing device 1902 using a remote connection device such as, for example, a communication interface such as the network interface 1920 described herein. In such embodiments, the communication interface can govern and manage the input and output received from the attached input device 1916 and/or output device 1918. As may be contemplated, there is no restriction on operating on any particular hardware arrangement and accordingly the basic features here may easily be substituted for other hardware, software, or firmware arrangements as they are developed.

In some embodiments, the storage device 1910 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 1910 can include hardware and/or software services such as service 1912 that can control or configure the processor 1904 to perform one or more functions including, but not limited to, the methods, processes, functions, systems, and services described herein in various embodiments. In some embodiments, the hardware or software services can be implemented as modules. As illustrated in example computing system architecture 1900, the storage device 1910 can be connected to other parts of the computing device 1902 using the system connection 1906. In an embodiment, a hardware service or hardware module such as service 1912, that performs a function can include a software component stored in a non-transitory computer-readable medium that, in connection with the necessary hardware components, such as the processor 1904, connection 1906, cache 1908, storage device 1910, memory 1914, input device 1916, output device 1918, and so forth, can carry out the functions such as those described herein.

The disclosed systems and services of a task facilitation service (e.g., the task facilitation service 102 described herein at least in connection with FIG. 1) can be performed using a computing system such as the example computing system illustrated in FIG. 19, using one or more components of the example computing system architecture 1900. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems for communicating proposals associated with a task facilitation service (e.g., the task facilitation service 102 described herein at least in connection with FIG. 1) described herein by, for example, executing code using a processor such as processor 1904 wherein the code is stored in memory such as memory 1914 as described herein. One or more of a user device, a provider server or system, a database system, or other such devices, services, or systems may include some or all of the components of the computing system such as the example computing system illustrated in FIG. 19, using one or more components of the example computing system architecture 1900 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1928. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1904 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1914 can be coupled to the processor 1904 by, for example, a connector such as connector 1906, or a bus. As used herein, a connector or bus such as connector 1906 is a communications system that transfers data between components within the computing device 1902 and may, in some embodiments, be used to transfer data between computing devices. The connector 1906 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1914 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1914 can also include magnetic or optical data storage media including read-only (e.g., CD ROM and DVD ROM) or otherwise (e.g., CD or DVD). The memory can be local, remote, or distributed.

As described above, the connector 1906 (or bus) can also couple the processor 1904 to the storage device 1910, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1910. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1906 can also couple the processor 1904 to a network interface device such as the network interface 1920. The interface can include one or more of a modem or other such network interfaces including, but not limited to those described herein. It will be appreciated that the network interface 1920 may be considered to be part of the computing device 1902 or may be separate from the computing device 1902. The network interface 1920 can include one or more of an analog modem, Integrated Services Digital Network (ISDN) modem, cable modem, token ring interface, satellite transmission interface, or other interfaces for coupling a computer system to other computer systems. In some embodiments, the network interface 1920 can include one or more input and/or output (I/O) devices. The I/O devices can include, by way of example but not limitation, input devices such as input device 1916 and/or output devices such as output device 1918. For example, the network interface 1920 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1902 can be connected to one or more additional computing devices such as computing device 1924 via a network 1922 using a connection such as the network interface 1920. In such embodiments, the computing device 1924 may execute one or more services 1926 to perform one or more functions under the control of, or on behalf of, programs and/or services operating on computing device 1902. In some embodiments, a computing device such as computing device 1924 may include one or more of the types of components as described in connection with computing device 1902 including, but not limited to, a processor such as processor 1904, a connection such as connection 1906, a cache such as cache 1908, a storage device such as storage device 1910, memory such as memory 1914, an input device such as input device 1916, and an output device such as output device 1918. In such embodiments, the computing device 1924 can carry out the functions such as those described herein in connection with computing device 1902. In some embodiments, the computing device 1902 can be connected to a plurality of computing devices such as computing device 1924, each of which may also be connected to a plurality of computing devices such as computing device 1924. Such an embodiment may be referred to herein as a distributed computing environment.

The network 1922 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 1922 can be wired connections, wireless connections, or combinations thereof. Communications via the network 1922 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 1922, within the computing device 1902, within the computing device 1924, or within the computing resources provider 1928 can include information, which also may be referred to herein as content. The information may include text, graphics, audio, video, haptics, and/or any other information that can be provided to a user of the computing device such as the computing device 1902. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1902 and presented to a user of the computing device 1902 using forms that are perceptible via sight, sound, smell, taste, touch, or other such mechanisms. In some embodiments, communications over the network 1922 can be received and/or processed by a computing device configured as a server. Such communications can be sent and received using PUP: Hypertext Preprocessor ("PUP"), Python™, Ruby, Perl® and variants, Java®, HTML, XML, or another such server-side processing language.

In some embodiments, the computing device 1902 and/or the computing device 1924 can be connected to a computing resources provider 1928 via the network 1922 using a network interface such as those described herein (e.g. network interface 1920). In such embodiments, one or more systems (e.g., system 1930 and system 1932) hosted within the computing resources provider 1928 (also referred to herein as within "a computing resources provider environment") may execute one or more services to perform one or more functions under the control of, or on behalf of, programs and/or services operating on computing device 1902 and/or computing device 1924. Systems such as system 1930 and system 1932 may include one or more computing devices such as those described herein to execute computer code to perform the one or more functions under the control of, or on behalf of, programs and/or services operating on computing device 1902 and/or computing device 1924.

For example, the computing resources provider 1928 may provide a service, operating on system 1930 to store data for the computing device 1902 when, for example, the amount of data that the computing device 1902 exceeds the capacity of storage device 1910. In another example, the computing resources provider 1928 may provide a service to first instantiate a virtual machine (VM) on system 1932, use that VM to access the data stored on system 1932, perform one or more operations on that data, and provide a result of those one or more operations to the computing device 1902. Such operations (e.g., data storage and VM instantiation) may be referred to herein as operating "in the cloud," "within a cloud computing environment," or "within a hosted virtual machine environment," and the computing resources provider 1928 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1928 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, server-less hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as system 1930 and system 1932 may implement versions of various services (e.g., the service 1912 or the service 1926) on behalf of, or under the control of, computing device 1902 and/or computing device 1924. Such implemented versions of various services may involve one or more virtualization techniques so that, for example, it may appear to a user of computing device 1902 that the service 1912 is executing on the computing device 1902 when the service is executing on, for example, system 1930. As may also be contemplated, the various services operating within the computing resources provider 1928 environment may be distributed among various systems within the environment as well as partially distributed onto computing device 1924 and/or computing device 1902.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 1902) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the example process 700 for processing communications associated with proposals in real-time as illustrated in FIG. 7). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary operations (e.g., a computer-program product) may be stored in a computer-readable or machine-readable storage medium (e.g., a medium for storing program code or code segments) such as those described herein. A processor(s), implemented in an integrated circuit, may perform the necessary operations.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1902.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
   receiving in real-time a set of proposal messages between a member and a representative as the set of proposal messages is being exchanged, wherein the set of proposal messages corresponds to a set of proposals associated with a task, and wherein the set of proposals are generated based on the task and a member profile associated with the member;
   automatically identifying in real-time a selection of one or more proposals from the set of proposals, wherein the selection is automatically identified based on a real-time analysis of the set of proposal messages;
   automatically generating one or more proposal tasks performable to complete the task, wherein the one or more proposal tasks are automatically generated based on the selection;

processing in real-time a set of task performance messages exchanged between the representative and an assistant representative, wherein the set of task performance messages corresponds to performance of the one or more proposal tasks as the set of task performance messages is being exchanged;

automatically performing one or more operations associated with the performance of the one or more proposal tasks, wherein the one or more operations are automatically performed according to the set of task performance messages;

monitoring the performance of the one or more proposal tasks and the one or more operations, wherein the performance of the one or more proposal tasks and the one or more operations are monitored as the set of proposal messages and the set of task performance messages are being exchanged between the representative and the assistant representative; and updating the member profile in real-time based on the task, the selection, and feedback corresponding to the set of proposal messages and the set of task performance messages.

2. The computer-implemented method of claim 1, wherein the selection is detected based on one or more anchor terms automatically identified in the set of proposal messages.

3. The computer-implemented method of claim 1, further comprising:
automatically modifying the set of proposals in real-time based on the set of task performance messages between the representative and the assistant representative.

4. The computer-implemented method of claim 1, further comprising:
automatically delegating the one or more proposal tasks according to one or more parameters associated with the one or more proposal tasks and to characteristics of the representative, the assistant representative, and one or more other representatives.

5. The computer-implemented method of claim 1, wherein the selection is automatically identified in real-time using a Natural Language Processing (NLP) algorithm, and wherein the NLP algorithm processes the set of proposal messages in real-time as the set of proposal messages is received.

6. The computer-implemented method of claim 1, further comprising:
performing a sentiment analysis to automatically determine a sentiment corresponding to the set of proposals, wherein the sentiment is used to identify the selection of one or more proposals from the set of proposals.

7. The computer-implemented method of claim 1, wherein the representative is an automated bot, and wherein the automated bot automatically communicates with the member according to the member profile.

8. A system, comprising:
one or more processors; and
memory storing thereon instructions that, as a result of being executed by the one or more processors, cause the system to:
receive in real-time a set of proposal messages between a member and a representative as the set of proposal messages is being exchanged, wherein the set of proposal messages corresponds to a set of proposals associated with a task, and wherein the set of proposals are generated based on the task and a member profile associated with the member;

automatically identify in real-time a selection of one or more proposals from the set of proposals, wherein the selection is automatically identified based on a real-time analysis of the set of proposal messages;

automatically generate one or more proposal tasks performable to complete the task, wherein the one or more proposal tasks are automatically generated based on the selection;

process in real-time a set of task performance messages exchanged between the representative and an assistant representative, wherein the set of task performance messages corresponds to performance of the one or more proposal tasks as the set of task performance messages is being exchanged;

automatically perform one or more operations associated with the performance of the one or more proposal tasks, wherein the one or more operations are automatically performed according to the set of task performance messages;

monitor the performance of the one or more proposal tasks and the one or more operations, wherein the performance of the one or more proposal tasks and the one or more operations are monitored as the set of proposal messages and the set of task performance messages are being exchanged between the representative and the assistant representative; and update the member profile in real-time based on the task, the selection, and feedback corresponding to the set of proposal messages and the set of task performance messages.

9. The system of claim 8, wherein the selection is detected based on one or more anchor terms automatically identified in the set of proposal messages.

10. The system of claim 8, wherein the instructions further cause the system to:
automatically modify the set of proposals in real-time based on the set of task performance messages between the representative and the assistant representative.

11. The system of claim 8, wherein the instructions further cause the system to:
automatically delegate the one or more proposal tasks according to one or more parameters associated with the one or more proposal tasks and to characteristics of the representative, the assistant representative, and one or more other representatives.

12. The system of claim 8, wherein the selection is automatically identified in real-time using a Natural Language Processing (NLP) algorithm, and wherein the NLP algorithm processes the set of proposal messages in real-time as the set of proposal messages is received.

13. The system of claim 8, wherein the instructions further cause the system to:
perform a sentiment analysis to automatically determine a sentiment corresponding to the set of proposals, wherein the sentiment is used to identify the selection of one or more proposals from the set of proposals.

14. The system of claim 8, wherein the representative is an automated bot, and wherein the automated bot automatically communicates with the member according to the member profile.

15. A non-transitory, computer-readable storage medium storing thereon executable instructions that, as a result of being executed by a computer system, cause the computer system to:
receive in real-time a set of proposal messages between a member and a representative as the set of proposal messages is being exchanged, wherein the set of proposal messages corresponds to a set of proposals associated with a task, and wherein the set of proposals are generated based on the task and a member profile associated with the member;

automatically identify in real-time a selection of one or more proposals from the set of proposals, wherein the selection is automatically identified based on a real-time analysis of the set of proposal messages;

automatically generate one or more proposal tasks performable to complete the task, wherein the one or more proposal tasks are automatically generated based on the selection;

process in real-time a set of task performance messages exchanged between the representative and an assistant representative, wherein the set of task performance messages corresponds to performance of the one or more proposal tasks as the set of task performance messages is being exchanged;

automatically perform one or more operations associated with the performance of the one or more proposal tasks, wherein the one or more operations are automatically performed according to the set of task performance messages;

monitor the performance of the one or more proposal tasks and the one or more operations, wherein the performance of the one or more proposal tasks and the one or more operations are monitored as the set of proposal messages and the set of task performance messages are being exchanged between the representative and the assistant representative; and update the member profile in real-time based on the task, the selection, and feedback corresponding to the set of proposal messages and the set of task performance messages.

16. The non-transitory, computer-readable storage medium of claim 15, wherein the selection is detected based on one or more anchor terms automatically identified in the set of proposal messages.

17. The non-transitory, computer-readable storage medium of claim 15, wherein the executable instructions further cause the computer system to:
   automatically modify the set of proposals in real-time based on the set of task performance messages between the representative and the assistant representative.

18. The non-transitory, computer-readable storage medium of claim 15, wherein the executable instructions further cause the computer system to:
   automatically delegate the one or more proposal tasks according to one or more parameters associated with the one or more proposal tasks and to characteristics of the representative, the assistant representative, and one or more other representatives.

19. The non-transitory, computer-readable storage medium of claim 15, wherein the selection is automatically identified in real-time using a Natural Language Processing (NLP) algorithm, and wherein the NLP algorithm processes the set of proposal messages in real-time as the set of proposal messages is received.

20. The non-transitory, computer-readable storage medium of claim 15, wherein the executable instructions further cause the computer system to:
   perform a sentiment analysis to automatically determine a sentiment corresponding to the set of proposals, wherein the sentiment is used to identify the selection of one or more proposals from the set of proposals.

21. The non-transitory, computer-readable storage medium of claim 15, wherein the representative is an automated bot, and wherein the automated bot automatically communicates with the member according to the member profile.

\* \* \* \* \*